US011113771B1

(12) United States Patent
Wang et al.

(10) Patent No.: US 11,113,771 B1
(45) Date of Patent: Sep. 7, 2021

(54) SYSTEMS, METHODS AND ARTICLES FOR GENERATING SUB-GRAPHS OF A TAX CALCULATION GRAPH OF A TAX PREPARATION SYSTEM

(71) Applicant: Intuit Inc., Mountain View, CA (US)

(72) Inventors: Gang Wang, San Diego, CA (US); Kevin M. McCluskey, Carlsbad, CA (US); Luis F. Cabrera, Bellevue, WA (US); David A. Hanekamp, Jr., Carlsbad, CA (US)

(73) Assignee: Intuit Inc., Mountain View, CA (US)

( * ) Notice: Subject to any disclaimer, the term of this patent is extended or adjusted under 35 U.S.C. 154(b) by 390 days.

(21) Appl. No.: 14/698,733

(22) Filed: Apr. 28, 2015

(51) Int. Cl.
*G06Q 40/00* (2012.01)
*G06F 16/22* (2019.01)

(52) U.S. Cl.
CPC ....... *G06Q 40/123* (2013.12); *G06F 16/2246* (2019.01)

(58) Field of Classification Search
CPC .. G06Q 10/047; G06Q 40/123; Y10S 707/95; G06N 5/027; G06F 17/3043
See application file for complete search history.

(56) References Cited

U.S. PATENT DOCUMENTS

| | | | |
|---|---|---|---|
| 4,213,251 A * | 7/1980 | Foundos | G06K 19/04 434/327 |
| 4,809,219 A | 2/1989 | Ashford et al. | |
| 5,006,998 A | 4/1991 | Yasunobu | |
| 5,495,607 A | 2/1996 | Pisello et al. | |
| 5,557,761 A | 9/1996 | Chan et al. | |
| 5,673,369 A | 9/1997 | Kim | |
| 5,742,836 A * | 4/1998 | Turpin | G06F 8/34 707/999.001 |

(Continued)

FOREIGN PATENT DOCUMENTS

| | | |
|---|---|---|
| JP | 2002-117121 A | 4/2002 |
| JP | 2005-190425 A | 7/2005 |

(Continued)

OTHER PUBLICATIONS

Final Office Action dated Jun. 6, 2017 in U.S. Appl. No. 14/462,411, (20pges).

(Continued)

*Primary Examiner* — Hao Fu
(74) *Attorney, Agent, or Firm* — DLA Piper LLP (US)

(57) ABSTRACT

Systems, methods and articles of manufacture for generating a sub-graph of a tax calculation graph usable by a tax calculation engine to perform tax calculation operations. The system includes a computing device, a data store in communication with the computing device and a tax preparation software application executable by the computing device. The system comprises a tax calculation graph and a sub-graph engine which executes on the computing device. The sub-graph engine is configured to generate a sub-graph of the tax calculation graph based upon a target node and one or more user enterable nodes selected from the nodes of the tax calculation graph. The sub-graph engine analyzes the tax calculation graph in view of the target node and user enterable nodes and generates a sub-graph which excludes all nodes which are not necessary to calculate the target node.

19 Claims, 17 Drawing Sheets

(56) References Cited

U.S. PATENT DOCUMENTS

| | | |
|---|---|---|
| 5,819,249 A | 10/1998 | Dohanich |
| 6,078,898 A | 6/2000 | Davis |
| 6,535,883 B1 | 3/2003 | Lee et al. |
| 6,601,055 B1 | 7/2003 | Roberts |
| 6,631,361 B1 | 10/2003 | O'Flaherty et al. |
| 6,670,969 B1 | 12/2003 | Halstead et al. |
| 6,690,854 B2 | 2/2004 | Helbing |
| 6,697,787 B1 | 2/2004 | Miller |
| 6,898,573 B1 | 5/2005 | Piehl |
| 6,912,508 B1 | 6/2005 | McCalden |
| 7,234,103 B1 | 6/2007 | Regan |
| 7,295,998 B2 | 11/2007 | Kulkarni |
| 7,331,045 B2 | 2/2008 | Martin et al. |
| 7,448,022 B1 | 11/2008 | Ram et al. |
| 7,539,635 B1 | 5/2009 | Peak et al. |
| 7,565,312 B1 | 7/2009 | Shaw |
| 7,603,301 B1 | 10/2009 | Regan |
| 7,668,763 B1 | 2/2010 | Albrecht |
| 7,680,756 B2 | 3/2010 | Quinn |
| 7,685,082 B1 | 3/2010 | Coletta |
| 7,693,760 B1 | 4/2010 | Fiteni |
| 7,693,769 B1 | 4/2010 | Burlison |
| 7,716,094 B1 | 5/2010 | Sutter et al. |
| 7,742,958 B1 | 6/2010 | Leek |
| 7,747,484 B2 | 6/2010 | Stanley |
| 7,761,333 B2 | 7/2010 | Kapp |
| 7,778,895 B1 | 8/2010 | Baxter |
| 7,818,222 B2 | 10/2010 | Allanson |
| 7,849,405 B1 | 12/2010 | Coletta |
| 7,860,763 B1 | 12/2010 | Quinn et al. |
| 7,865,829 B1 | 1/2011 | Goldfield |
| 7,895,102 B1 | 2/2011 | Wilks et al. |
| 7,899,757 B1 | 3/2011 | Talan |
| 7,900,298 B1 | 3/2011 | Char et al. |
| 7,908,190 B2 | 3/2011 | Enenkiel |
| 7,912,767 B1 | 3/2011 | Cheatham et al. |
| 7,912,768 B2 | 3/2011 | Abeles |
| 7,925,553 B2 | 4/2011 | Banks |
| 8,001,006 B1 | 8/2011 | Yu et al. |
| 8,019,664 B1 | 9/2011 | Tifford et al. |
| 8,082,144 B1 | 12/2011 | Brown et al. |
| 8,086,970 B2 | 12/2011 | Achtermann et al. |
| 8,108,258 B1 | 1/2012 | Slattery |
| 8,126,820 B1 | 2/2012 | Talan |
| 8,190,499 B1 | 5/2012 | McVickar |
| 8,204,805 B2 | 6/2012 | Eftekhari |
| 8,224,726 B2 | 7/2012 | Murray |
| 8,234,562 B1 | 7/2012 | Evans |
| 8,244,607 B1 | 8/2012 | Quinn |
| 8,346,635 B1 | 1/2013 | Olim |
| 8,346,680 B2 | 1/2013 | Castleman |
| 8,370,795 B1 | 2/2013 | Sage |
| 8,386,344 B2 | 2/2013 | Christina |
| 8,407,113 B1 | 3/2013 | Eftekhari et al. |
| 8,417,596 B1 | 4/2013 | Dunbar et al. |
| 8,417,597 B1 | 4/2013 | McVickar |
| 8,447,667 B1 | 5/2013 | Dinamani et al. |
| 8,452,676 B1 | 5/2013 | Talan |
| 8,473,880 B1 | 6/2013 | Bennett et al. |
| 8,478,671 B1 | 7/2013 | Tifford |
| 8,510,187 B1 | 8/2013 | Dinamani |
| 8,527,375 B1 | 9/2013 | Olim |
| 8,560,409 B2 | 10/2013 | Abeles |
| 8,583,516 B1 | 11/2013 | Pitt |
| 8,589,262 B1 | 11/2013 | Gang |
| 8,607,353 B2 | 12/2013 | Rippert et al. |
| 8,635,127 B1 | 1/2014 | Shaw |
| 8,639,616 B1 | 1/2014 | Rolenaitis |
| 8,682,756 B1 | 3/2014 | Tifford et al. |
| 8,682,829 B2 | 3/2014 | Barthel |
| 8,694,395 B2 | 4/2014 | Houseworth |
| 8,706,580 B2 | 4/2014 | Houseworth |
| 8,788,412 B1 | 7/2014 | Hamm |
| 8,812,380 B2 | 8/2014 | Murray |
| 8,813,178 B1 | 8/2014 | Khanna |
| 8,838,492 B1 | 9/2014 | Baker |
| 8,892,467 B1 | 11/2014 | Ball |
| 8,949,270 B2 | 2/2015 | Newton et al. |
| 9,372,687 B1 | 6/2016 | Pai |
| 9,690,854 B2 | 6/2017 | Stent et al. |
| 9,760,953 B1 | 9/2017 | Wang et al. |
| 9,916,628 B1 | 3/2018 | Wang et al. |
| 9,922,376 B1 | 3/2018 | Wang et al. |
| 9,990,678 B1 | 6/2018 | Cabrera et al. |
| 2002/0065831 A1 | 5/2002 | DePaolo |
| 2002/0107698 A1 | 8/2002 | Brown et al. |
| 2002/0111888 A1 | 8/2002 | Stanley et al. |
| 2002/0174017 A1 | 11/2002 | Singh |
| 2002/0198832 A1 | 12/2002 | Agee |
| 2003/0101070 A1 | 5/2003 | Mahosky et al. |
| 2003/0126054 A1 | 7/2003 | Purcell |
| 2003/0139827 A1 | 7/2003 | Phelps |
| 2003/0174157 A1 | 9/2003 | Hellman |
| 2003/0182102 A1 | 9/2003 | Corston-Oliver et al. |
| 2004/0002906 A1 | 1/2004 | Von Drehnen et al. |
| 2004/0019540 A1 | 1/2004 | William |
| 2004/0019541 A1 | 1/2004 | William |
| 2004/0021678 A1 | 2/2004 | Ullah et al. |
| 2004/0078271 A1 | 4/2004 | Morano |
| 2004/0083164 A1 | 4/2004 | Schwartz et al. |
| 2004/0088233 A1 | 5/2004 | Brady |
| 2004/0117395 A1 | 6/2004 | Gong |
| 2004/0172347 A1 | 9/2004 | Barthel |
| 2004/0181543 A1 | 9/2004 | Wu et al. |
| 2004/0205008 A1 | 10/2004 | Haynie et al. |
| 2005/0171822 A1 | 8/2005 | Cagan |
| 2005/0216379 A1 | 9/2005 | Ozaki |
| 2005/0262191 A1 | 11/2005 | Mamou et al. |
| 2006/0112114 A1 | 5/2006 | Yu |
| 2006/0155618 A1 | 7/2006 | Wyle |
| 2006/0155632 A1 | 7/2006 | Cherkas et al. |
| 2006/0178961 A1* | 8/2006 | Stanley ............... G06Q 40/02 705/31 |
| 2006/0282354 A1 | 12/2006 | Varghese |
| 2006/0293990 A1 | 12/2006 | Schaub |
| 2007/0033116 A1 | 2/2007 | Murray |
| 2007/0033117 A1 | 2/2007 | Murray |
| 2007/0033130 A1 | 2/2007 | Murray |
| 2007/0055571 A1 | 3/2007 | Fox et al. |
| 2007/0094207 A1 | 4/2007 | Yu et al. |
| 2007/0136157 A1 | 6/2007 | Neher et al. |
| 2007/0150387 A1 | 6/2007 | Seubert et al. |
| 2007/0156564 A1 | 7/2007 | Humphrey et al. |
| 2007/0179841 A1 | 8/2007 | Agassi |
| 2007/0192166 A1 | 8/2007 | Van Luchene |
| 2007/0250418 A1 | 10/2007 | Banks et al. |
| 2008/0059900 A1 | 3/2008 | Murray |
| 2008/0097878 A1 | 4/2008 | Abeles |
| 2008/0126170 A1 | 5/2008 | Leck et al. |
| 2008/0147494 A1 | 6/2008 | Larson |
| 2008/0162310 A1 | 7/2008 | Quinn |
| 2008/0177631 A1 | 7/2008 | William |
| 2008/0215392 A1 | 9/2008 | Rajan |
| 2008/0243531 A1 | 10/2008 | Hyder et al. |
| 2009/0024694 A1 | 1/2009 | Fong |
| 2009/0037305 A1 | 2/2009 | Sander |
| 2009/0037847 A1 | 2/2009 | Achtermann et al. |
| 2009/0048957 A1 | 2/2009 | Celano |
| 2009/0064851 A1 | 3/2009 | Morris et al. |
| 2009/0117529 A1 | 5/2009 | Goldstein |
| 2009/0125618 A1 | 5/2009 | Huff |
| 2009/0138389 A1 | 5/2009 | Barthel |
| 2009/0150169 A1 | 6/2009 | Kirkwood |
| 2009/0157572 A1 | 6/2009 | Chidlovskii |
| 2009/0193389 A1 | 7/2009 | Miller |
| 2009/0204881 A1 | 8/2009 | Murthy |
| 2009/0239650 A1 | 9/2009 | Alderucci et al. |
| 2009/0248594 A1 | 10/2009 | Castleman |
| 2009/0248603 A1 | 10/2009 | Kiersky |
| 2010/0036760 A1 | 2/2010 | Abeles |
| 2010/0088124 A1 | 4/2010 | Diefendorf et al. |
| 2010/0131394 A1 | 5/2010 | Rutsch et al. |
| 2010/0153138 A1 | 6/2010 | Evans |
| 2011/0004537 A1 | 1/2011 | Allanson et al. |

(56) References Cited

U.S. PATENT DOCUMENTS

| | | |
|---|---|---|
| 2011/0078062 A1 | 3/2011 | Kleyman |
| 2011/0145112 A1 | 6/2011 | Abeles |
| 2011/0173222 A1 | 7/2011 | Sayal et al. |
| 2011/0225220 A1 | 9/2011 | Huang et al. |
| 2011/0258195 A1 | 10/2011 | Welling |
| 2011/0258610 A1 | 10/2011 | Aaraj et al. |
| 2011/0264569 A1 | 10/2011 | Houseworth |
| 2012/0016817 A1 | 1/2012 | Smith et al. |
| 2012/0027246 A1 | 2/2012 | Tifford |
| 2012/0030076 A1 | 2/2012 | Checco et al. |
| 2012/0030577 A1 | 2/2012 | Akolkar et al. |
| 2012/0072321 A1 | 3/2012 | Christian et al. |
| 2012/0109792 A1 | 5/2012 | Eftekhari |
| 2012/0109793 A1 | 5/2012 | Abeles |
| 2012/0136764 A1 | 5/2012 | Miller |
| 2012/0278365 A1 | 11/2012 | Labat et al. |
| 2013/0036347 A1 | 2/2013 | Eftekhari |
| 2013/0080302 A1 | 3/2013 | Allanson et al. |
| 2013/0097262 A1 | 4/2013 | Dandison |
| 2013/0111032 A1 | 5/2013 | Alapati et al. |
| 2013/0138586 A1 | 5/2013 | Jung et al. |
| 2013/0185347 A1 | 7/2013 | Romano |
| 2013/0187926 A1 | 7/2013 | Silverstein et al. |
| 2013/0198047 A1 | 8/2013 | Houseworth |
| 2013/0218735 A1 | 8/2013 | Murray |
| 2013/0262279 A1 | 10/2013 | Finley et al. |
| 2013/0282539 A1 | 10/2013 | Murray |
| 2013/0290169 A1 | 10/2013 | Bathula |
| 2014/0108213 A1 | 4/2014 | Houseworth |
| 2014/0172656 A1 | 6/2014 | Shaw |
| 2014/0201045 A1 | 7/2014 | Pai et al. |
| 2014/0207633 A1 | 7/2014 | Aldrich et al. |
| 2014/0241631 A1 | 8/2014 | Huang |
| 2014/0244455 A1 | 8/2014 | Huang |
| 2014/0244457 A1 | 8/2014 | Howell et al. |
| 2014/0337189 A1* | 11/2014 | Barsade ............... G06Q 40/123 705/31 |
| 2015/0142703 A1 | 5/2015 | Rajesh |
| 2015/0237205 A1 | 8/2015 | Waller et al. |
| 2015/0254623 A1 | 9/2015 | Velez et al. |
| 2015/0269491 A1 | 9/2015 | Tripathi et al. |
| 2016/0027127 A1 | 1/2016 | Chavarria et al. |
| 2016/0063645 A1 | 3/2016 | Houseworth et al. |
| 2016/0071112 A1 | 3/2016 | Unser |
| 2016/0078567 A1 | 3/2016 | Goldman et al. |
| 2016/0092993 A1 | 3/2016 | Ciaramitaro |
| 2016/0092994 A1 | 3/2016 | Roebuck et al. |
| 2016/0098804 A1 | 4/2016 | Mascaro et al. |
| 2016/0148321 A1 | 5/2016 | Ciaramitaro et al. |
| 2016/0275627 A1 | 9/2016 | Wang |
| 2017/0004583 A1 | 1/2017 | Wang |
| 2017/0004584 A1 | 1/2017 | Wang |
| 2017/0032468 A1 | 2/2017 | Wang et al. |
| 2018/0032855 A1 | 2/2018 | Wang et al. |

FOREIGN PATENT DOCUMENTS

| | | |
|---|---|---|
| JP | 2014-206960 A | 10/2014 |
| KR | 10-2012-0011987 A | 2/2012 |
| WO | 2017/004094 A1 | 1/2017 |
| WO | 2017004095 A1 | 1/2017 |
| WO | 2017019233 A1 | 2/2017 |
| WO | 2017116496 A1 | 7/2017 |
| WO | 2017116497 A1 | 7/2017 |
| WO | 2018022023 A1 | 2/2018 |
| WO | 2018022128 A1 | 2/2018 |
| WO | 2018/080562 A1 | 5/2018 |
| WO | 2018/080563 A1 | 5/2018 |

OTHER PUBLICATIONS

Amendment After Final Office Action dated Jun. 6, 2017 in U.S. Appl. No. 14/448,922, (8pages).
Interview Summary dated Jun. 7, 2017 in U.S. Appl. No. 14/448,922, (2pages).
Advisory Action dated Jun. 14, 2017 in U.S. Appl. No. 14/448,922, (4pages).
Amendment After Final Office Action dated Jun. 20, 2017 in U.S. Appl. No. 14/448,922, (14pages).
Office Action dated May 26, 2017 in U.S. Appl. No. 14/553,347, (43pages).
Office Action dated Jun. 2, 2017 in U.S. Appl. No. 14/673,261, (65pages).
Office Action dated May 25, 2017 in U.S. Appl. No. 14/529,736, (42pages).
Office Action dated Jun. 6, 2017 in U.S. Appl. No. 14/462,315, (54pages).
Amendment and Response dated Jun. 2, 2017 in U.S. Appl. No. 14/448,986, (12pages).
Interview Summary dated Jun. 2, 2017 in U.S. Appl. No. 14/448,986, (3pages).
Office Action dated Jun. 7, 2017 in U.S. Appl. No. 14/555,334, (54pages).
Office Action dated Jun. 7, 2017 in U.S. Appl. No. 14/555,296, (7pages).
Response dated Jun. 7, 2017 in U.S. Appl. No. 14/555,543, (21pages).
Amendment dated Jun. 9, 2017 in U.S. Appl. No. 14/097,057, (26pages).
Office Action dated Jun. 22, 2017 in U.S. Appl. No. 14/698,746, (50pages).
Response to Restriction Requirement dated Jul. 5, 2017 in U.S. Appl. No. 14/555,902, (12pages).
PCT International Search Report for PCT/US2016/067866 Applicant: Intuit Inc., Form PCT/ISA/210 and 220, dated Jul. 26, 2017 (5pages).
PCT Written Opinion of the International Search Authority for PCT/US2016/067866, Applicant: Intuit Inc., Form PCT/ISA/237, dated Jul. 26, 2017 (4pages).
PCT International Search Report for PCT/US2016/067867 Applicant: Intuit Inc., Form PCT/ISA/210 and 220, dated Jul. 26, 2017 (5pages).
PCT Written Opinion of the International Search Authority for PCT/US2016/067867, Applicant: Intuit Inc., Form PCT/ISA/237, dated Jul. 26, 2017 (9pages).
Response to Office Action dated Jul. 17, 2017 in U.S. Appl. No. 14/462,345, (17pages).
Advisory Action dated Jul. 31, 2017 in U.S. Appl. No. 14/462,345, (3pages).
Request for Continued Examination and Response dated Aug. 14, 2017 in U.S. Appl. No. 14/462,345, (17pages).
Office Action dated Aug. 9, 2017 in U.S. Appl. No. 14/097,057, (47pages).
Interview Summary dated Sep. 6, 2017 in U.S. Appl. No. 14/553,347, (2pages).
Office Action dated Sep. 14, 2017 in U.S. Appl. No. 14/530,159, (41pages).
Response dated Aug. 10, 2017 in U.S. Appl. No. 141448,678, (41pages).
Office Action dated Jul. 28, 2017 in U.S. Appl. No. 14/555,553, (52pages).
Office Action dated Aug. 21, 2017 in U.S. Appl. No. 14/755,684, (43pages).
Response dated Jul. 5, 2017 in U.S. Appl. No. 141555,902, (12pages).
Office Action dated Sep. 8, 2017 in U.S. Appl. No. 14/555,939, (92pages).
Office Action dated Jun. 28, 2017 in U.S. Appl. No. 14/207,121, (29pages).
Office Action dated Sep. 14, 2017 in U.S. Appl. No. 14/557,335, (57pages).
Response dated Aug. 7, 2017 in U.S. Appl. No. 141462,315, (10pages).
Advisory Action dated Aug. 24, 2017 in U.S. Appl. No. 14/462,315, (3pages).
Request for Examination and Response dated Sep. 6, 2017 in U.S. Appl. No. 14/462,315, (43pages).

(56) References Cited

OTHER PUBLICATIONS

Office Action dated Jun. 27, 2017 in U.S. Appl. No. 14/755,859, (174pages).
Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).
Request for Continued Examination and Amendment dated Sep. 6, 2017 in U.S. Appl. No. 141462,411, (24pages).
Office Action dated Aug. 25, 2017 in U.S. Appl. No. 14/673,646, (65pages).
Office Action dated Jun. 27, 2017 in U.S. Appl. No. 14/675,166, (46pages).
Response dated Jun. 23, 2017 in U.S. Appl. No. 14/555,293, (7pages).
Office Action dated Jul. 10, 2017 in U.S. Appl. No. 14/555,222, (63pages).
Office Action dated Aug. 18, 2017 in U.S. Appl. No. 14/555,543, (42pages).
Office Action dated Aug. 25, 2017 in U.S. Appl. No. 14/673,555, (71pages).
Response dated Sep. 21, 2017 in U.S. Appl. No. 14/448,481, (44pages).
Office Communication dated Apr. 4, 2018 in Canadian Patent Application No. 2,959,230, (6pages).
Supplementary Search Report dated Mar. 26, 2018 in European Patent Application No. 16843282.1-1217, (6pages).
Amendment and Response to Office Action for U.S. Appl. No. 14/462,345 dated Apr. 12, 2018, (15pages).
Response to Office Action for U.S. Appl. No. 14/553,347 dated Mar. 30, 2018, (26pages).
Advisory Action for U.S. Appl. No. 14/553,347 dated Apr. 13, 2018, (7pages).
Response and Request for Continued Examination for U.S. Appl. No. 14/553,347 dated Mar. 30, 2018, (41pages).
Amendment and Response to Office Action for U.S. Appl. No. 14/673,261 dated Apr. 23, 2018, (39pages).
Advisory Action for U.S. Appl. No. 14/673,261 dated May 14, 2018, (9pages).
Communication pursuant to Rules 70(2) and 70a(2) EPC dated Apr. 25, 2018 in European Patent Application No. 16843282.1-1217, (1page).
Office Action for U.S. Appl. No. 14/462,058 dated Apr. 27, 2018, (47pages).
Amendment and Response to Final and Advisory Actions and Request for Continued Examination for U.S. Appl. No. 14/448,678 dated Mar. 5, 2018, (25pages).
Amendment and Response for U.S. Appl. No. 14/555,553 dated Apr. 12, 2018, (24pages).
Advisory Action for U.S. Appl. No. 14/555,553 dated Apr. 24, 2018, (3pages).
Amendment and Response to Final Office Action and Request for Continued Examination for U.S. Appl. No. 14/555,553 dated May 11, 2018, (25pages).
Amendment and Response for U.S. Appl. No. 14/529,798 dated Mar. 28, 2018, (23pages).
Response for U.S. Appl. No. 14/755,684 dated Mar. 12, 2018, (23pages).
Advisory Action for U.S. Appl. No. 14/755,684 dated Mar. 30, 2018, (2pages).
Response for U.S. Appl. No. 14/755,684 dated Apr. 4, 2018, (23pages).
Office Action for U.S. Appl. No. 14/555,902 dated May 17, 2018, (23pages).
Response for U.S. Appl. No. 14/207,121 dated Mar. 19, 2018, (34pages).
Advisory Action for U.S. Appl. No. 14/207,121 dated Apr. 6, 2018 (3pages).
Response for U.S. Appl. No. 14/462,315 dated May 9, 2018, (33pages).
Office Action for U.S. Appl. No. 14/698,746 dated Feb. 28, 2018, (14pages).
Response for U.S. Appl. No. 14/698,746 dated Apr. 30, 2018, (18pages).
Advisory Action for U.S. Appl. No. 14/698,746 dated May 15, 2018, (3pages).
Response for U.S. Appl. No. 14/462,397 dated Feb. 20, 2018, (33pages).
Response for U.S. Appl. No. 14/462,373 dated Feb. 28, 2018, (25pages).
Office Action for U.S. Appl. No. 14/755,859 dated Mar. 21, 2018, (57pages).
Response for U.S. Appl. No. 14/755,859 dated May 21, 2018, (8pages).
Response for U.S. Appl. No. 14/448,886 dated Feb. 28, 2018, (31pages).
Amendment for U.S. Appl. No. 14/448,922 dated Feb. 28, 2018, (27pages).
Office Action for U.S. Appl. No. 14/448,922 dated May 16, 2018, (41pages).
Office Action for U.S. Appl. No. 14/448,962 dated Apr. 13, 2018, (17pages).
Office Action for U.S. Appl. No. 14/448,986 dated May 11, 2018, (15pages).
Response for U.S. Appl. No. 14/448,986 dated May 8, 2018, (27pages).
Response for U.S. Appl. No. 14/555,334 dated Apr. 4, 2018, (14pages).
Advisory Action for U.S. Appl. No. 14/555,334 dated Apr. 17, 2018, (2pages).
Response for U.S. Appl. No. 14/555,334 dated May 7, 2018, (41pages).
Office Action for U.S. Appl. No. 14/673,646 dated Feb. 28, 2018, (19pages).
Response for U.S. Appl. No. 14/673,646 dated Mar. 30, 2018, (22pages).
Response for U.S. Appl. No. 14/701,087 dated Apr. 2, 2018, (41pages).
Amendment After Allowance for U.S. Appl. No. 14/675,166, (5pages).
Supplemental Notice of Allowability for U.S. Appl. No. 14/675,166, (3pages).
Response for U.S. Appl. No. 14/555,296, (23pages).
Response for U.S. Appl. No. 14/555,222, (8pages).
Office Action for U.S. Appl. No. 14/700,981, (28pages).
Office Action for U.S. Appl. No. 14/673,555, (43pages).
H.R. Gregg; Decision Tables for Documentation and System Analysis; Oct. 3, 1967; Union Carbide Corporation, Nuclear Division, Computing Technology Center: pp. 5, 6, 18, 19, & 21 (Year: 1967).
Solomon L. Pollack; Analysis of the Decision Rules in Decision Tables, May 1963; The Rand Corooration; pp. iii, iv, 1, 20, & 24 (Year: 1963).
Amendment and Response dated Nov. 9, 2017 in U.S. Appl. No. 14/097,057, (31pgs.).
Amendment and Response dated Oct. 26, 2017 in U.S. Appl. No. 14/553,347, (25pgs.).
Amendment and Response dated Nov. 2, 2017 in U.S. Appl. No. 14/673,261, (30pgs.).
Office Action dated Oct. 30, 2017 in U.S. Appl. No. 14/448,678, (39pgs.).
Amendment and Response dated Oct. 30, 2017 in U.S. Appl. No. 14/555,553, (17pgs.).
Notice of Allowance dated Nov. 3, 2017 in U.S. Appl. No. 14/529,736, (13pgs.).
Interview Summary dated Sep. 28, 2017 in U.S. Appl. No. 14/529,736, (3pgs.).
Office Action dated Sep. 14, 2017 in U.S. Appl. No. 14/530,159, (41pgs.).
Amendment and Response dated Nov. 21, 2017 in U.S. Appl. No. 14/755,684, (23pgs.).
Office Action dated Nov. 15, 2017 in U.S. Appl. No. 14/206,834, (100pgs.).

(56) References Cited

OTHER PUBLICATIONS

Office Action dated Sep. 8, 2017 in U.S. Appl. No. 14/555,939, (92pgs.).
Amendment and Response dated Sep. 28, 2017 in U.S. Appl. No. 14/207,121, (38pgs.).
Office Action dated Sep. 14, 2017 in U.S. Appl. No. 14/557,335, (57pgs.).
Amendment and Response dated Aug. 7, 2017 in U.S. Appl. No. 14/462,315, (10pgs.).
Advisory Action dated Aug. 24, 2017 in U.S. Appl. No. 14/462,315, (3pgs.).
Amendment and Response and Request for Continued Examination dated Sep. 6, 2017 in U.S. Appl. No. 14/462,315, (43pgs.).
Amendment and Response dated Sep. 21, 2017 in U.S. Appl. No. 14/448,481, (44pgs.).
Office Action dated Jun. 22, 2017 in U.S. Appl. No. 14/698,746, (50pgs.).
Amendment and Response dated Sep. 22, 2017 in U.S. Appl. No. 14/698,746, (26pgs.).
Office Action dated Oct. 13, 2017 in U.S. Appl. No. 141462,397, (72pgs.).
Office Action dated Nov. 30, 2017 in U.S. Appl. No. 14/462,373, (72pgs.).
Office Action dated Jun. 27, 2017 in U.S. Appl. No. 14/755,859, (174pgs.).
Amendment and Response dated Nov. 27, 2017 in U.S. Appl. No. 14/755,859, (53pgs.).
Amendment and Response dated Jun. 20, 2017 in U.S. Appl. No. 14/448,886, (14pgs.).
Advisory Action dated Jul. 5, 2017 in U.S. Appl. No. 14/448,886, (4pgs.).
Amendment and Response dated Aug. 21, 2017 in U.S. Appl. No. 14/448,886, (37pgs.).
Office Action dated Nov. 28, 2017 in U.S. Appl. No. 14/448,886, (65pgs.).
Amendment and Response and Request for Continued Examination dated Sep. 6, 2017 in U.S. Appl. No. 14/448,922, (36pgs.).
Office Action dated Nov. 28, 2017 in U.S. Appl. No. 14/448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).
OpenRules, Preparing a Tax Return Using OpenRules Dialog, Aug. 2011 (Year: 2011) (25pgs.).
Amendment and Response and Request for Continued Examination dated Sep. 6, 2017 in U.S. Appl. No. 14/462,411, (24pgs.).
Amendment and Response dated Nov. 7, 2017 in U.S. Appl. No. 14/555,334, (26pgs.).
Advisory Action dated Nov. 22, 2017 in U.S. Appl. No. 14/555,334, (2pgs.).
Office Action dated Oct. 11, 2017 in U.S. Appl. No. 14/701,030, (53pgs.).
Office Action dated Aug. 25, 2017 in U.S. Appl. No. 14/673,646, (65pgs.).
Office Action dated Jul. 10, 2017 in U.S. Appl. No. 14/555,222, (63pgs.).
Amendment and Response dated Nov. 10, 2017 in U.S. Appl. No. 14/555,222, (25pgs.).
Office Action dated Nov. 3, 2017 in U.S. Appl. No. 14/701,087, (103pgs.).
Office Action dated Jun. 27, 2017 in U.S. Appl. No. 14/675,166, (46pgs.).
Amendment and Response dated Oct. 27, 2017 in U.S. Appl. No. 14/675,166, (25pgs.).
Response dated Jun. 23, 2017 in U.S. Appl. No. 14/555,296, (7pgs.).
Office Action dated Oct. 20, 2017 in U.S. Appl. No. 14/555,296, (50pgs.).
Office Action dated Aug. 18, 2017 in U.S. Appl. No. 14/555,543, (42pgs.).
Interview Summary dated Oct. 25, 2017 in U.S. Appl. No. 14/555,543, (3pgs.).
Office Action dated Sep. 25, 2017 in U.S. Appl. No. 14/700,981, (52pgs.).
Office Action dated Aug. 25, 2017 in U.S. Appl. No. 14/673,555, (65pgs.).
Office Action dated Sep. 28, 2017 in U.S. Appl. No. 14/701,149, (71pgs.).
Vanderbilt University, "Free tax prep help available for Vanderbilt employees", Feb. 6, 2014, Vanderbilt University, p. 1-3 [NPL-1].
Notice of Allowance and Fee(s) Due dated May 5, 2017 in U.S. Appl. No. 14/206,682, (30pages).
PCT International Search Report for PCT/US2016/044094, Applicant: Intuit Inc., Form PCT/ISA/210 and 220, dated Apr. 24, 2017 (5pages).
PCT Written Opinion of the International Search Authority for PCT/US2016/044094, Applicant: Intuit Inc., Form PCT/ISA/237, dated Apr. 24, 2017 (5pages).
PCT International Search Report for PCT/US2016/067839, Applicant: Intuit Inc., Form PCT/ISA/210 and 220, dated Apr. 25, 2017 (5pages).
PCT Written Opinion of the International Search Authority for PCT/US2016/067839, Applicant: Intuit Inc., Form PCT/ISA/237, dated Apr. 26, 2017 (12pages).
Amendment dated May 3, 2017 in U.S. Appl. No. 14/462,411, filed Aug. 18, 2014, (5pages).
Response dated May 15, 2017 in U.S. Appl. No. 14/448,962, filed Jul. 31, 2014, (30pages).
Office Action dated May 15, 2017 in U.S. Appl. No. 14/462,345, filed Aug. 18, 2014, (57pages).
Office Action dated May 15, 2017 in U.S. Appl. No. 14/555,902, filed Nov. 28, 2014, (8pages).
PCT International Search Report for PCT/US2017/062777, Applicant: Intuit Inc., Form PCT/ISA/210 and 220, dated Feb. 21, 2018 (5pages).
PCT Written Opinion of the International Search Authority for PCT/US2017/062777, Applicant: The Regents of the University of California, Form PCT/ISA/237, dated Feb. 21, 2018 (8pages).
Office Action dated Feb. 22, 2018 in U.S. Appl. No. 14/673,261, filed Mar. 30, 2015, (46pages).
Wikipedia, https://en.wikipedia.org/wiki/Data_structure, "Data Structures", Jan. 12, 2012, entire page (Year:2012) (1page).
Wikipedia, https://en.wikipedia.org/wiki/Tree_(data_structure), "Tree (data structure)", May 15, 2005, entire page (Year:2005) (1page).
Response to Rule 161 Communication dated Jan. 5, 2018 in European Patent Application No. 16843282.1, (16pages).
Communication pursuant to Rules 161(2) and 162 EPC dated Jul. 26, 2017 in European Patent Application No. 16843282.1, (2pages).
Response dated Aug. 10, 2017 in U.S. Appl. No. 14/448,678, (41pages).
Response dated Jul. 5, 2017 in U.S. Appl. No. 14/555,902, (12pages).
Response dated Aug. 7, 2017 in U.S. Appl. No. 14/462,315, (10pages).
Request for Continued Examination and Amendment dated Sep. 6, 2017 in U.S. Appl. No. 14/462,411, (24pages).
Office Action dated Nov. 17, 2016 in U.S. Appl. No. 14/448,922, filed Jul. 31, 2014, inventor: Gang Wang.
Amendment dated Feb. 17, 2016 in U.S. Appl. No. 14/448,922, filed Jul. 31, 2014, inventor: Gang Wang.
Office Action dated Apr. 6, 2017 in U.S. Appl. No. 14/448,922, filed Jul. 31, 2014, inventor: Gang Wang.
Office Action dated Aug. 11, 2016 in U.S. Appl. No. 14/448,962, filed Jul. 31, 2014, inventor: Gang Wang.
Amendment dated Nov. 11, 2016 in U.S. Appl. No. 14/448,962, filed Jul. 31, 2014, inventor: Gang Wang.
Office Action dated Jan. 13, 2017 in U.S. Appl. No. 14/448,962, filed Jul. 31, 2014, inventor: Gang Wang.
Office Action dated Aug. 23, 2016 in U.S. Appl. No. 14/448,986, filed Jul. 31, 2014, inventor: Gang Wang.
Response dated Jan. 23, 2017 in U.S. Appl. No. 14/448,986, filed Jul. 31, 2014, inventor: Gang Wang.
Office Action dated Feb. 17, 2017 in U.S. Appl. No. 14/448,986, filed Jul. 31, 2014, inventor: Gang Wang.

(56) References Cited

OTHER PUBLICATIONS

Office Action dated Jan. 12, 2017 in U.S. Appl. No. 14/462,411, filed Aug. 18, 2014.
Office Action dated Feb. 7, 2017 in U.S. Appl. No. 14/555,543, filed Nov. 26, 2014, inventor: Gang Wang.
PCT International Search Report for PCT/US2016/039919, Applicant: Intuit Inc., Form PCT/ISA/210 and 220, dated Oct. 11, 2016.
PCT Written Opinion of the International Search Authority for PCT/US2016/039919, Applicant: Intuit Inc., Form PCT/ISA/237, dated Oct. 11, 2016.
PCT International Search Report for PCT/US2016/039917, Applicant: Intuit Inc., Form PCT/ISA/210 and 220, dated Oct. 11, 2016.
PCT Written Opinion of the International Search Authority for PCT/US2016/039917, Applicant: Intuit Inc., Form PCT/ISA/237, dated Oct. 11, 2016.
PCT International Search Report for PCT/US2016/039918, Applicant: Intuit Inc., Form PCT/ISA/210 and 220, dated Oct. 11, 2016.
PCT Written Opinion of the International Search Authority for PCT/US2016/039918, Applicant: Intuit Inc., Form PCT/ISA/237, dated Oct. 11, 2016.
PCT International Search Report for PCT/US2016/039913, Applicant: Intuit Inc., Form PCT/ISA/210 and 220, dated Oct. 21, 2016.
PCT Written Opinion of the International Search Authority for PCT/US2016/039913, Applicant: Intuit Inc., Form PCT/ISA/237, dated Oct. 21, 2016.
PCT International Search Report for PCT/US2016/039916, Applicant: Intuit Inc., Form PCT/ISA/210 and 220, dated Oct. 11, 2016.
PCT Written Opinion of the International Search Authority for PCT/US2016/039916, Applicant: Intuit Inc., Form PCT/ISA/237, dated Oct. 11, 2016.
http://en.wikipedia.org/wiki/Dependency_grammar#Semantic_dependencies, printed Mar. 11, 2014.
http://www.webopedia.com/TERM/L/loose_coupling.html, printed Mar. 11, 2014.
http://en.wikipedia.org/wiki/Loose_coupling, printed Mar. 11, 2014.
www.turbotax.com, printed Mar. 11, 2014.
https://turbotax.intuit.com/snaptax/mobile/, printed Mar. 11, 2014.
http://www.jboss.org/drools/drools-expert.html, printed Mar. 11, 2014.
http://en.wikipedia.org/wiki/Drools, printed Mar. 11, 2014.
http://en.wikipedia.org/wiki/Declarative_programming, printed Mar. 11, 2014.
http://www.wisegeek.com/what-is-declarative-programming.htm, printed Mar. 11, 2014.
http://docs.jboss.org/drools/release/5.3.0.Final/drools-expert-docs/html/ch01.html, printed Mar. 11, 2014.
http://quicken.intuit.com/support/help/tax-savings/simplify-tax-time/INF24047.html, updated Jul. 25, 2013, printed Jun. 24, 2014 (11 pages).
http://quicken.intuit.com/support/help/income-and-expenses/how-to-assign-tax-form-line-items-to-a-category/GEN82142.html, updated Aug. 11, 2011, printed Jun. 24, 2014 (2 pages).
http://quicken.intuit.com/support/help/reports--graphs-and-snapshots/track-the-earnings-taxes--deductions--or-deposits-from-paychecks/GEN82101.html, updated May 14, 2012, printed Jun. 24, 2014 (2 pages).
NY State Dep of Taxation, NY State Personal Income Tax MeF Guide for Software Developers, 2012, NY State.
Restriction Requirement dated May 22, 2015 in U.S. Appl. No. 14/097,057, filed Dec. 4, 2013, inventor: Gang Wang.
Response dated Jun. 30, 2015 in U.S. Appl. No. 14/097,057, filed Dec. 4, 2013, inventor: Gang Wang.
Office Action dated Oct. 2, 2015 in U.S. Appl. No. 14/097,057, filed Dec. 4, 2013, inventor: Gang Wang.
Response dated Feb. 29, 2016 in U.S. Appl. No. 14/097,057, filed Dec. 4, 2013, inventor: Gang Wang.
Final Office Action dated Apr. 8, 2016 in U.S. Appl. No. 14/097,057, filed Dec. 4, 2013, inventor: Gang Wang.
Pre-Appeal Brief dated Jun. 24, 2016 in U.S. Appl. No. 14/097,057, filed Dec. 4, 2013, inventor: Gang Wang.
Pre-Appeal Brief Conference Decision dated Aug. 15, 2016 in U.S. Appl. No. 14/097,057, filed Dec. 4, 2013, inventor Gang Wang.
Amendment dated Sep. 13, 2016 in U.S. Appl. No. 14/097,057, filed Dec. 4, 2013, inventor: Gang Wang.
Office Action dated Nov. 4, 2016 in U.S. Appl. No. 14/097,057, filed Dec. 4, 2013, inventor: Gang Wang.
Amendment dated Feb. 6, 2017 in U.S. Appl. No. 14/097,057, filed Dec. 4, 2013, inventor: Gang Wang.
Final Rejection dated Mar. 9, 2017 in U.S. Appl. No. 14/097,057, filed Dec. 4, 2013, inventor: Gang Wang.
Office Action dated Dec. 23, 2016 in U.S. Appl. No. 14/462,345, filed Aug. 18, 2014, inventor: Gang Wang.
Amendment dated Mar. 23, 2017 in U.S. Appl. No. 14/462,345, filed Aug. 18, 2014, inventor: Gang Wang.
Office Action dated Mar. 10, 2017 in U.S. Appl. No. 14/448,678, filed Jul. 31, 2014, inventor: Gang Wang.
Office Action dated Jul. 8, 2015 in U.S. Appl. No. 14/206,682, filed Mar. 12, 2015, inventor: Gang Wang.
Response dated Aug. 31, 2015 in U.S. Appl. No. 14/206,682, filed Mar. 12, 2015, inventor: Gang Wang.
Office Action dated Mar. 9, 2016 in U.S. Appl. No. 14/206,682, filed Mar. 12, 2015, inventor: Gang Wang.
Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Office Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.
Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor: Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang.
Amendment dated Aug. 29, 2016 in U.S. Appl. No. 14/207,121, filed Mar. 12, 2015, inventor: Gang Wang.
Office Action dated Dec. 14, 2016 in U.S. Appl. No. 14/462,315, filed Aug. 18, 2014, inventor: Gang Wang.
Response dated Mar. 14, 2017 in U.S. Appl. No. 14/462,315, filed Aug. 18, 2014, inventor: Gang Wang.
Office Action dated Mar. 21, 2017 in U.S. Appl. No. 14/448,481, filed Jul. 31, 2014, inventor: Gang Wang.
Office Action dated Nov. 29, 2016 in U.S. Appl. No. 14/448,886, filed Jul. 31, 2014, inventor: Gang Wang.
Amendment dated Feb. 28, 2017 in U.S. Appl. No. 14/448,886, filed Jul. 31, 2014, inventor: Gang Wang.
Office Action dated Apr. 20, 2017 in U.S. Appl. No. 14/448,886, filed Jul. 31, 2014, inventor: Gang Wang.
Office Action dated Dec. 28, 2017 in U.S. Appl. No. 14/097,057, filed Dec. 4, 2013, (10pages).
Office Action dated Jan. 12, 2018 in U.S. Appl. No. 14/462,345, filed Aug. 18, 2014, (9pages).
Office Action dated Jan. 30, 2018 in U.S. Appl. No. 14/553,347, filed Nov. 25, 2014, (40pages).
PCT International Preliminary Report on Patentability (Chapter I of the Patent Cooperation Treaty) for PCT/US2016/039917, Applicant: Intuit, Inc., Form PCT/IB/326 and 373, dated Feb. 8, 2018 (13pages).
Response dated Dec. 28, 2017 in U.S. Appl. No. 14/701,149, filed Apr. 30, 2015, (46pages).

(56) References Cited

OTHER PUBLICATIONS

Interview Summary dated Jan. 19, 2018 in U.S. Appl. No. 14/673,555, filed Mar. 30, 2015, (3pages).
Response dated Jan. 3, 2018 in U.S. Appl. No. 14/448,678, filed Jul. 31, 2014, (37pages).
Advisory Action dated Feb. 5, 2018 in U.S. Appl. No. 14/448,678, filed Jul. 31, 2014, (7pages).
Office Action dated Feb. 12, 2018 in U.S. Appl. No. 14/555,553, filed Nov. 26, 2014, (40pages).
Notice of Allowability dated Dec. 22, 2017 in U.S. Appl. No. 14/529,736, filed Oct. 31, 2014, (13pages).
Office Action dated Dec. 28, 2017 in U.S. Appl. No. 14/529,798, filed Oct. 31, 2014, (61pages).
Response dated Jan. 16, 2018 in U.S. Appl. No. 14/530,159, filed Oct. 31, 2014, (13pages).
Interview Summary dated Feb. 5, 2018 in U.S. Appl. No. 14/530,159, filed Oct. 31, 2014, (3pages).
Office Action dated Jan. 12, 2018 in U.S. Appl. No. 14/755,684, filed Jun. 30, 2015, (31pages).
PCT International Preliminary Report on Patentability (Chapter I of the Patent Cooperation Treaty) for PCT/US2016/039919, Applicant: Intuit Inc., Form PCT/IB/326 and 373, dated Jan. 11, 2018, (11pages).
Response dated Feb. 15, 2018 in U.S. Appl. No. 14/206,834, filed Mar. 12, 2014, (36pages).
Interview Summary dated Feb. 15, 2018 in U.S. Appl. No. 14/206,834, filed Mar. 12, 2014, (3pages).
Response dated Jan. 5, 2018 in U.S. Appl. No. 14/555,902, filed Nov. 28, 2014, (14pages).
Response dated Dec. 8, 2017 in U.S. Appl. No. 14/555,939, filed Nov. 28, 2014, (52pages).
Office Action dated Jan. 18, 2018 in U.S. Appl. No. 14/207,121, filed Mar. 12, 2014, (22pages).
Response dated Jan. 31, 2018 in U.S. Appl. No. 14/557,335, filed Dec. 1, 2014, (26pages).
Office Action dated Feb. 9, 2018 in U.S. Appl. No. 14/462,315, filed Aug. 18, 2014, (38pages).
Notice of Allowance and Fee(s) Due dated Jan. 25, 2018 in U.S. Appl. No. 14/448,481, filed Jul. 31, 2014, (62pages).
Interview Summary dated Feb. 9, 2018 in U.S. Appl. No. 14/448,481, filed Jul. 31, 2014, (8pages).
Response dated Dec. 22, 2017 in U.S. Appl. No. 14/698,746, filed Apr. 28, 2015, (15pages).
Office Action dated Jan. 26, 2018 in U.S. Appl. No. 14/461,982, filed Aug. 18, 2014, (94pages).
Interview Summary dated Dec. 15, 2017 in U.S. Appl. No. 14/755,859, filed Jun. 30, 2015, (4pages).
PCT International Preliminary Report on Patentability (Chapter I of the Patent Cooperation Treaty) for PCT/US2016/039918, Applicant: Intuit Inc., Form PCT/IB/326 and 373, dated Jan. 11, 2018, (11pages).
Response dated Jan. 10, 2018 in U.S. Appl. No. 14/448,962, filed Jul. 31, 2014, (27pages).
Interview Summary dated Feb. 20, 2018 in U.S. Appl. No. 14/448,962, filed Jul. 31, 2014, (3pages).
Response dated Feb. 16, 2018 in U.S. Appl. No. 14/448,986, filed Jul. 31, 2014, (16pages).
Office Action dated Feb. 8, 2018 in U.S. Appl. No. 14/462,411, filed Aug. 18, 2014, (76pages).
Office Action dated Feb. 5, 2018 in U.S. Appl. No. 14/555,334, filed Nov. 26, 2014, (52pages).
Response dated Jan. 11, 2018 in U.S. Appl. No. 14/701,030, filed Apr. 30, 2015, (35pages).
Response dated Dec. 22, 2017 in U.S. Appl. No. 14/673,646, filed Mar. 30, 2015, (22pages).
Interview Summary dated Dec. 28, 2017 in U.S. Appl. No. 14/673,646, filed Mar. 30, 2015, (3pages).
Response dated Feb. 13, 2018 in U.S. Appl. No. 14/462,397, filed Aug. 18, 2014, (33pages).
Cronin, Julie-Anne et al., Distributing the Corporate Income Tax: Revised U.S. Treasury Methodology, May 2012, Department of Treasury, web, 2-31 (Year:2012) (34pages).
Notice of Allowance and Fee(s) Due dated Feb. 20, 2018 in U.S. Appl. No. 14/675,166, filed Mar. 31, 2015, (52pages).
Interview Summary dated Dec. 21, 2017 in U.S. Appl. No. 14/555,222, filed Nov. 26, 2014, (2pages).
Office Action dated Feb. 5, 2018 in U.S. Appl. No. 14/555,222, filed Nov. 26, 2014, (4pages).
Response dated Dec. 18, 2017 in U.S. Appl. No. 14/555,543, filed Nov. 26, 2014, (20pages).
Advisory Action dated Jan. 17, 2018 in U.S. Appl. No. 14/555,543, filed Nov. 26, 2014, (3pages).
Response dated Jan. 18, 2018 in U.S. Appl. No. 14/555,543, filed Nov. 26, 2014, (20pages).
Office Action dated Feb. 14, 2018 in U.S. Appl. No. 14/555,543, filed Nov. 26, 2014, (18pages).
Response dated Jan. 25, 2018 in U.S. Appl. No. 14/700,981, filed Apr. 30, 2015, (30pages).
Response dated Dec. 26, 2017 in U.S. Appl. No. 14/673,555, filed Mar. 30, 2015, (22pages).

\* cited by examiner

FIG. 3 → Transform

| | $Q_A$ | $Q_B$ | $Q_C$ | $Q_D$ | $Q_E$ | $Q_F$ | $Q_G$ | Goal |
|---|---|---|---|---|---|---|---|---|
| Rule₁ | Y | ? | N | ? | ? | ? | ? | Yes |
| Rule₂ | Y | ? | Y | ? | ? | ? | Y | Yes |
| Rule₃ | N | Y | ? | ? | Y | ? | Y | Yes |
| Rule₄ | N | Y | ? | ? | N | N | ? | Yes |
| Rule₅ | N | N | ? | N | ? | N | ? | Yes |

ACA Topic
ZIP Code: 92129
AGI: 50,000
Tax Exempt Interest: 500
Exemption? NO
Coverage? NO PLAN ⊕ Shared Responsibility Penalty is $405 because Deficit in Coverage caused ACA Penalty to apply and then was no exemption.

FIG. 10B

ACA Topic
ZIP Code: 92129
AGI: 50,000
Tax Exempt Interest: 500
Exemption? NO
Coverage? NO PLAN ⊖ Shared Responsibility Penalty is $405 because Deficit in Coverage caused ACA Penalty to apply and then was no exemption.

• Deficit in Coverage was present because you did not enroll in qualified insurance plan

FIG. 11A

ACA Topic
ZIP Code: 92129
AGI: 50,000
Tax Exempt Interest: 500
Exemption? NO
Coverage? NO PLAN ⊖ Shared Responsibility Penalty is $405 because Deficit in Coverage caused ACA Penalty to apply and then was no exemption.

⊕ Calculated ACA Penalty ($405) is $310 above minimum penalty and $394 below maximum penalty

FIG. 11B

ACA Topic
ZIP Code: 92129
AGI: 50,000
Tax Exempt Interest: 500
Exemption? NO
Coverage? NO PLAN ⊖ Shared Responsibility Penalty is $405 because Deficit in Coverage caused ACA Penalty to apply and then was no exemption.

⊖ Calculated ACA Penalty ($405) is $310 above minimum penalty and $394 below maximum penalty ⊕ Calculated ACA Penalty ($405) is 1% of taxable income ($40,500.00)

SYSTEMS, METHODS AND ARTICLES FOR GENERATING SUB-GRAPHS OF A TAX CALCULATION GRAPH OF A TAX PREPARATION SYSTEM

SUMMARY

Embodiments of the present invention are directed to computerized systems and methods for preparing an electronic tax return using a tax return preparation application; and more particularly, to systems and methods for generating a sub-graph of a tax calculation graph used by a tax calculation engine to perform tax calculation operations which can be used for creating a calculator for a tax topic and/or for modifying the granularity of questions requesting tax data in preparing a tax return.

The embodiments of the present invention may be implemented on and/or within a tax return preparation system comprising a tax preparation software application executing on a computing device. The tax return preparation system may operate on a new construct in which tax rules and the calculations based thereon are established in declarative data-structures, namely, completeness model(s) and tax calculation graph(s). The tax calculation graph(s) comprise a plurality of nodes including input nodes, functional nodes, and function nodes. The tax calculation graph(s) may be a single overall tax calculation graph which includes all calculations for all of the tax topics (e.g., gross income, which has sub-topics of interest income, investment income, employment income, self-employment income; affordable care act penalty; deductions, such as dependent deductions, itemized deductions, etc.) of the tax code, or a plurality of tax calculation graphs each covering particular tax topics and sub-topics which may be compiled to form the overall tax calculation graph.

The tax calculation graph(s) are configured with a plurality of calculation paths wherein each calculation path connects a plurality of nodes which are data dependent such that a node is connected to another node if the node depends on the other node. In addition, as used herein, a calculation path from a first node "leads" or is "leading" to a second node if the second node is directly or indirectly dependent on the first node along a connected path of nodes. Also, as used herein, a calculation path "leading" or "along" a calculation path from a start node to an end node on a tax calculation graph includes the start node and end node. Use of these data-structures permits the user interface to be loosely connected or even divorced from the tax calculation engine and the data used in the tax calculations. Tax calculations are dynamically calculated based on tax-related data that is input from a user, derived from sourced data, or estimated. A smart tax logic agent running on a set of rules can review current run time data and evaluate missing tax data necessary to prepare and complete a tax return. The tax logic agent proposes suggested questions to be asked to a user to fill in missing blanks. This process can be continued until completeness of all tax topics has occurred. A completed tax return (e.g., a printed tax return or an electronic tax return) can then be electronically prepared and filed (electronically and/or in paper form) with respect to the relevant taxing jurisdictions.

The completeness model(s) comprise a data structure that captures all the conditions necessary to obtain all of the tax data necessary to complete a tax return that can be filed with the pertinent tax agency. Similar to the calculation graph(s), the completeness model(s) (also referred to as "completion model(s)) can comprehensively cover all tax topics, or they can be a plurality of completeness models each covering particular tax topics and sub-topics which may combined form the overall completeness model. The completeness model may be embodied in various forms. As a couple examples, the completeness model(s) may be completeness graphs (also referred to as "completion graphs") such as a decision tree, or the completeness model(s) may be in the form of decision tables representing tax questions for obtaining tax data for each tax topic and the logic relating the tax questions to other tax questions and/or completion of the tax topic. For instance, answers and/or entry of tax data in response to certain tax questions are logically related to other tax questions in the decision table and/or a completion goal for the tax topic indicating that the tax topic is completed.

In another aspect of the tax return preparation system, the system is configured to operate the computing device to establish a connection to a data store configured to store user-specific tax data therein. The computing device executes a tax calculation engine configured to read and write tax calculation data to and from the shared data store, the tax calculation engine using one or more of the tax calculation graphs specific to particular tax topics. The computing device executes a tax logic agent, the tax logic agent reading from the shared data store and a plurality of decision tables collectively representing a completeness model for computing tax liability or a portion thereof, the tax logic agent outputting one or more suggestions for missing tax data based on an entry in one of the plurality of decision tables. The computing device executes a user interface manager configured to receive the one or more suggestions and present to a user one or more questions based on the one or more suggestions via a user interface, wherein a user response to the one or more questions is input to the shared data store. The user interface manager is configured to generate and display a question screen to the user. The question screen includes a question for the user requesting tax data and is also configured to receive the tax data from the user in the form of input from the user. The user interface manager which receives the suggestion(s) selects one or more suggested questions to be presented to a user. Alternatively, the user interface manager may ignore the suggestion(s) and present a different question or prompt to the user.

In the event that all tax topics are covered, the tax logic agent, instead of outputting one or more suggestions for missing tax data may output a "done" instruction to the user interface manager. The computing device may then prepare a tax return based on the data in the shared data store. The tax return may be a conventional paper-based return or, alternatively, the tax return may be an electronic tax return which can then be e-filed.

In some situations, it may be desirable to modify the tax return preparation system to adjust the granularity of tax questions presented to a user. For example, at a high level of granularity, such as for basic users, the system may ask itemized tax questions requesting an itemized listing of tax data. As an example, for investment income, the tax questions may request tax data for each investment transaction, such as each purchase and sale of stock. At a lower level of granularity, such as for professional users, it may be preferable to only ask for the total investment income. In one manner of accomplishing this modification of the granularity of tax questions, the nodes on the tax calculation graphs corresponding to the desired level of granularity are re-configured to be user enterable nodes, and the higher level nodes of the tax calculation graph which lead to the re-configured nodes (which includes the higher level input nodes corresponding to tax data to be input by a user) are ignored (i.e., excluded from the tax calculation graph). In other words, a new sub-graph of the tax calculation graph is generated which excludes the nodes of the tax calculation graph having a calculation path leading to the user enterable nodes.

Accordingly, in one embodiment of the present invention, a system is provided for modifying a level of detail of tax questions for obtaining user enterable tax data. The system may comprise various components of the tax preparation system as described above, including a computing device and a data store in communication with the computing device and configured to store user-specific tax data therein. The system also includes a tax calculation graph as described above, having an additional feature in that one or more of the functional nodes and/or function nodes each include a user selectable tag for selectably configuring such node as a user enterable node, wherein the value for the user enterable node is entered by a user. As used herein, the term "user enterable node" means a non-input node which is re-configured to be a node in which a user enters a value for the node. In other words, a "user enterable node" is a node which a user enters a set value for the node, as opposed to the value of the node being calculated based on the value of input node(s) and function(s) defined for the node, as originally configured in the tax calculation graph. Thus, to modify the granularity of tax questions, such as for a tax calculation graph for an entire tax return or for a certain tax topic, a user selects one or more nodes of the tax calculation graph to selectably configure such node(s) as user enterable nodes. Typically, a target node is also defined, which may be user selected or a default value. For example, a target node may be an endpoint node for a tax topic, such as gross income, or adjusted gross income, etc. A default target node may be a final tax return result, such as tax refund or tax owed, or the endpoint node of a tax topic for the nodes selected as user enterable nodes. As described below, the target node is useful in generating a sub-graph of the tax calculation graph.

In another aspect, the system further comprises a sub-graph engine configured to generate a sub-graph of the tax calculation graph based upon the target node and the user enterable nodes selected by the user. The sub-graph engine generates a sub-graph which includes all nodes along each calculation path leading from each user enterable node to the target node; and excludes all nodes of the tax calculation graph which only have a calculation path leading to only one or more user enterable nodes, and all nodes of the tax calculation graph which do not have a calculation path leading to target node. The sub-graph engine can exclude the excluded nodes by actually deleting them from the tax calculation graph or by setting an excluded tag for the excluded nodes indicating the node is excluded.

In another feature, the sub-graph engine may generate the sub-graph by analyzing the calculation paths. The sub-graph engine determines all of the nodes along each calculation path of the tax calculation graph leading from each user enterable node to the target node. These nodes will be included in the sub-graph, and for convenience of nomenclature, they may be referred to as "first sub-graph nodes."

In some cases, the selection of the user enterable nodes may not cover all of the calculation paths leading to the target node. For instance, there may still be a calculation path from an input node to the target node which does not pass through one of the user enterable nodes. This may indicate that the selection of user enterable nodes was incomplete, or that it is intended that the nodes along calculation paths not including a user enterable node should be part of the final sub-graph. Thus, the sub-graph engine determines any calculation paths leading from an input node to the target node which do not include a user enterable node. These calculation paths are referred to as "open paths." When open paths are identified, the sub-graph engine may request the user to select additional user enterable nodes along the open paths, and receives a selection of one or more additional user enterable node(s). The sub-graph engine determines all of the nodes along each calculation path leading from each additional user enterable node to the target node. These nodes will also be a part of the final sub-graph and are referred to as "second sub-graph nodes."

The sub-graph engine then generates the final sub-graph consisting essentially (or consisting only) of the first sub-graph nodes and the second sub-graph nodes, if any of each type of sub-graph node have been determined as described above. The term "consisting essentially of" in regards to the nodes of a sub-graph means that the sub-graph does not include any nodes which materially affect the compactness of the sub-graph, but may include a small number of nodes as artifacts (e.g. less than 2%, less than 5% or less than 10% of the total number of nodes in the sub-graph) which do not affect the calculation of the sub-graph.

Even after a selection of additional user enterable node(s), there may still be open paths. So, in still another aspect, the sub-graph engine may determine any remaining open paths which do not include a user enterable node or an additional user enterable node. The sub-graph engine determines all nodes along each of the remaining open paths, which will also be a included in the final sub-graph, and are referred to as "third sub-graph nodes." In this case, the sub-graph engine generates the final sub-graph consisting essentially of the first sub-graph nodes, the second sub-graph nodes, and the third sub-graph nodes, if any of each type of sub-graph node have been determined as described above.

In yet another aspect, the selection of user enterable nodes may be invalid in that there is a calculation path between a first user enterable node (including additional user enterable node(s), as described above) and a second user enterable node (including additional user enterable node(s)), in other words the first user enterable node and second user enterable node are interdependent. This may be problematic because the values for the two interdependent user enterable nodes may be inconsistent with the proper tax calculations, and/or have other inconsistencies. Thus, the sub-graph engine may be further configured to determine whether there is a calculation path between a first user enterable node and a second user enterable node. When there are interdependent user enterable nodes, the sub-graph engine notifies a user that the selection of the first user enterable node and second user enterable node is invalid, and requests a revised selection of user enterable nodes. The sub-graph engine may then repeat the interdependency check for the revised selection of user enterable nodes. Once a valid selection is obtained, the sub-graph engine determines the final sub-graph based upon the revised and valid selection of user enterable nodes.

In another feature, the sub-graph engine may generate the sub-graph by first determining an initial construct sub-graph. The sub-graph engine is configured to generate a construct sub-graph comprising all of the nodes of the tax calculation graph along each calculation path leading to the target node. Then, for each user enterable node, the sub-graph engine determines the first sub-graph nodes, second sub-graph nodes and/or third sub-graph nodes, as described above, using the construct sub-graph rather than the entire tax calculation graph.

The sub-graph may be useful for a number of purposes. For example, the sub-graph can be used to modify the granularity of tax questions by modifying the completeness model(s) based on the sub-graph such as by configuring questions and logic represented in the completeness model(s) and corresponding to a node leading to a user enterable node as not needed to complete particular the tax topic. In addition, a sub-graph may be useful as a calculator for calculating the result of a tax topic of the overall tax calculation graph.

Another embodiment of the present invention is directed to computer-implemented methods for modifying a level of detail of tax questions for obtaining user enterable tax data. The methods may be implemented on a tax preparation system, same or similar to that described above. For example, the method may comprise a tax preparation system executing a sub-graph engine determining all of the nodes along each calculation path of the tax calculation graph leading from each user enterable node to the target node wherein such nodes are referred to as first sub-graph nodes. The sub-graph engine also determines any calculation paths leading from an input node to the target node which do not include a user enterable node, such calculation paths referred to as open paths. When one or more open paths are determined, the system prompts the user to select one or more nodes on one or more of the open paths as an additional user enterable node and determining all of the nodes along each calculation path leading from each additional user enterable node to the target node, such nodes referred to as second sub-graph nodes. The sub-graph engine determines any remaining open paths leading from an input node to the target node which do not include a user enterable node or an additional user enterable node, for any remaining open paths, determine all nodes along such remaining open paths, such nodes referred to as third sub-graph nodes. Finally, the sub-graph engine generates a sub-graph consisting essentially of the first sub-graph nodes, the second sub-graph nodes and the third sub-graph nodes.

In additional aspects of the computer implemented method may also include any of the additional aspects and features described herein for the system embodiments for modifying a level of detail of tax questions for obtaining user enterable tax data.

Still another embodiment of the present invention is directed to is directed to an article of manufacture comprising a non-transitory computer readable medium embodying instructions executable by a computer to execute a process according to any of the method embodiments of the present invention for modifying a level of detail of tax questions for obtaining user enterable tax data. For instance, the non-transitory computer readable medium embodying instructions executable by a computer may be configured to execute a process comprising: determining a construct sub-graph comprising all nodes of the tax calculation graph having a calculation path leading to the target node; for each user enterable node, determining all of the nodes along each calculation path of the construct sub-graph leading from each user enterable node to the target node wherein such nodes are referred to as first sub-graph nodes; determining any calculation paths leading from an input node of the construct sub-graph to the target node which do not include a user enterable node, such calculation paths referred to as open paths; when one or more open paths are determined, receiving a selection of a node on one or more of the open paths to be configured as an additional user enterable node, and determining all nodes along each calculation path leading from each additional user enterable node to the target node, such nodes referred to as second sub-graph nodes; determining any remaining open paths leading from an input node to the target node which do not include a user enterable node or an additional user enterable node, and for any remaining open paths, and determining all nodes along such remaining open paths, such nodes referred to as third sub-graph nodes; and generating a final sub-graph consisting essentially of the first sub-graph nodes, second sub-graph nodes third sub-graph nodes.

In additional aspects, the article of manufacture may be further configured according to the additional aspects described herein for the systems and methods for modifying a level of detail of tax questions for obtaining user enterable tax data.

In additional embodiments of the invention, the sub-graph may be utilized in various ways. For example, the system may be configured to modify the detail of questions across different tax preparation applications, such as between a retail version and a professional tax preparer version. The retail version would typically include more detailed questions about tax topics, whereas a profession tax prepare version would typically have less detail such as by excluding questions requesting itemized lists within a tax topic and only requesting a total or previously calculated result. In such case, the system may comprise a granularity control engine which is configured to generate a sub-graph of a tax calculation graph based upon a target node and one or more user enterable nodes, as described above for the sub-graph engine. Indeed, the granularity control engine may comprise a sub-graph engine same as that described above.

The granularity control engine is also configured to generate a modified completeness model of the full completeness model for a particular tax topic in which each question and logic of the full completeness model (also referred to as the "first completeness model" as opposed to the modified completeness model) which is directed to a node on the calculation graph leading to the user enterable nodes is configured as not needed to complete the particular tax topic. In this way, the tax logic agent of the tax preparation software utilizing the sub-graph and the modified completeness model will not recommend questions directed to the nodes leading to the user enterable nodes, thereby modifying the granularity of the questions requesting tax data for a taxpayer in preparing a tax return.

In an additional aspect, the system may further comprise a tax logic agent configured to analyze the modified completeness model to determine one or more suggested tax questions for obtaining missing tax data required to complete the tax calculation graph of the sub-graph. Of course, the tax logic agent will not suggest tax questions which are configured as not needed in the completeness model.

In another aspect, the system may further comprise a user interface manager configured to receive the one or more suggested tax questions from the tax logic agent, analyze the suggested tax questions, and determine one or more tax questions to present in preparing a tax return using a tax preparation system.

In further aspects, the granularity control engine may include one or more of the aspects and features of the system having a sub-graph engine, as described above.

Another embodiment of the present invention is directed to computer-implemented methods for modifying the level of detail of questions requesting tax data for a taxpayer in preparing a tax return in a tax preparation system. The methods may be implemented on the tax preparation system having a granularity control engine, same or similar to the system described above. For instance, the method may comprise a granularity control engine generating a sub-graph of the tax calculation graph based upon a target node and one or more user enterable nodes selected from the nodes of the tax calculation graph. The granularity control engine generates a modified completeness model of the first completeness model in which each question and logic of the first completeness model directed to a node on the calculation graph leading to the user enterable nodes is configured as not needed to complete the tax topic.

In another aspect, the method may also include any of the additional aspects and features described herein for the system embodiments for modifying a level of detail of tax questions for obtaining user enterable tax data. Still another embodiment of the present invention is directed to is directed to an article of manufacture comprising a non-transitory computer readable medium embodying instructions executable by a computer to execute a process according to any of the method embodiments of the present invention for modifying a level of detail of tax questions for obtaining user enterable tax data using a granularity control engine. For instance, the non-transitory computer readable medium embodying instructions executable by a computer may be configured to execute a process comprising: generating a sub-graph of the tax calculation graph based upon a target node and one or more user enterable nodes selected from the nodes of the tax calculation graph; and generating a modified completeness model of the first completeness model in which each question and logic of the first completeness model directed to a node on the calculation graph leading to the user enterable nodes is configured as not needed to complete the tax topic.

In additional aspects, the article of manufacture may be further configured according to the additional aspects described herein for the systems and methods for modifying a level of detail of tax questions for obtaining user enterable tax data utilizing a granularity control engine.

It is understood that the steps of the methods and processes of the present invention are not required to be performed in the order as shown in the figures or as described, but can be performed in any order that accomplishes the intended purpose of the methods and processes.

BRIEF DESCRIPTION OF THE DRAWINGS

FIG. 4 illustrates a decision table based on or derived from the completeness graph of FIG. 3.

FIGS. 10A and 10B illustrate a display of a computing device displaying a narrative explanation that was generated by the explanation engine. The narrative explanation contains multiple phrases that are linked that can be selected to provide additional detailed explanations.

FIGS. 11A and 11B illustrate a display of a computing device displaying a narrative explanation that was generated by the explanation engine. The narrative explanation contains multiple phrases that are linked that can be selected to provide additional detailed explanations.

DETAILED DESCRIPTION OF ILLUSTRATED EMBODIMENTS

Figure 1:
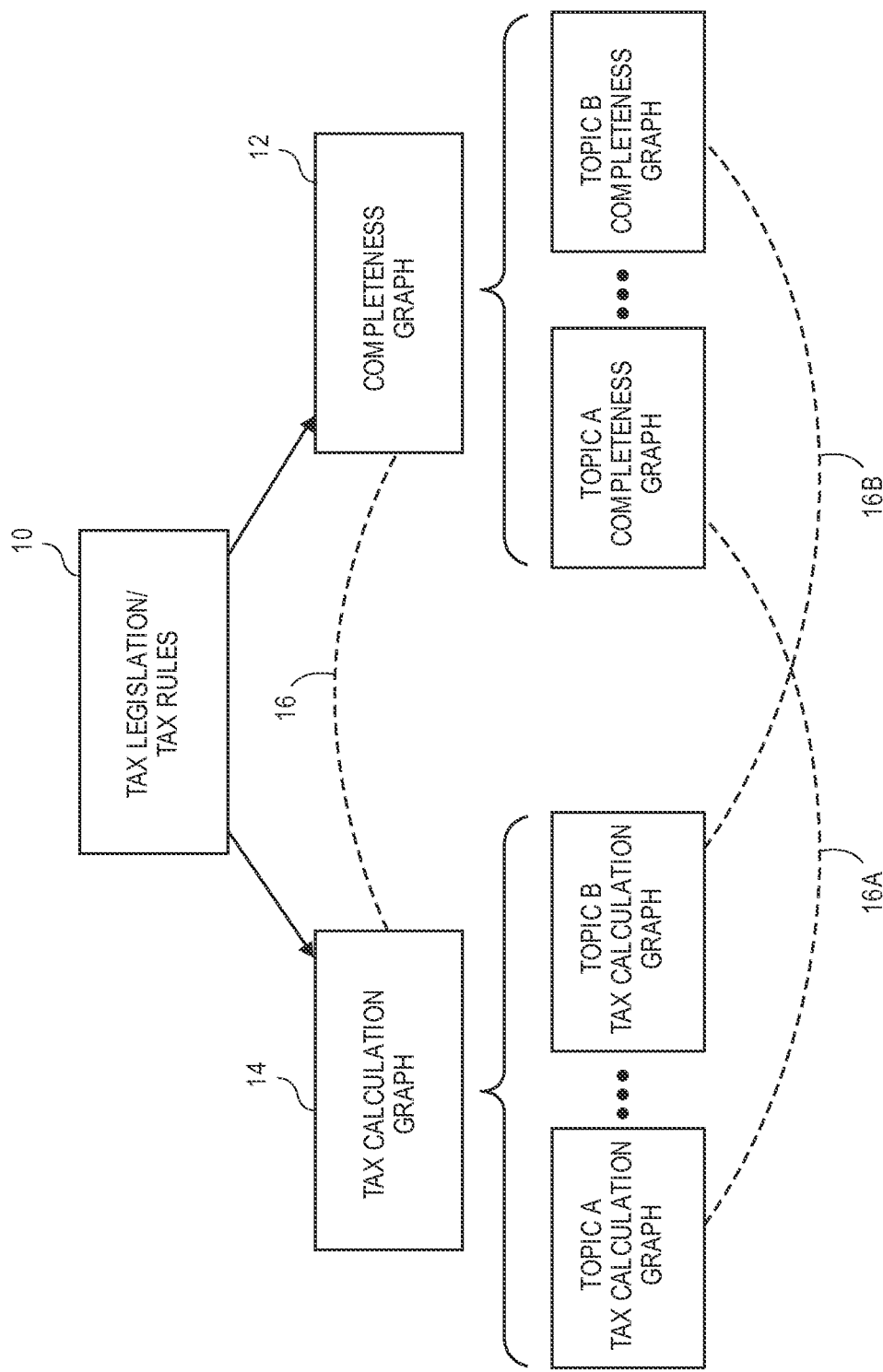
FIG. 1 schematically illustrates how tax legislation/tax rules are parsed and represented by a completeness graph and a tax calculation graph.

Embodiments of the present invention are directed to systems, methods and articles of manufacture for generating a sub-graph of a tax calculation graph for a tax preparation system. The sub-graph may be advantageously utilized in various ways, such as for modifying a level of detail of tax questions for obtaining user enterable tax data from a user of the tax preparation system in preparing a tax return. The system comprises a tax preparation system including a computing device, a data store in communication with the computing device and configured to store user-specific tax data. The system includes a tax calculation graph, as described herein, which is usable by a tax calculation engine of the tax preparation system to calculate a tax return. The system includes a sub-graph engine which is configured to generate a sub-graph of the tax calculation graph based upon a user selected target node of the tax calculation graph (e.g., a target calculated result of the sub-graph) and at least one user selected node to be defined as user-enterable node(s).

For example, a particular function node of may normally be a calculated value based on several values of leaf nodes (input nodes), but it is being re-defined as a user-enterable node in which the value of the node is requested from a user and is input by the user, and received by the tax preparation system. The sub-graph engine is configured to generate the sub-graph, wherein the sub-graph excludes the nodes of the original tax calculation graph which are rendered unnecessary for the calculation of the sub-graph. Thus, the sub-graph excludes (a) all nodes of the original tax calculation graph which only have a calculation path leading to only one or more user enterable nodes and (b) all nodes which do not have a calculation path leading to the selected target node. In other words, the sub-graph includes only those nodes along calculation path(s) leading from a user enterable node or a remaining input node to the target node.

Tax preparation is a time-consuming and laborious process. It is estimated that individuals and businesses spend around 6.1 billion hours per year complying with the filing requirements of the United States federal Internal Revenue Code. Tax return preparation software has been commercially available to assist taxpayers in preparing their tax returns. Tax return preparation software is typically run on a computing device such as a computer, laptop, tablet, or mobile computing device such as a Smartphone. Traditionally, a user has walked through a set of rigidly defined user interface interview screens that selectively ask questions that are relevant to a particular tax topic or data field needed to calculate a taxpayer's tax liability.

In contrast to the rigidly defined user interface screens used in prior iterations of tax preparation software, the present design provides tax preparation software 100 that runs on computing devices 102, 103 (see FIG. 13) and operates on a new construct in which tax rules and the calculations based thereon are established in declarative data-structures, namely, completeness graph(s) and tax calculation graph(s). Completeness graphs 12 (see e.g. FIGS. 1-3) and tax calculation graphs 14 (see e.g. FIGS. 6A-6D) are data structures in the form of trees having nodes and interconnections between the nodes indicating interdependencies. Completeness graphs 12 identify each of the conditions (e.g. questions, criteria, conditions) which may be required to be satisfied to complete a particular tax topic or a complete tax return, and also identifies when all conditions have been satisfied to complete a particular tax topic or, a complete, file-able tax return. The tax calculation graphs 14 semantically describe data dependent nodes, including input nodes, functional nodes, functions, and tax operations, that perform tax calculations or operations in accordance with tax code or tax rules. Examples of these data structures are described in U.S. patent application Ser. Nos. 14/097,057 and 14/448,886, both of which are incorporated by reference as if set forth fully herein.

Use of these data-structures permits the user interface to be loosely connected or even detached from the tax calculation engine and the data used in the tax calculations. Tax calculations are dynamically calculated based on tax data derived from sourced data, estimates, user input, or even intermediate tax calculations that are then utilized for additional tax calculations. A smart tax logic agent running on a set of rules can review current run time data and evaluate missing data fields and propose suggested questions to be asked to a user to fill in missing blanks. This process can be continued until completeness of all tax topics has occurred. An electronic return can then be prepared and filed with respect to the relevant taxing jurisdictions.

FIG. 1 illustrates graphically how tax legislation/tax rules 10 are broken down into a completeness graph 12 and a tax calculation graph 14. In one aspect of the invention, tax legislation or rules 10 are parsed or broken into various topics. For example, there may be nearly one hundred topics that need to be covered for completing a federal tax return. When one considers both federal and state tax returns, there can be well over one hundred tax topics that need to be covered. When tax legislation or tax rules 10 are broken into various topics or sub-topics, in one embodiment of the invention, each particular topic (e.g., topics A, B) may each have their own dedicated completeness graph 12A, 12B and tax calculation graph 14A, 14B as seen in FIG. 1.

Note that in FIG. 1, the completeness graph 12 and the tax calculation graph 14 are interdependent as illustrated by dashed line 16. That is to say, some elements contained within the completeness graph 12 are needed to perform actual tax calculations using the tax calculation graph 14. Likewise, aspects within the tax calculation graph 14 may be needed as part of the completion graph 12. Taken collectively, the completeness graph 12 and the tax calculation graph 14 represent data structures that capture all the conditions necessary to complete the computations that are required to complete a tax return that can be filed. The completeness graph 12, for example, determines when all conditions have been satisfied such that a "fileable" tax return can be prepared with the existing data. The completeness graph 12 is used to determine, for example, that no additional data input is needed to prepare and ultimately print or file a tax return. The completeness graph 12 is used to determine when a particular schema contains sufficient information such that a tax return can be prepared and filed. Individual combinations of completeness graphs 12 and tax calculation graphs 14 that relate to one or more topics can be used to complete the computations required for some sub-calculation. In the context of a tax setting, for example, a sub-selection of topical completeness graphs 12 and tax calculation graphs 14 can be used for intermediate tax results such as Adjusted Gross Income (AGI) or Taxable Income (TI), itemized deductions, tax credits, and the like.

Figure 2:
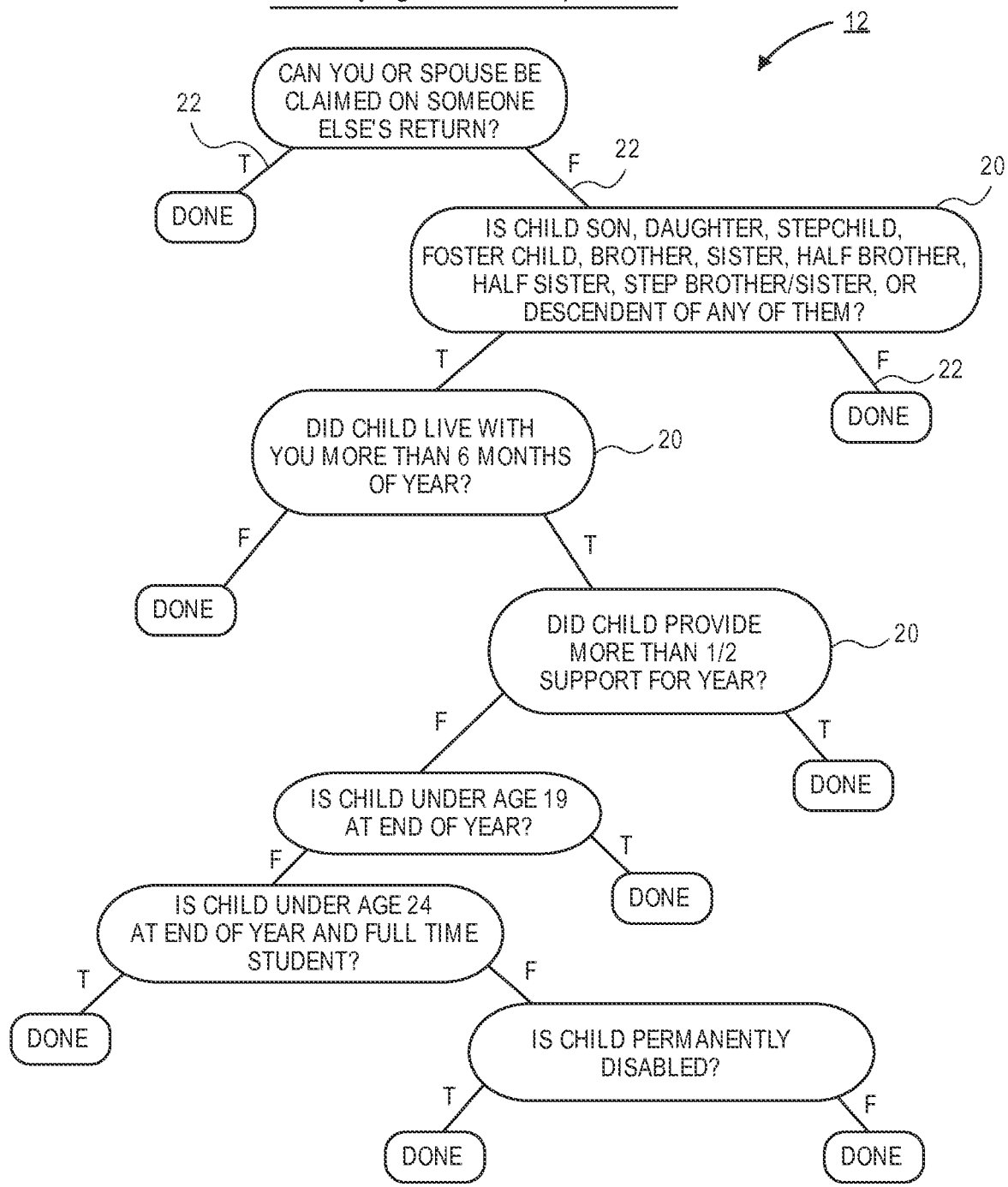
FIG. 2 illustrates an example of a simplified version of a completeness graph related to a qualifying child for purposes of determining deductions for federal income tax purposes.

The completeness graph 12 and the tax calculation graph 14 represent data structures that can be constructed in the form of a tree. FIG. 2 illustrates a completeness graph 12 in the form of a tree with nodes 20 and arcs 22 representing a basic or general version of a completeness graph 12 for the topic of determining whether a child qualifies as a dependent for federal income tax purposes. A more complete flow chart-based representation of questions related to determining a "qualified child" may be found in U.S. patent application Ser. No. 14/097,057, which is incorporated by reference herein. Each node 20 contains a condition that in this example is expressed as a Boolean expression that can be answered in the affirmative or negative. The arcs 22 that connect each node 20 illustrate the dependencies between nodes 20. The combination of arcs 22 in the completeness graph 12 illustrates the various pathways to completion. A single arc 22 or combination of arcs 22 that result in a determination of "Done" represent a pathway to completion. As seen in FIG. 2, there are several pathways to completion. For example, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than 6 months of the year, then your child is not a qualifying dependent. Again, this is a separate IRS requirement for a qualified dependent.

As one can imagine given the complexities and nuances of the tax code, many tax topics may contain completeness graphs 12 that have many nodes with a large number of pathways to completion. However, many branches or lines within the completeness graph 12 can be ignored, for example, when certain questions internal to the completeness graph 12 are answered that eliminate other nodes 20 and arcs 22 within the completeness graph 12. The dependent logic expressed by the completeness graph 12 allows one to minimize subsequent questions based on answers given to prior questions. This allows a minimum question set that can be generated that can be presented to a user as explained herein.

Figure 3:
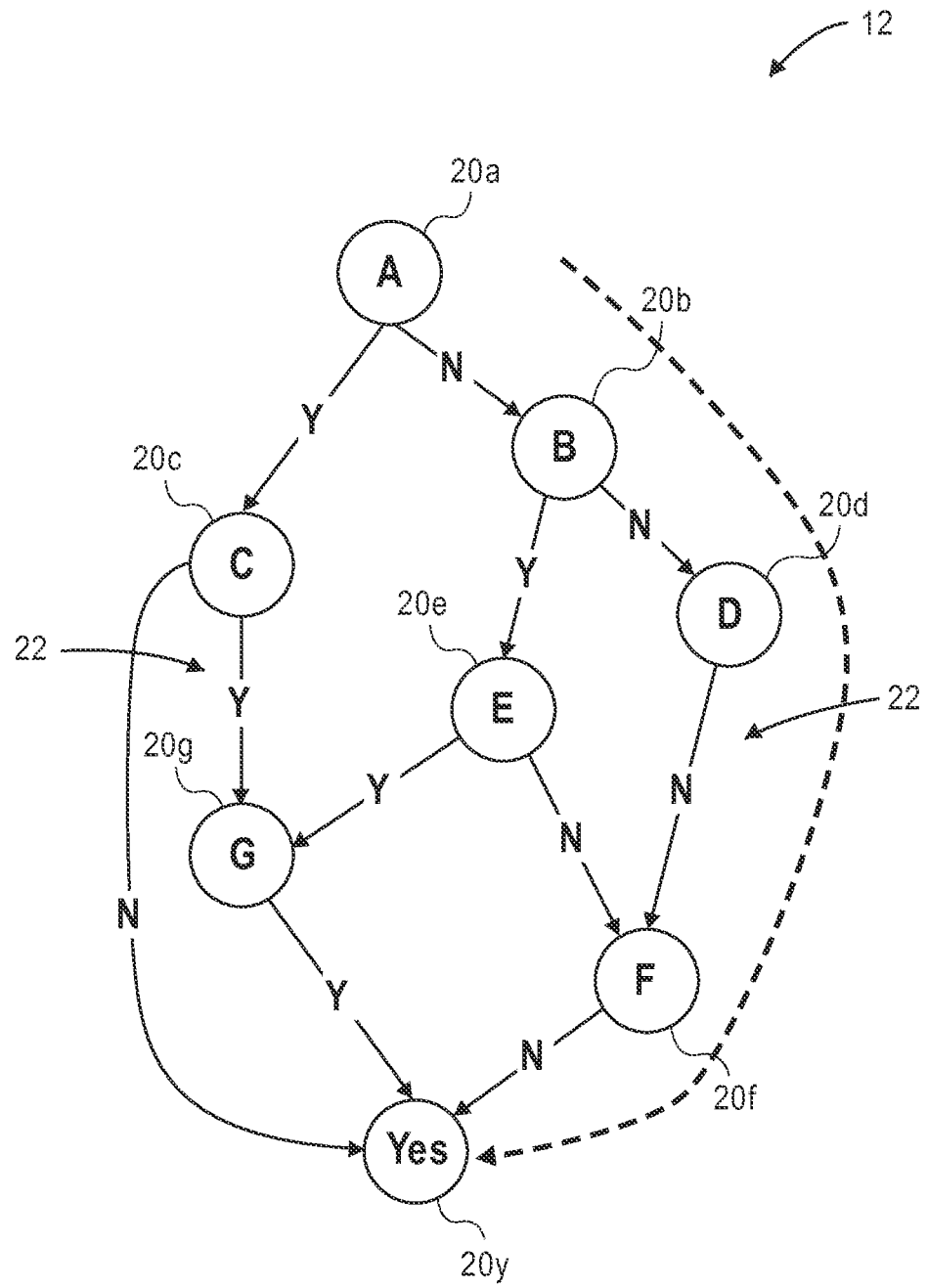
FIG. 3 illustrates another illustration of a completeness graph.

FIG. 3 illustrates another example of a completeness graph 12 that includes a beginning node 20a (Node A), intermediate nodes 20b-g (Nodes B-G) and a termination node 20y (Node "Yes" or "Done"). Each of the beginning node 20a and intermediate nodes 20a-g represents a question. Inter-node connections or arcs 22 represent response options. In the illustrated embodiment, each inter-node connection 22 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options 22, whereas other nodes, such as nodes D, G and F, have one response option 22.

As explained herein, the directed graph or completion graph 12 that is illustrated in FIG. 3 can be traversed through all possible paths from the start node 20a to the termination node 20y. By navigating various paths through the completion graph 12 in a recursive manner, the system can determine each path from the beginning node 20a to the termination node 20y. The completion graph 12 along with the pathways to completion through the graph can be converted into a different data structure or format. In the illustrated embodiment shown in FIG. 4, this different data structure or format is in the form of a decision table 30. In the illustrated example, the decision table 30 includes rows 32 (five rows 32a-e are illustrated) based on the paths through the completion graph 12. In the illustrated embodiment, the columns 34a-g of the completion graph represent expressions for each of the questions (represented as nodes A-G in FIG. 3) and answers derived from completion paths through the completion graph 12 and column 34h indicates a conclusion, determination, result or goal 34h concerning a tax topic or situation, e.g., "Yes—your child is a qualifying child" or "No—your child is not a qualifying child."

Referring to FIG. 4, each row 32 of the decision table 30 represents a tax rule. The decision table 30, for example, may be associated with a federal tax rule or a state tax rule. In some instances, for example, a state tax rule may include the same decision table 30 as the federal tax rule. The decision table 30 can be used, as explained herein, to drive a personalized interview process for the user of tax preparation software 100. In particular, the decision table 30 is used to select a question or questions to present to a user during an interview process. In this particular example, in the context of the completion graph from FIG. 3 converted into the decision table 30 of FIG. 4, if the first question presented to the user during an interview process is question "A" and the user answers "Yes" rows 32c-e may be eliminated from consideration given that no pathway to completion is possible. The tax rule associated with these columns cannot be satisfied given the input of "Yes" in question "A." Note that those cell entries denoted by "?" represent those answers to a particular question in a node that are irrelevant to the particular pathway to completion. Thus, for example, referring to row 32a, when an answer to $Q_A$ is "Y" and a path is completed through the completion graph 12 by answering Question C as "N" then answers to the other questions in Nodes B and D-F are "?" since they are not needed to be answered given that particular path.

After an initial question has been presented and rows are eliminated as a result of the selection, next, a collection of candidate questions from the remaining available rows 32a and 32b is determined. From this universe of candidate questions from the remaining rows, a candidate question is selected. In this case, the candidate questions are questions $Q_C$ and $Q_G$ in columns 34c, 34g, respectively. One of these questions is selected and the process repeats until either the goal 34h is reached or there is an empty candidate list.

Figure 5:
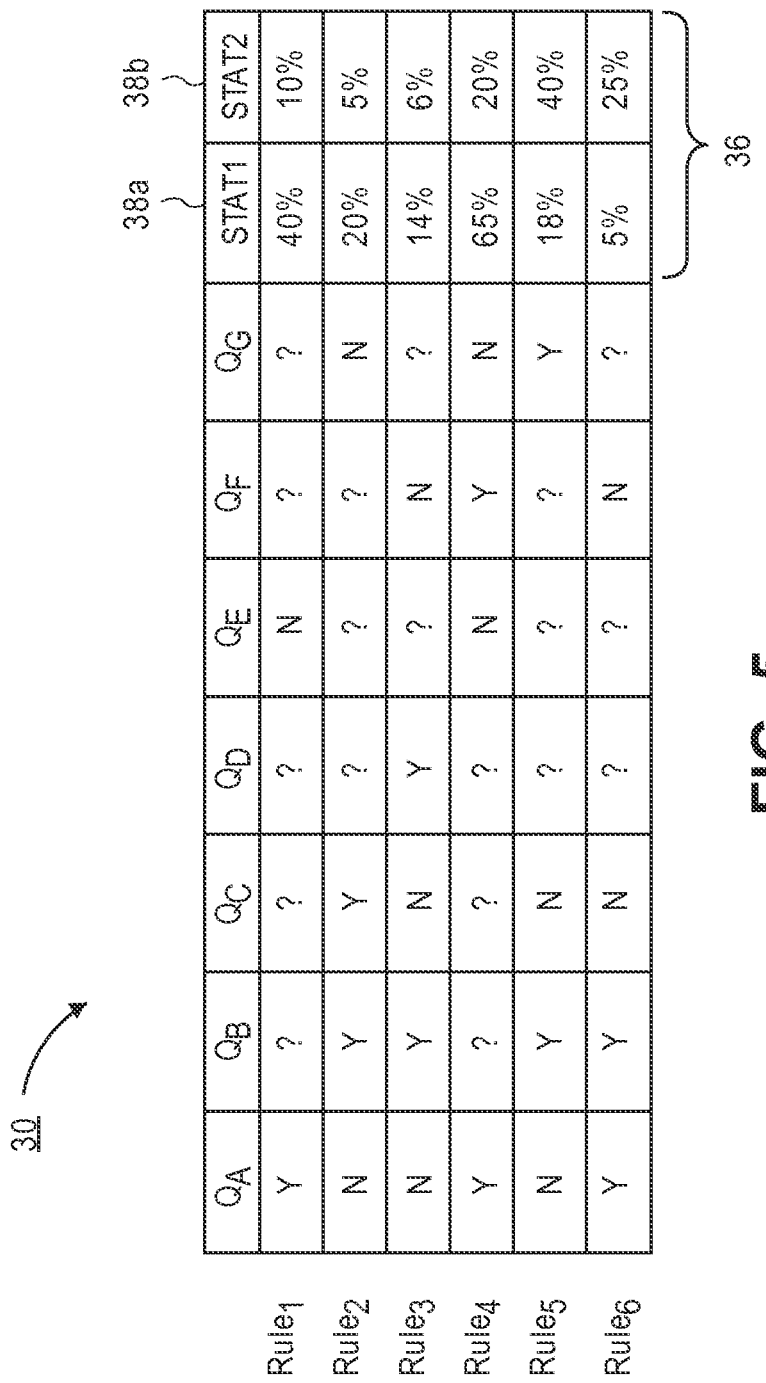
FIG. 5 illustrates another embodiment of a decision table that incorporates statistical data.

FIG. 5 illustrates another embodiment of a decision table 30. In this embodiment, the decision table 30 includes additional statistical data 36 associated with each rule (e.g., rules $R_1$-$R_6$). For example, the statistical data 36 may represent a percentage or the like in which a particular demographic or category of user(s) satisfies this particular path to completion. The statistical data 36 may be mined from existing or current year tax filings. The statistical data 36 may be obtained from a proprietary source of data such as tax filing data owned by Intuit, Inc. The statistical data 36 may be third party data that can be purchased or leased for use. For example, the statistical data 36 may be obtained from a government taxing authority or the like (e.g., IRS). In one aspect, the statistical data 36 does not necessarily relate specifically to the individual or individuals preparing the particular tax return. For example, the statistical data 36 may be obtained based on a number of tax filers which is then classified into one or more classifications. For example, statistical data 36 can be organized with respect to age, type of tax filing (e.g., joint, separate, married filing separately), income range (gross, AGI, or TI), deduction type, geographic location, and the like).

FIG. 5 illustrates two such columns 38a, 38b in the decision table 30 that contain statistical data 36 in the form of percentages. For example, column 38a (STAT1) may contain a percentage value that indicates taxpayers under the age of thirty-five where $Rule_1$ is satisfied. Column 38b (STAT2) may contain a percentage value that indicates taxpayers over the age of thirty-five where $Rule_1$ is satisfied. Any number of additional columns 38 could be added to the decision table 30 and the statistics do not have to relate to an age threshold or grouping. The statistical data 36 may be used, as explained in more detail below, by the tax preparation software 100 to determine which of the candidate questions ($Q_A$-$Q_G$) should be asked to a taxpayer. The statistical data 36 may be compared to one or more known taxpayer data fields (e.g., age, income level, tax filing status, geographic location, or the like) such that the question that is presented to the user is most likely to lead to a path to completion. Candidate questions may also be excluded or grouped together and then presented to the user to efficiently minimize tax interview questions during the data acquisition process. For example, questions that are likely to be answered in the negative can be grouped together and presented to the user in a grouping and asked in the negative—for example, "we think these question do not apply to you, please confirm that this is correct." This enables the elimination of many pathways to completion that can optimize additional data requests of the taxpayer.

Figure 6A:
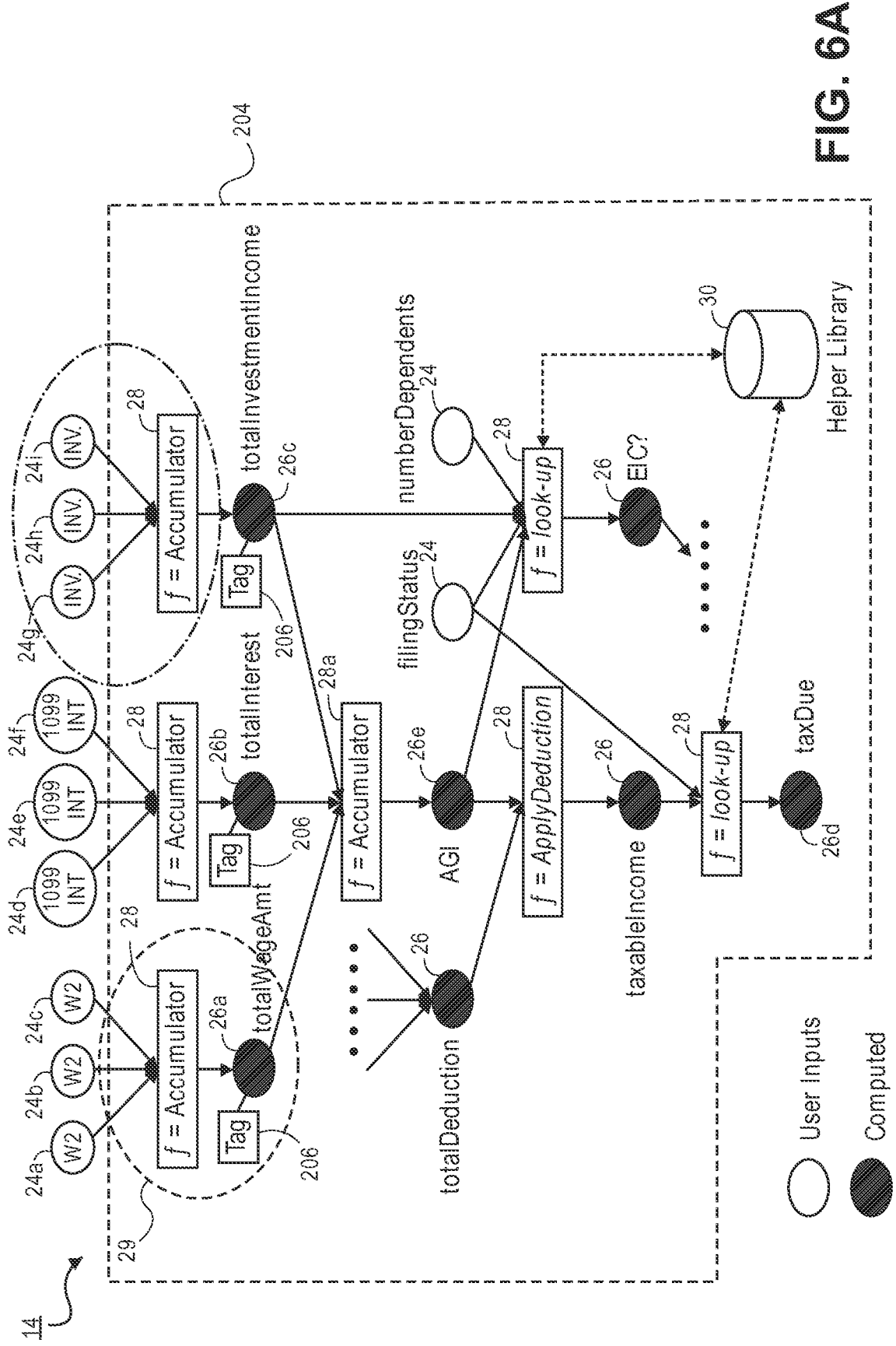
FIG. 6A illustrates an example of a tax calculation graph for an overall tax calculation, according to one embodiment.

FIG. 6A illustrates an example of a tax calculation graph 14. The tax calculation graph 14 semantically describes data dependent tax operations that are used to perform a tax calculation in accordance with the tax code or tax rules 10. The tax calculation graph 14 in FIG. 6A is a simplified view of data dependent tax operations that are used to determine the taxes Due (taxDue) based on various sources of income, deductions, exemptions, and credits. The tax calculation graph 14 is a type of directed graph (which may be composed of a plurality of directed graphs) and, in most situations relevant to tax calculations, is a directed acyclic graph that encodes the data dependencies amongst tax concepts or topics.

In FIG. 6A, various nodes 24 are leaf or input nodes. Examples of leaf nodes 24 in this particular example include data obtained from W-2 forms, data obtained from 1099-INT forms, data obtained from other investment income (INV), filing status, and number of dependents. Typically, though not exclusively, leaf nodes 24 are populated with user inputs. That is to say the user (e.g. a taxpayer) will enter this information from a user interface as described herein. In other embodiments, however, the leaf nodes 24 may be populated with information that is automatically obtained by the tax preparation software 100. For example, in some embodiments, tax documents may be imaged or scanned with relevant data being automatically extracted using Object Character Recognition (OCR) techniques. In other embodiments, prior tax returns may be used by the tax preparation software 100 to extract information (e.g., name, potential dependents, address, and social security number) which can then be used to populate the leaf nodes 24. Online resources such as financial services websites or other user-specific websites can be crawled and scanned to scrape or otherwise download tax related information that can be automatically populated into leaf nodes 24. Additional third party information sources such as credit bureaus, government databases, and the like can also be used by the tax preparation software 100 to obtain information that can then be populated in to respective leaf nodes 24.

In still other embodiments, values for leaf nodes 24 may be derived or otherwise calculated. For example, while the number of dependents may be manually entered by a taxpayer, those dependents may not all be "qualifying" dependents for tax purposes. In such instances, the actual number of "qualified" dependents may be derived or calculated by the tax preparation software 100. In still other embodiments, values for leaf nodes 24 may be estimated as described herein.

Still other internal nodes, referred to as functional nodes 26, semantically represent a tax concept and may be calculated or otherwise determined using a function node 28 (also referred to as a "function 28"). The functional node 26 and the associated function 28 define a particular tax operation 29. For example, as seen in FIG. 6A, tax operation 29 refers to total wage income and is the result of the accumulator function 28 summing all W-2 income from leaf nodes 24. The functional node 26 may include a number in some instances. In other instances, the functional node 26 may include a response to a Boolean expression such as "true" or "false." The functional nodes 26 may also be constant values in some instances. Some or all of these functional nodes 26 may be labeled as "tax concepts" or "tax topics." The combination of a functional node 26 and its associated function 28 relate to a specific tax operation 29 as part of the tax topic.

Interconnected functional node 26 containing data dependent tax concepts or topics are associated with a discrete set of functions 28 that are used to capture domain specific patterns and semantic abstractions used in the tax calculation. The discrete set of functions 28 that are associated with any particular functional node may be commonly re-occurring operations for functions that are used throughout the process of calculating tax liability. For instance, examples of such commonly reoccurring functions 28 include copy, capping, thresholding, accumulation or adding, look-up operations, phase out calculations, comparison calculations, exemptions, exclusions, and the like.

In one embodiment, the entire set of functions 28 that is used to compute or calculate a tax liability is stored within a data store 30 which in some instances may be a database. The various functions 28 that are used to semantically describe data connections between functional nodes 26 can be called upon by the tax preparation software 100 for performing tax calculations. Utilizing these common functions 28 greatly improves the efficiency of the tax preparation software 100 and can be used by a programmer to more easily track and follow the complex nature of the ever-evolving tax code. The common functions 28 also enable easier updating of the tax preparation software 100 because as tax laws and regulations change, fewer changes need to be made to the software code as compared to prior hard-wired approaches.

Importantly, the tax calculation graph 14 and the associated functional node 26 and functions 28 can be tagged and later be used or called upon to intelligently explain to the user the reasoning behind why a particular result was calculated or determined by the tax preparation software 100 program, as explained in more detail below. The functions 28 can be de-coupled from a specific narrow definition and instead be associated with one or more explanations. Examples of common functions 28 found in tax legislation and tax rules include the concepts of "caps" or "exemptions" that are found in various portions of the tax code. One example of a "cap" is the portion of the U.S. tax code that limits the ability of a joint filer to deduct more than $3,000 of net capital losses in any single tax year. There are many other instances of such caps. An example of an "exemption" is one that relates to early distributions from retirement plans. For most retirement plans, early distributions from qualified retirement plans prior to reaching the age of fifty nine and one-half (59%) require a 10% penalty. This penalty can be avoided, however, if an exemption applies such as the total and permanent disability of the participant. Other exemptions also apply. Such exemptions are found throughout various aspects of the tax code and tax regulations.

In some embodiments, the function node 28 may include any number of mathematical or other operations. Examples of functions 28 include summation, subtraction, multiplication, division, and look-ups of tables or values from a database 30 or library as is illustrated in FIG. 6A. It should be understood that the functional node 26 within completion graph 12 and the tax calculation graph 14 may be shared in some instances. For example, AGI is a re-occurring tax concept that occurs in many places in the tax code. AGI is used not only for the mathematical computation of taxes but is also used, for example, to determine eligibility of certain tax deductions and credits. Thus, the AGI node is common to both the completion graph 12 and the tax calculation graph 14.

Figure 6B:
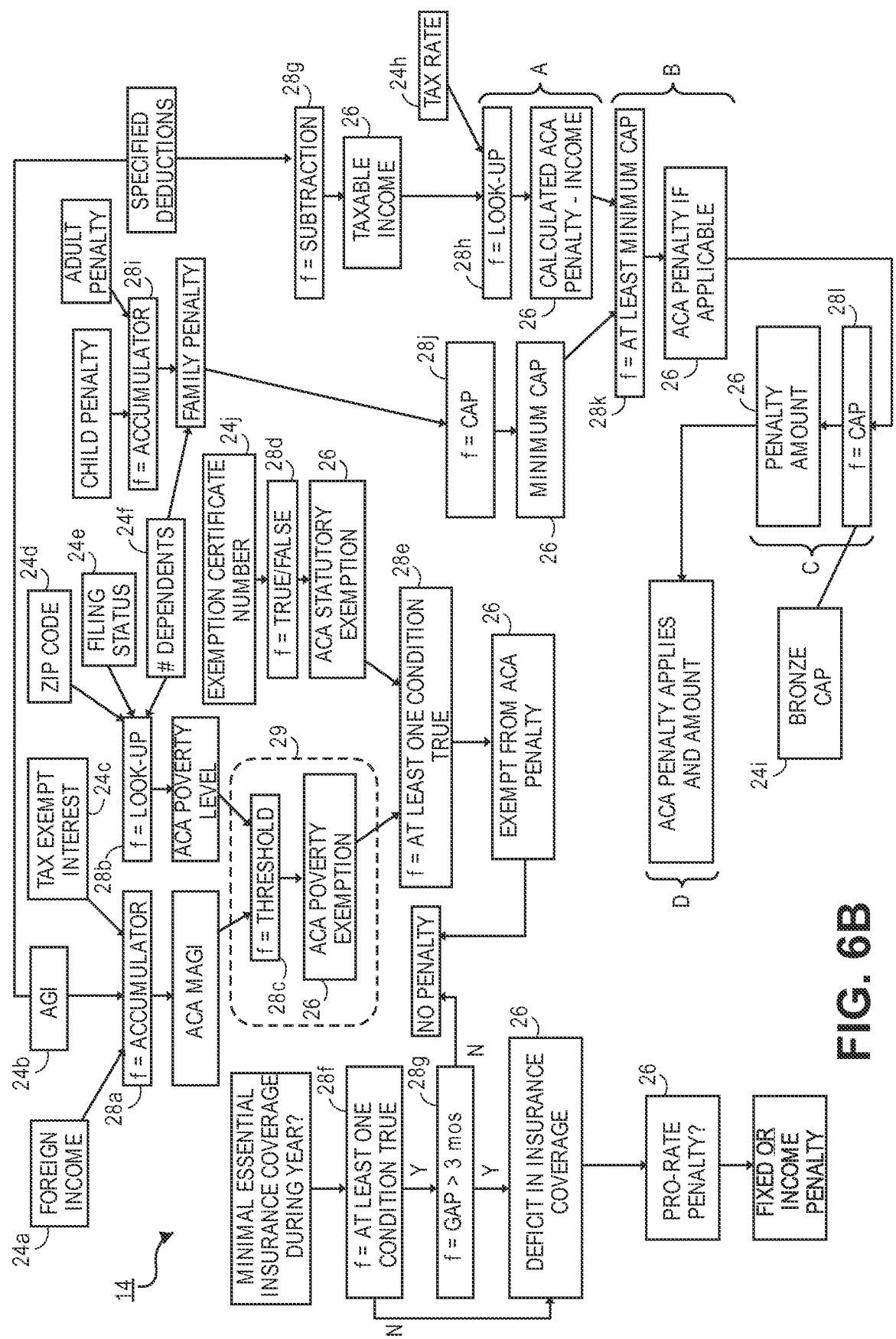
FIG. 6B illustrates an example of a tax calculation graph related to the determination and calculation of a shared responsibility penalty under the Affordable Care, according to one embodiment.

FIG. 6B is the same tax calculation graph as FIG. 6A, except it shows a different impact chain 202, as described in detail below.

Figure 6C:
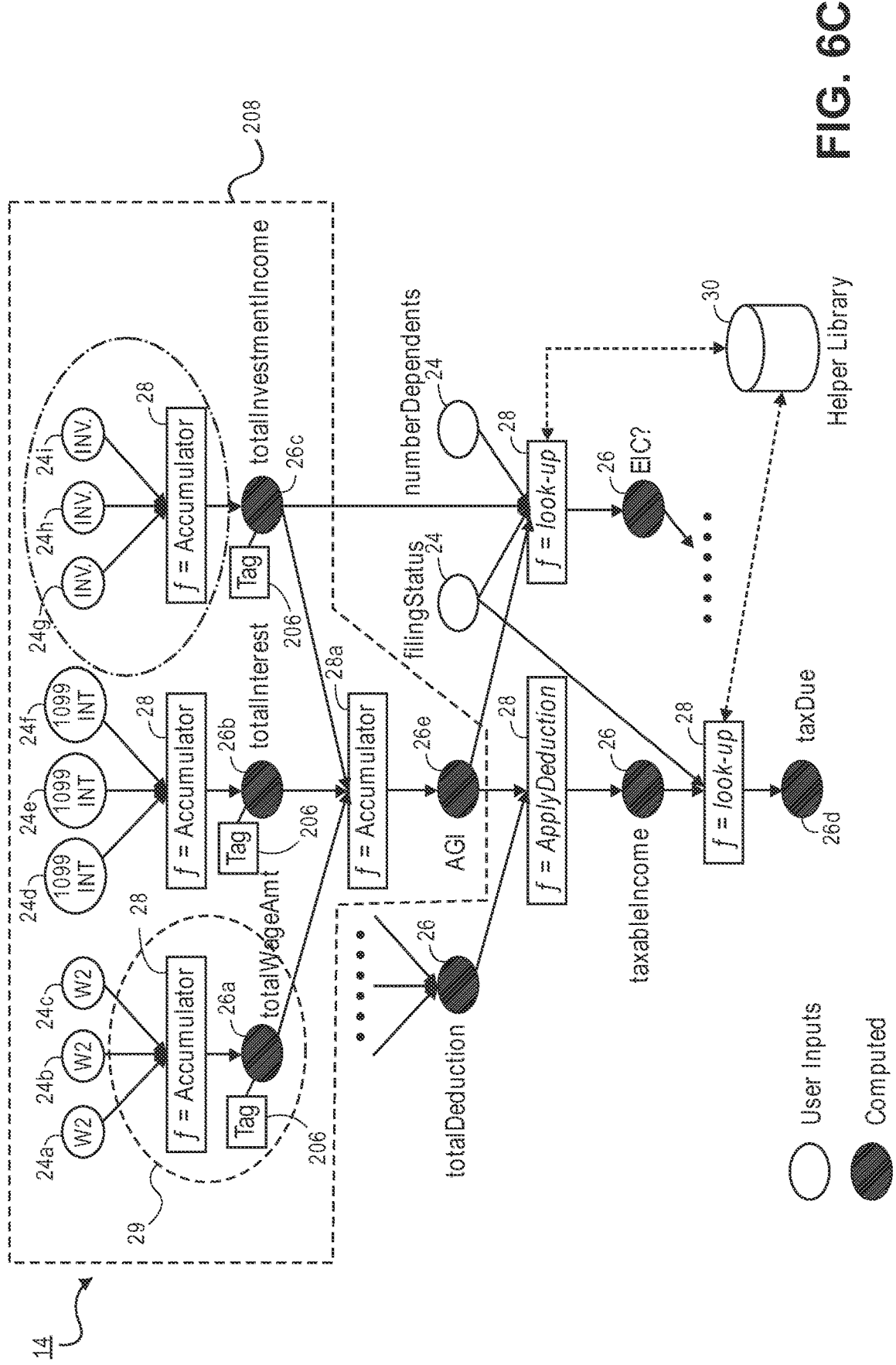
FIG. 6C illustrates an example of a tax calculation graph for an overall tax calculation, according to one embodiment.

FIG. 6C illustrates a detailed example of a tax calculation graph 14 that is used to calculate the amount of penalty under the Affordable Care Act (ACA). Under the ACA, taxpayers are required to have minimum essential health coverage for each month of the year, qualify for an exemption, or make a shared responsibility penalty payment when filing his or her federal tax return. FIG. 6C illustrates a flowchart illustration of a process used to calculate a taxpayer's shared responsibility payment under the ACA (referred to herein as an ACA penalty). FIG. 6C illustrates, for example, various leaf nodes 24a-24j used as part of this calculation to determine the ACA penalty. Leaf nodes 24a-24f are used to calculate the modified adjusted gross income (ACA MAGI) as well as the applicable ACA poverty level. One can see how the accumulator function 28a is used to generate the ACA MAGI in this example by adding foreign income 14a, AGI 24b, and tax exempt interest 24c. Likewise, a look-up function 28b can be used to determine the applicable ACA poverty level based on the taxpayer's zip code 24d, filing status 24e, and number of dependents 24f. The ACA MAGI and the ACA poverty level are then subject to a thresholding function 28c to determine whether the ACA poverty level exemption applies. Under the ACA, if a taxpayer cannot afford basic coverage because the minimum amount one must pay for the premiums exceeds a percentage of household income (i.e., 8%), one is exempt from obtaining minimum essential coverage.

Still referring to FIG. 6C, a taxpayer may be exempt from the requirement to obtain minimum essential coverage by obtaining a different statutory exemption. These exemptions include: religious conscience, health care sharing ministry, a member of Indian tribe, short coverage gap (less than 3 consecutive months), hardship, affordability (already mentioned above), incarceration, and not lawfully present. A true/false Boolean function 28d may be used to determine whether an Exemption Certificate Number (ECN) has been obtained from the taxpayer certifying that one of the statutory exemptions has been satisfied. Another threshold function 28e is applied to determine whether one of the statutory exemptions is satisfied (e.g., affordability or others). If at least one of these statutory conditions is met then the taxpayer is exempt from the ACA shared responsibility payment penalty.

As seen in FIG. 6C, if a taxpayer has obtained minimal essential coverage during the year, there is still the possibility that a penalty may be owed because under the ACA, if there is a gap in coverage for a covered member of the family of more than three (3) months, at least some penalty amount is owed. Function 28f (at least one condition true) is used to determine if there was minimum essential coverage during the year for any period. Function 28g (gap>3 months) is used to determine the gap in coverage in order to gaps in coverage that exceed the 3 month statutory requirement. The gap in coverage penalty, however, may be pro-rated based on the length of the gap in coverage as indicated in FIG. 6C.

In the event there is a penalty, the ACA requires that the penalty be the greater of a percentage of income, net of specified deductions, or a specified penalty that is applied per individual or family. For example, for the 2015 year, the percentage is 2.0 percent and increases to 2.5 percent in subsequent years. FIG. 6B illustrates the use of a subtraction function 28g that utilizes the AGI node 24b to arrive at a taxable income value. A look-up function 28h is used to obtain the applicable tax rate (e.g., 2.0% for 2015) and is used to calculate the income-based ACA penalty.

In order to determine the non-income or "fixed" penalty, an accumulator function 28i is used to determine the penalty. In this example, the calculation pertains to a family wherein the penalty includes a fixed amount for a child ($162.50 per child in 2015) and a fixed amount per adult ($325.00 per adult). Under the ACA, there is a maximum cap of this fixed penalty. For example, in 2015, the maximum family penalty is $975. As seen in FIG. 6C, a cap function 28j is used to determine the minimum cap. Another function 28k that is referred to as "at least minimum cap" is used to determine the greater of the fixed penalty or the income-based penalty. If the income-based penalty is higher than the fixed amount then that value is used, otherwise the fixed penalty amount is used. Still referring to FIG. 6C, another cap function 28l is used to determine whether the penalty has exceeded another cap that is part of the ACA law. Under the ACA, the overall penalty is capped at the national average premium for a bronze level insurance plan. The cap function 28l is used to ensure that the calculated penalty (i.e., the income based penalty) does not exceed this amount. After application of the cap function 28l, the ACA penalty amount is determined.

As seen in FIG. 6C, there are a variety of different functions 28 that are employed as part of the process used to calculate any applicable penalty under the ACA. In some instances, a common function (e.g., cap functions 28j and 28l) is found in multiple locations within the tax calculation graph 14. It should be understood that the functions 28 illustrated in FIG. 6C are illustrative as other functions may be used beyond those specifically illustrated in the drawings.

FIG. 6D is the same tax calculation graph as FIG. 6C, except it shows two different impact chains 202, as described in detail below.

Figure 7:
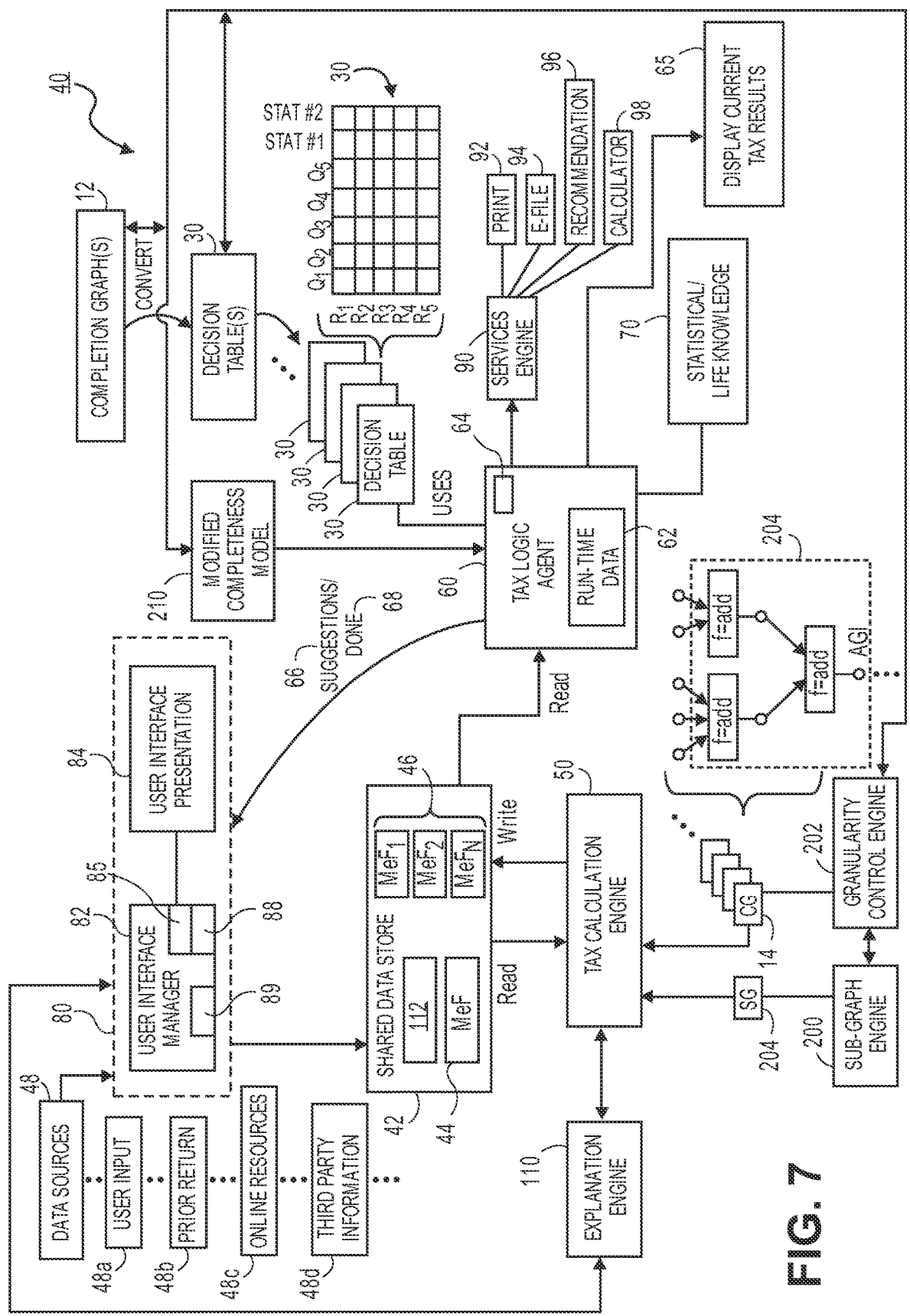
FIG. 7 schematically illustrates a system for calculating taxes using rules and calculations based on declarative data structures, and generating sub-graphs and modifying the granularity of questions for obtaining tax data, according to one embodiment.

FIG. 7 schematically illustrates a tax return preparation system 40 for calculating taxes using rules and calculations based on declarative data structures according to one embodiment. The system 40 includes a shared data store 42 that contains therein a schema 44 or canonical model representative to the data fields utilized or otherwise required to complete a tax return. The shared data store 42 may be a repository, file, or database that is used to contain the tax-related data fields. The shared data store 42 is accessible by a computing device 102, 103 as described herein (e.g., FIG. 13). The shared data store 42 may be located on the computing device 102, 103 running the tax preparation software 100 or it may be located remotely, for example, in cloud environment on another, remotely located computer. The schema 44 may include, for example, a schema based on the Modernized e-File (MeF) system developed by the Internal Revenue Service. The MeF is a web-based system that allows electronic filing of tax returns through the Internet. MeF uses extensible markup language (XML) format that is used when identifying, storing, and transmitting data. For example, each line or data element on a tax return is given an XML name tag as well as every instance of supporting data. Tax preparation software 100 uses XML schemas and business rules to electronically prepare and transmit tax returns to tax reporting agencies. Transmitters use the Internet to transmit electronic tax return data to the IRS MeF system. The IRS validates the transmitted files against the XML schemas and Business Rules in the MeF schema 44.

The schema 44 may be a modified version of the MeF schema used by the IRS. For example, the schema 44 may be an extended or expanded version (designated MeF++) of the MeF model established by government authorities that utilizes additional fields. While the particular MeF schema 44 is discussed herein the invention is not so limited. There may be many different schemas 44 depending on the different tax jurisdiction. For example, Country A may have a tax schema 44 that varies from Country B. Different regions or states within a single country may even have different schemas 44. The systems and methods described herein are not limited to a particular schema 44 implementation. The schema 44 may contain all the data fields required to prepare and file a tax return with a government taxing authority. This may include, for example, all fields required for any tax forms, schedules, and the like. Data may include text, numbers, and a response to a Boolean expression (e.g., True/False or Yes/No). As explained in more detail, the shared data store 42 may, at any one time, have a particular instance 46 of the MeF schema 44 (for MeF++ schema) stored therein at any particular time. For example, FIG. 7 illustrates several instances 46 of the MeF schema 44 (labeled as $MeF_1$, $MeF_2$, $MeF_N$). These instances 46 may be updated as additional data is input into the shared data store 42.

As seen in FIG. 7, the shared data store 42 may import data from one or more data sources 48. A number of data sources 48 may be used to import or otherwise transfer tax related data to the shared data store 42. This may occur through a user interface control 80 as described herein or, alternatively, data importation may occur directly to the shared data store 42 (not illustrated in FIG. 7). The tax related data may include personal identification data such as a name, address, or taxpayer ID. Tax data may also relate to, for example, details regarding a taxpayer's employer(s) during a preceding tax year. This may include, employer name, employer federal ID, dates of employment, and the like. Tax related day may include residential history data (e.g., location of residence(s) in tax reporting period (state, county, city, etc.) as well as type of housing (e.g., rental unit or purchased home). Tax related information may also include dependent-related information such as the number of family members in a household including children. Tax related information may pertain to sources of income, including both earned and unearned income as well. Tax related information also include information that pertains to tax deductions or tax credits. Tax related information may also pertain to medical insurance information. For example, under the new ACA many taxpayers may obtain health insurance through a state or federal marketplace. Such a marketplace may have information stored or accessible that is used in connection with preparing a tax return. Tax information related to premiums paid, coverage information, subsidy amounts (if any), and enrolled individuals can be automatically imported into the shared data store 42.

For example, user input 48a is one type of data source 48. User input 48a may take a number of different forms. For example, user input 48a may be generated by a user using, for example, an input device such as keyboard, mouse, touchscreen display, voice input (e.g., voice to text feature). photograph or image, or the like to enter information manually into the tax preparation software 100. For example, as illustrated in FIG. 7, user interface manager 82 contains an import module 89 that may be used to select what data sources 48 are automatically searched for tax related data. Import module 89 may be used as a permission manager that includes, for example, user account numbers and related passwords. The UI control 80 enables what sources 48 of data are searched or otherwise analyzed for tax related data. For example, a user may select prior year tax returns 48b to be searched but not online resources 48c. The tax data may flow through the UI control 80 directly as illustrated in FIG. 7 or, alternatively, the tax data may be routed directly to the shared data store 42. The import module 89 may also present prompts or questions to the user via a user interface presentation 84 generated by the user interface manager 82. For example, a question may ask the user to confirm the accuracy of the data. For instance, the user may be asked to click a button, graphic, icon, box or the like to confirm the accuracy of the data prior to or after the data being directed to the shared data store 42. Conversely, the interface manager 82 may assume the accuracy of the data and ask the user to click a button, graphic, icon, box or the like for data that is not accurate. The user may also be given the option of whether or not to import the data from the data sources 48.

User input 48a may also include some form of automatic data gathering. For example, a user may scan or take a photographic image of a tax document (e.g., W-2 or 1099) that is then processed by the tax preparation software 100 to extract relevant data fields that are then automatically transferred and stored within the data store 42. OCR techniques along with pre-stored templates of tax reporting forms may be called upon to extract relevant data from the scanned or photographic images whereupon the data is then transferred to the shared data store 42.

Another example of a data source 48 is a prior year tax return 48b. A prior year tax return 48b that is stored electronically can be searched and data is copied and transferred to the shared data store 42. The prior year tax return 48b may be in a proprietary format (e.g., .txf, .pdf) or an open source format. The prior year tax return 48b may also be in a paper or hardcopy format that can be scanned or imaged whereby data is extracted and transferred to the shared data store 42. In another embodiment, a prior year tax return 48b may be obtained by accessing a government database (e.g., IRS records).

An additional example of a data source 48 is an online resource 48c. An online resource 48c may include, for example, websites for the taxpayer(s) that contain tax-related information. For example, financial service providers such as banks, credit unions, brokerages, investment advisors typically provide online access for their customers to view holdings, balances, and transactions. Financial service providers also typically provide year-end tax documents to their customers such as, for instance, 1099-INT (interest income), 1099-DIV (dividend income), 1099-B (brokerage proceeds), 1098 (mortgage interest) forms. The data contained on these tax forms may be captured and transferred electronically to the shared data store 42.

Of course, there are additional examples of online resources 48c beyond financial service providers. For example, many taxpayers may have social media or similar accounts. These include, by way of illustration and not limitation, Facebook, Linked-In, Twitter, and the like. User's may post or store personal information on these properties that may have tax implications. For example, a user's Linked-In account may indicate that a person changed jobs during a tax year. Likewise, a posting on Facebook about a new home may suggest that a person has purchased a home, moved to a new location, changed jobs; all of which may have possible tax ramifications. This information is then acquired and transferred to the shared data store 42, which can be used to drive or shape the interview process described herein. For instance, using the example above, a person may be asked a question whether or not she changed jobs during the year (e.g., "It looks like you changed jobs during the past year, is this correct?". Additional follow-up questions can then be presented to the user.

Still referring to FIG. 7, another data source 48 includes sources of third party information 48d that may be accessed and retrieved. For example, credit reporting bureaus contain a rich source of data that may implicate one or more tax items. For example, credit reporting bureaus may show that a taxpayer has taken out a student loan or home mortgage loan that may be the source of possible tax deductions for the taxpayer. Other examples of sources of third party information 48*d* include government databases. For example, the state department of motor vehicles may contain information relevant to tax portion of vehicle registration fees which can be deductible in some instances. Other government databases that may be accessed include the IRS (e.g., IRS tax return transcripts), and state taxing authorities. Third party resources 48*d* may also include one of the state-based health insurance exchanges or the federal health insurance exchange (e.g., www.healthcare.gov).

Figure 14:
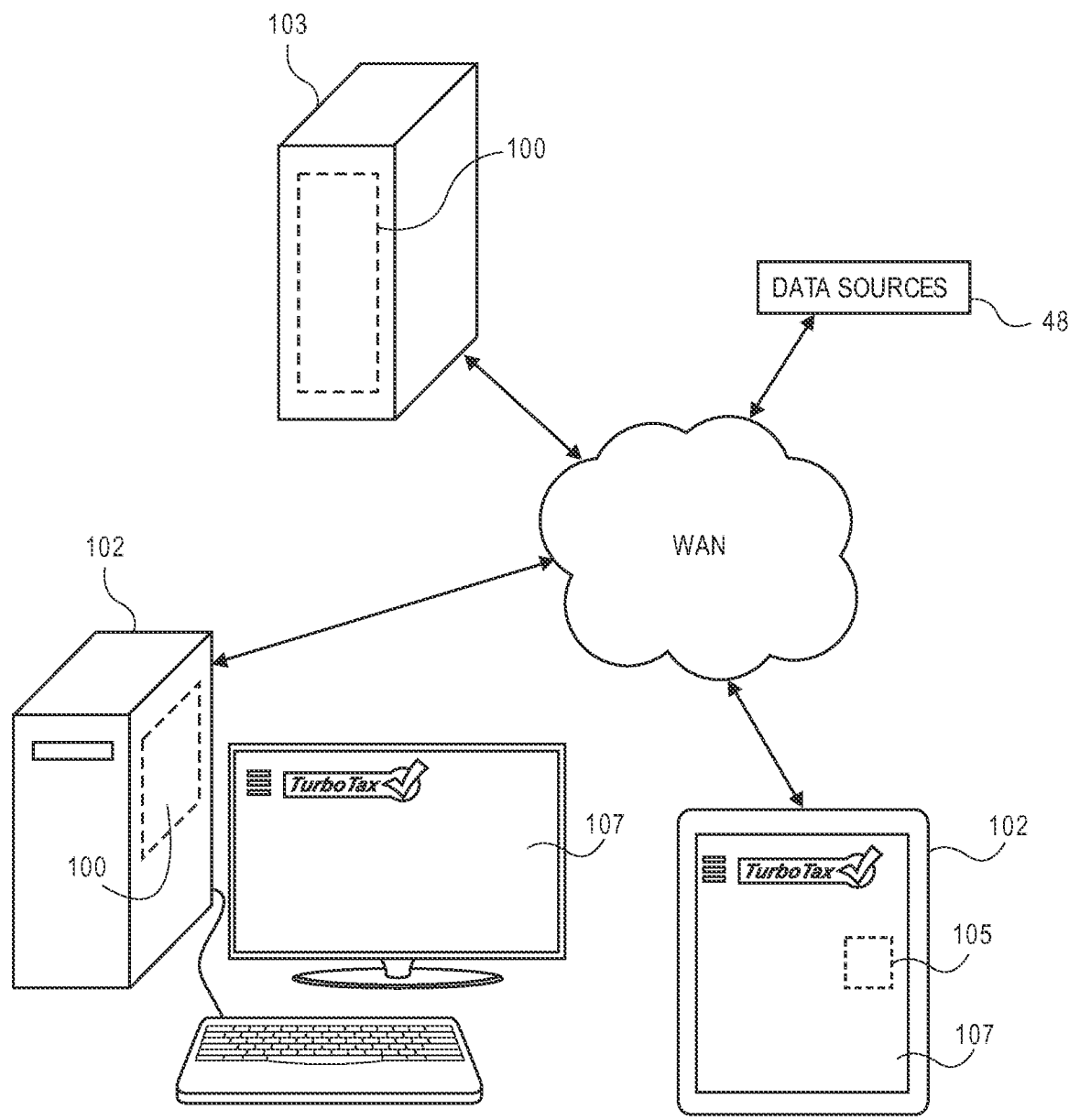
FIG. 14 illustrates the implementation of tax preparation software on various computing devices, according to one embodiment.

Referring briefly to FIG. 14, the tax preparation software 100 including the system 40 of FIG. 7 is executed by the computing device 102, 103. Referring back to FIG. 7, the tax return preparation software 100 executed by the computing device 102, 103 includes a tax calculation engine 50 that computes one or more tax calculations based on the tax calculation graph(s) 14 and the available data at any given instance within the schema 44 in the shared data store 42. The tax calculation engine 50 may calculate a final tax due amount, a final refund amount, or one or more intermediary calculations (e.g., taxable income, AGI, earned income, un-earned income, total deductions, total credits, alternative minimum tax (AMT) and the like). The tax calculation engine 50 utilizes the one or more calculation graphs 14 as described previously in the context of FIGS. 1, 6A and 6B. In one embodiment, a series of different calculation graphs 14 are used for respective tax topics. These different calculation graphs 14 may be coupled together or otherwise compiled as a composite calculation graph 14 to obtain an amount of taxes due or a refund amount based on the information contained in the shared data store 42. The tax calculation engine 50 reads the most current or up to date information contained within the shared data store 42 and then performs tax calculations. Updated tax calculation values are then written back to the shared data store 42. As the updated tax calculation values are written back, new instances 46 of the canonical model 46 are created. The tax calculations performed by the tax calculation engine 50 may include the calculation of an overall tax liability or refund due. The tax calculations may also include intermediate calculations used to determine an overall tax liability or refund due (e.g., AGI calculation). Tax calculations include, for example, the ACA penalty that is described in FIG. 6B as one illustrative example.

Still referring to FIG. 7, the system 40 includes a tax logic agent (TLA) 60. The TLA 60 operates in conjunction with the shared data store 42 whereby updated tax data represented by instances 46 are read to the TLA 60. The TLA 60 contains run time data 62 that is read from the shared data store 42. The run time data 62 represents the instantiated representation of the canonical tax schema 44 at runtime. The TLA 60 may contain therein a rule engine 64 that utilizes a fact cache to generate either non-binding suggestions 66 for additional question(s) to present to a user or "Done" instructions 68 which indicate that completeness has occurred and additional input is not needed. The rule engine 64 may operate in the form of a Drools expert engine. Other declarative rules engines 64 may be utilized and a Drools expert rule engine 64 is provided as one example of how embodiments may be implemented. The TLA 60 may be implemented as a dedicated module contained within the tax preparation software 100.

As seen in FIG. 7, the TLA 60 uses the decision tables 30 to analyze the run time data 62 and determine whether a tax return is complete. Each decision table 30 created for each topic or sub-topic is scanned or otherwise analyzed to determine completeness for each particular topic or sub-topic. In the event that completeness has been determined with respect to each decision table 30, then the rule engine 64 outputs a "done" instruction 68 to the UI control 80. If the rule engine 64 does not output a "done" instruction 68 that means there are one or more topics or sub-topics that are not complete, in which case, as explained in more detail below, the UI control 80 presents interview questions to a user for answer. The TLA 60 identifies a decision table 30 corresponding to one of the non-complete topics or sub-topics and, using the rule engine 64, identifies one or more non-binding suggestions 66 to present to the UI control 80. The non-binding suggestions 66 may include a listing or compilation of one or more questions (e.g., $Q_1$-$Q_5$ as seen in FIG. 7) from the decision table 30. In some instances, the listing or compilation of questions may be ranked in order by rank. The ranking or listing may be weighted in order of importance, relevancy, confidence level, or the like. For example, a top ranked question may be a question that, based on the remaining rows (e.g., $R_1$-$R_5$) in a decision will most likely lead to a path to completion. As part of this ranking process, statistical information such as the STAT1, STAT2 percentages as illustrated in FIG. 5 may be used to augment or aid this ranking process. Questions may also be presented that are most likely to increase the confidence level of the calculated tax liability or refund amount. In this regard, for example, those questions that resolve data fields associated with low confidence values may, in some embodiments, be ranked higher.

The following pseudo code generally expresses how a rule engine 64 functions utilizing a fact cache based on the runtime canonical data 62 or the instantiated representation of the canonical tax schema 46 at runtime and generating non-binding suggestions 66 provided as an input a UI control 80. As described in U.S. application Ser. No. 14/097,057 previously incorporated herein by reference, data such as required inputs can be stored to a fact cache so that the needed inputs can be recalled at a later time, and to determine what is already known about variables, factors or requirements of various rules:

```
Rule engine (64)/ Tax Logic Agent (TLA) (60)
   // initialization process
   Load_Tax_Knowledge_Base;
   Create_Fact_Cache; While (new_data_from_application)
     Insert_data_into_fact_cache;
        collection = Execute_Tax_Rules; // collection is all the fired
   rules and corresponding conditions
        suggestions = Generate_suggestions (collection);
        send_to_application(suggestions);
```

The TLA 60 may also receive or otherwise incorporate information from a statistical/life knowledge module 70. The statistical/life knowledge module 70 contains statistical or probabilistic data related to the taxpayer. For example, statistical/life knowledge module 70 may indicate that taxpayers residing within a particular zip code are more likely to be homeowners than renters. More specifically, the statistical/life knowledge module may comprise tax correlation data regarding a plurality of tax matter correlations. Each of the tax matter correlations quantifies a correlation between a taxpayer attribute and a tax related aspect. For instance, a taxpayer attribute could be taxpayer age which may be correlated to a tax related aspect such as having dependents, or a taxpayer attribute might be taxpayer age which may be correlated to homeownership or other relevant tax related aspect. The tax correlation data also quantifies the correlations, such as by a probability of the correlation. For instance, the correlation between the taxpayer attribute and the tax related aspect may be a certain percentage probability, such as 10%, 20%, 30%, 40%, 50%, 60%, or any percentage from 0% to 100%. Alternatively, the quantification can be a binary value, such as relevant or not relevant. In other words, for a given taxpayer attribute, it may be determined that a tax related aspect is relevant or completely not relevant when a taxpayer has the given taxpayer attribute. As an example, if the taxpayer attribute is that the taxpayer is married, the correlation may indicate that spouse information is relevant and will be required.

The TLA 60 may use this knowledge to weight particular topics or questions related to these topics. For example, in the example given above, questions about home mortgage interest may be promoted or otherwise given a higher weight. The statistical knowledge may apply in other ways as well. For example, tax forms often require a taxpayer to list his or her profession. These professions may be associated with transactions that may affect tax liability. For instance, a taxpayer may list his or her occupation as "teacher." The statistic/life knowledge module 70 may contain data that shows that a large percentage of teachers have retirement accounts and in particular 403(*b*) retirement accounts. This information may then be used by the TLA 60 when generating its suggestions 66. For example, rather than asking generically about retirement accounts, the suggestion 66 can be tailored directly to a question about 403(b) retirement accounts.

The data that is contained within the statistic/life knowledge module 70 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by the statistic/life knowledge module 70. This information may be periodically refreshed or updated to reflect the most up-to-date relationships. Generally, the data contained in the statistic/life knowledge module 70 is not specific to a particular tax payer but is rather generalized to characteristics shared across a number of tax payers although in other embodiments, the data may be more specific to an individual taxpayer.

Still referring to FIG. 7, the UI controller 80 encompasses a user interface manager 82 and a user interface presentation or user interface 84. The user interface presentation 84 is controlled by the interface manager 82 and may manifest itself, typically, on a visual screen or display 104 that is presented on a computing device 102 (seen, for example, in FIG. 14). The computing device 102 may include the display of a computer, laptop, tablet, mobile phone (e.g., Smartphone), or the like. Different user interface presentations 84 may be invoked using a UI generator 85 depending, for example, on the type of display or screen 104 that is utilized by the computing device. For example, an interview screen with many questions or a significant amount of text may be appropriate for a computer, laptop, or tablet screen but such as presentation may be inappropriate for a mobile computing device such as a mobile phone or Smartphone. In this regard, different interface presentations 84 may be prepared for different types of computing devices 102. The nature of the interface presentation 84 may not only be tied to a particular computing device 102 but different users may be given different interface presentations 84. For example, a taxpayer that is over the age of 60 may be presented with an interview screen that has larger text or different visual cues than a younger user.

The user interface manager 82, as explained previously, receives non-binding suggestions from the TLA 60. The non-binding suggestions may include a single question or multiple questions that are suggested to be displayed to the taxpayer via the user interface presentation 84. The user interface manager 82, in one aspect of the invention, contains a suggestion resolution element 88, which is responsible for resolving how to respond to the incoming non-binding suggestions 66. For this purpose, the suggestion resolution element 88 may be programmed or configured internally. Alternatively, the suggestion resolution element 88 may access external interaction configuration files. Additional details regarding configuration files and their use may be found in U.S. patent application Ser. No. 14/206,834, which is incorporated by reference herein.

Configuration files specify whether, when and/or how non-binding suggestions are processed. For example, a configuration file may specify a particular priority or sequence of processing non-binding suggestions 66 such as now or immediate, in the current user interface presentation 84 (e.g., interview screen), in the next user interface presentation 84, in a subsequent user interface presentation 84, in a random sequence (e.g., as determined by a random number or sequence generator). As another example, this may involve classifying non-binding suggestions as being ignored. A configuration file may also specify content (e.g., text) of the user interface presentation 84 that is to be generated based at least in part upon a non-binding suggestion 66.

A user interface presentation 84 may comprise pre-programmed interview screens that can be selected and provided to the generator element 85 for providing the resulting user interface presentation 84 or content or sequence of user interface presentations 84 to the user. User interface presentations 84 may also include interview screen templates, which are blank or partially completed interview screens that can be utilized by the generation element 85 to construct a final user interface presentation 84 on the fly during runtime.

As seen in FIG. 7, the UI controller 80 interfaces with the shared data store 42 such that data that is entered by a user in response to the user interface presentation 84 can then be transferred or copied to the shared data store 42. The new or updated data is then reflected in the updated instantiated representation of the schema 44. Typically, although not exclusively, in response to a user interface presentation 84 that is generated (e.g., interview screen), a user inputs data to the tax preparation software 100 using an input device that is associated with the computing device. For example, a taxpayer may use a mouse, finger tap, keyboard, stylus, voice entry, or the like to respond to questions. The taxpayer may also be asked not only to respond to questions but also to include dollar amounts, check or un-check boxes, select one or more options from a pull down menu, select radio buttons, or the like. Free form text entry may also be requested from the taxpayer. For example, with regard to donated goods, the taxpayer may be prompted to explain what the donated goods are and describe the same in sufficient detail to satisfy requirements set by a particular taxing authority.

Still referring to FIG. 7, in one aspect, the TLA 60 outputs a current tax result 65 which can be reflected on a display 104 of a computing device 102, 103. For example, the current tax result 65 may illustrate a tax due amount or a refund amount. The current tax results 65 may also illustrate various other intermediate calculations or operations used to calculate tax liability. For example, AGI or TI may be illustrated. Deductions (either itemized or standard) may be listed along with personal exemptions. Penalty or tax credits may also be displayed on the computing device 102, 103. This information may be displayed contemporaneously with other information, such as user input information, or user interview questions or prompts or even narrative explanations 116 as explained herein.

The TLA 60 also outputs a tax data that is used to generate the actual tax return (either electronic return or paper return). The return itself can be prepared by the TLA 60 or at the direction of the TLA 60 using, for example, the services engine 90 that is configured to perform a number of tasks or services for the taxpayer. The services engine 90 is operatively coupled to the TLA 60 and is configured to perform a number of tasks or services for the taxpayer. For example, the services engine 90 can include a printing option 92. The printing option 92 may be used to print a copy of a tax return, tax return data, summaries of tax data, reports, tax forms and schedules, and the like. The services engine 90 may also electronically file 94 or e-file a tax return with a tax authority (e.g., federal or state tax authority). Whether a paper or electronic return is filed, data from the shared data store 42 required for particular tax forms, schedules, and the like is transferred over into the desired format. With respect to e-filed tax returns, the tax return may be filed using the MeF web-based system that allows electronic filing of tax returns through the Internet. Of course, other e-filing systems may also be used other than those that rely on the MeF standard. The services engine 90 may also make one or more recommendations 96 based on the run-time data 62 contained in the TLA 60. For instance, the services engine 90 may identify that a taxpayer has incurred penalties for underpayment of estimates taxes and may recommend to the taxpayer to increase his or her withholdings or estimated tax payments for the following tax year. As another example, the services engine 90 may find that a person did not contribute to a retirement plan and may recommend 96 that a taxpayer open an Individual Retirement Account (IRA) or look into contributions in an employer-sponsored retirement plan. The services engine 90 may also include a calculator 98 that can be used to calculate various intermediate calculations used as part of the overall tax calculation algorithm. For example, the calculator 98 can isolate earned income, investment income, deductions, credits, and the like. The calculator 98 can also be used to estimate tax liability based on certain changed assumptions (e.g., how would my taxes change if I was married and filed a joint return?). The calculator 98 may also be used to compare analyze differences between tax years.

By using calculation graphs 14 to drive tax calculations and tax operations, it is possible to determine interdependencies of the nodes (including tax operations, functional nodes and function nodes) and the year-over-year calculation graphs 14 can be used to readily identify differences and report the same to a user. Differences can be found using commonly used graph isomorphism algorithms over the two respective calculation graphs 14.

Referring again to FIG. 7, the system 40 includes an explanation engine 110 that operates within the tax preparation software 100 to generate a narrative explanation from the one or more explanations associated with a particular tax operation 29 (illustrated in FIGS. 6A and 6B). To generate the narrative explanation for a particular tax operation 29, the explanation engine 110 extracts the stored function 28 that is associated with the particular functional node 26. The stored function 28 is one function of a defined set and may be associated with a brief explanation. For example, a "cap" function may be associated with an explanation of "value exceeds cap." This brief explanation can be combined with a stored explanation or narrative that is associated with the particular functional node 26 within the calculation graph 14. For example, the functional node 26 paired with the stored "cap" function 28 gives a contextual tax explanation that is more than merely "value exceeds cap." For instance, a pre-stored narrative associated with the particular functional node 26 having to do with the child tax credit within the calculation graph 14 may be a complete statement or sentence such as "You cannot claim a child tax credit because your income is too high." In other embodiments, the pre-stored narrative may be only a few words or a sentence fragment. In the above example, the pre-stored narrative may be "credit subject to income phase out" or "AGI too high." A particular functional node 26 and associated function 28 may have multiple pre-stored narratives. The particular narrative(s) that is/are associated with a particular functional node 26 and associated function 28 may be stored in entries 112 in a data store or database such as data store 42 of FIG. 7. For example, with reference to FIG. 7, data store 42 contains the pre-stored narratives that may be mapped or otherwise tagged to particular functional nodes 26 and associated functions 28 contained within the calculation graph(s) 14. The locations or addresses of the various functional nodes 26 and the associated functions 28 can be obtained using the calculation graphs 14.

Figure 8A:
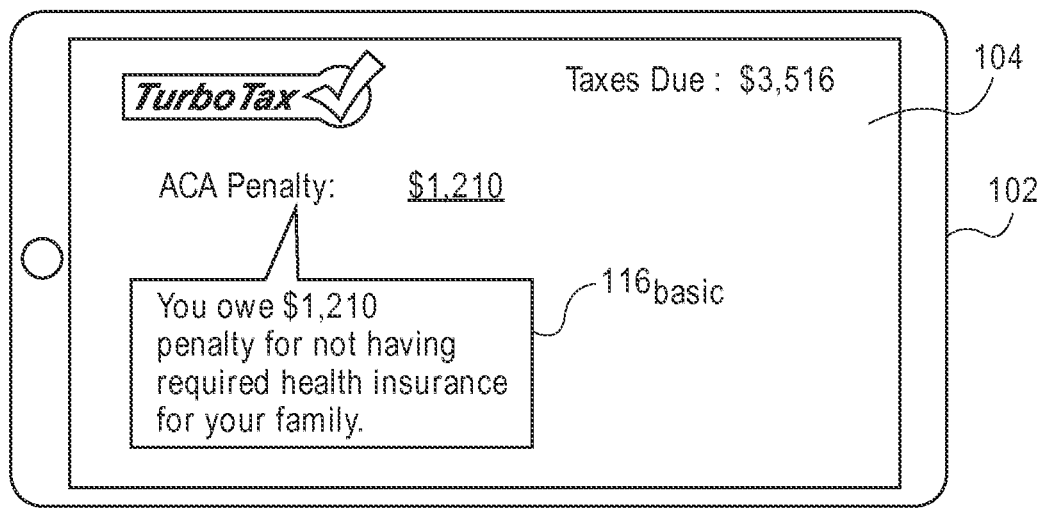
FIG. 8A illustrates a display of a computing device displaying a narrative explanation according to one embodiment.
Figure 8B:
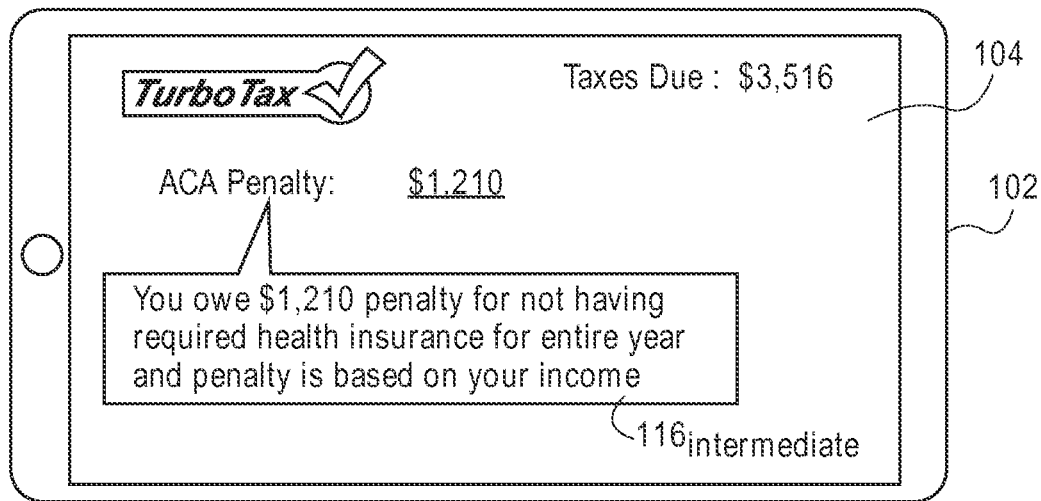
FIG. 8B illustrates a display of a computing device displaying a narrative explanation according to another embodiment.
Figure 8C:
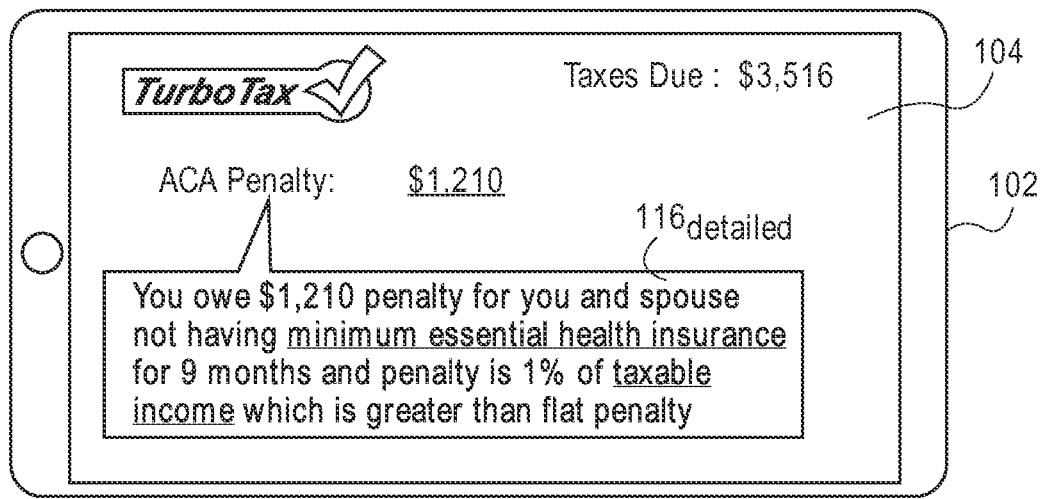
FIG. 8C illustrates a display of a computing device displaying a narrative explanation according to another embodiment.

These stored entries 112 can be recalled or extracted by the explanation engine 110 and then displayed to a user on a display 104 of a computing device 102, 103. For example, explanation engine 110 may interface with the UI control 80 in two-way communication such that a user may ask the tax preparation software 100 why a particular tax calculation, operation, or decision has been made by the system 40. For instance, the user may be presented with an on-screen link (FIGS. 10A, 10B, 11A, 11B, 12A, and 12B illustrate a hyperlink 120), button, or the like that can be selected by the user to explain to the user why a particular tax calculation, operation, or decision was made by the tax preparation software 100. For example, in the context of FIG. 6B described herein, a user may see an ACA penalty of $1,210.00 listed on the screen of the computing device 102, 103 while he or she is preparing the tax return for a prior year. FIGS. 8A-8C illustrate an example of such a screen shot. The taxpayer may be interested in why there is such a penalty. As one example, the initial explanation provided to the user may be "you have an ACA penalty because you, your spouse, and your two child dependents did not have coverage during the 2014 calendar year and the penalty is based on your income." This explanation may be associated with, for example, function node 26 and function 28 pair B in FIG. 6D.

In some instances, a user is able to further "drill down" with additional questions to gain additional explanatory detail. This additional level of detailed explanations is possible by traversing the calculation graph(s) 14 to identify each of the preceding or upstream input node(s) 24, function node(s) 26 and/or function node(s) 28. In the context of the example listed above as shown in FIG. 6B, a user may not be satisfied with the initial explanation described above, and may want additional explanation. In this instance, for example, the word "income" may be highlighted or linked with a hyperlink. A user clicking on this would then be provided with additional explanation on the detail regarding the ACA penalty. In this example, the user may be provided with "Under the ACA your penalty is the greater of 1% of your taxable income or a fixed dollar amount based on your family circumstances. In your situation, the 1% of taxable income exceeded the fixed dollar amount." This particular explanation may be associated with the predecessor function node 26 and function 28 pair A in FIG. 6B.

With reference to FIG. 7, the explanation engine 110 may also automatically generate explanations that are then communicated to the user interface manager 82. The automatically generated explanations may be displayed on a display associated with the computing devices 102, 103. In some embodiments, the explanations may be contemporaneously displayed alongside other tax data and/or calculations. For example, as a user inputs his or her information into the tax preparation software 100 and calculations are automatically updated, explanations may be automatically displayed to the user. These explanations may be displayed in a side bar, window, panel, pop-up (e.g., mouse over), or the like that can be followed by the user. The explanations may also be fully or partially hidden from the user which can be selectively turned on or off as requested by the user.

In one aspect of the invention, the choice of what particular explanation will be displayed to a user may vary. For example, different explanations associated with the same function node 26 and function 28 pair may be selected by the explanation engine 110 for display to a user based on the user's experience level. A basic user may be given a general or summary explanation while a user with more sophistication may be given a more detailed explanation. A professional user such as a CPA or other tax specialist may be given even more detailed explanations. FIGS. 8A-8C illustrates three different explanations ($116_{basic}$, $116_{intermediate}$, $116_{detailed}$) that are displayed to different users that have various degrees of explanation. FIG. 8A illustrates a basic explanation $116_{basic}$. In this example, an explanation is provided by the taxpayer owes an ACA penalty of $1,210. FIG. 8B illustrates a more detailed explanation $116_{intermediate}$ of this same penalty. In the FIG. 8B example, the taxpayer is told additional reasons behind the penalty (i.e., required health insurance was not obtained for the entire tax year). In FIG. 8C, an even more detailed explanation $116_{detailed}$ is given which more closely tracks the actual function node 26 and function 28 that makes up the calculation graph 14. Note that in FIG. 8C various terms such as "minimum essential health insurance" which has a specific definition under U.S. tax code and regulations is linked so that the user can drill into even more detail. Likewise, taxable income is linked in this example, letting the user potentially drill even further into the calculation of the ACA penalty. While three such explanations 116 are illustrated in the context of FIGS. 8A-8C, additional levels of simplicity/complexity for the explanation can be used.

In some embodiments, the different levels of explanation may be tied to product types or codes. These may be associated with, for example, SKU product codes. For example, a free edition of the tax preparation software 100 may provide few or no explanations. In a more advanced edition (e.g., "Deluxe edition"), additional explanation is provided. Still more explanation may be provided in the more advanced editions of the tax preparation software 100 (e.g., "Premier edition"). Versions of the tax preparation software 100 that are developed for accountants and CPAs may provide even more explanation.

In still other embodiments a user may be able to "unlock" additional or more detailed explanations by upgrading to a higher edition of tax preparation software 100. Alternatively, a user may unlock additional or more detailed explanations in an a la carte manner for payment of an additional fee. Such a fee can be paid through the tax preparation software 100 itself using known methods of payment.

Figure 9:
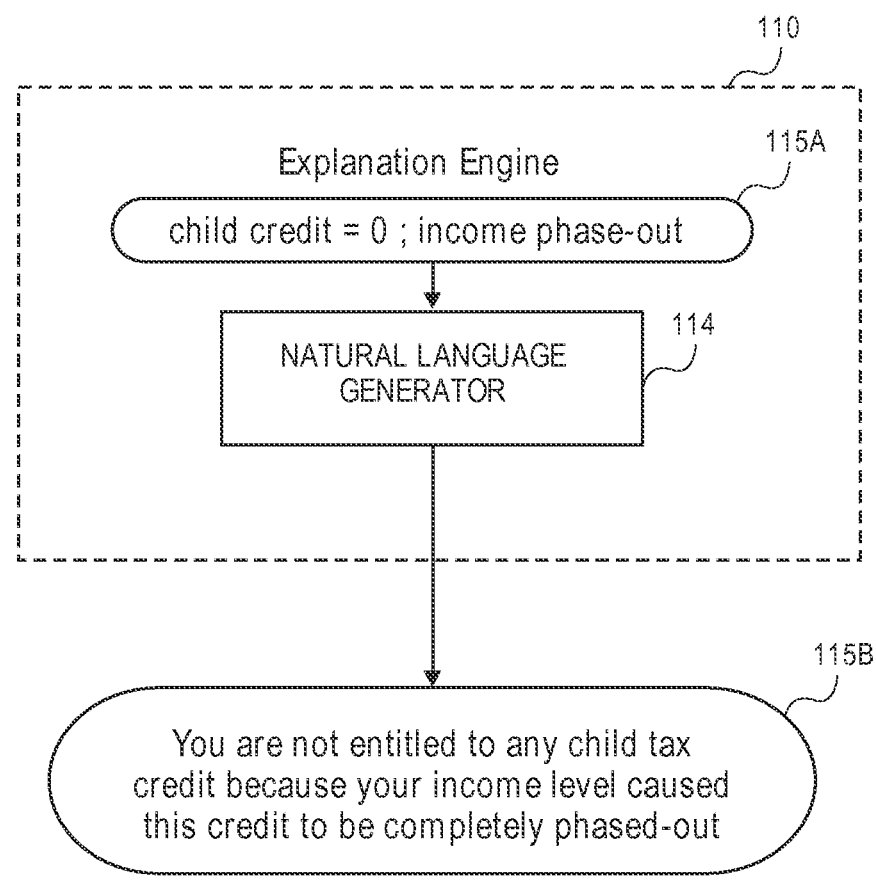
FIG. 9 illustrates an explanation engine that is part of the system of FIG. 7. The explanation engine generates narrative explanations that can be displayed or otherwise presented to users to explain one or more tax calculations or operations that are performed by the tax preparation software.

FIG. 9 illustrates additional details of the explanation engine 110 according to an embodiment of the invention. In this embodiment, the explanation engine 110 includes a natural language generator 114 that converts fragments, expressions or partial declaratory statements into natural language expressions that are better understood by users. The natural language expressions may or may not be complete sentences but they provide additional contextual language to the more formulaic, raw explanations that may be tied directly to the explanation associated with a function node 26 and associated function 28. In the example of FIG. 9, a brief explanation 115A extracted by the explanation engine 110 which indicates that the child credit tax is zero due to phase out from income level is then subject to post-processing to convert the same into a more understandable sentence that can be presented to the user. In this example, the user is provided with a natural language explanation 115B that is more readily understood by users.

In one aspect of the invention, the natural language generator 114 may rely on artificial intelligence or machine learning such that results may be improved. For example, the explanation engine 110 may be triggered in response to a query that a user has typed into a free-form search box within the tax preparation software 100. The search that has been input within the search box can then be processed by the explanation engine 110 to determine what tax operation the user is inquiring about and then generate an explanatory response 115B.

FIGS. 10A, 10B, 11A, 11B, 12A, and 12B illustrate various embodiments of how a narrative explanation 116 may be displayed to a user on a display 104 that is associated with a computing device 102, 103. FIGS. 10A and 10B illustrate an exemplary screen shot of a display 104 that contains a narrative explanation 116 of a tax operation. In this particular example, the tax operation pertains to the ACA shared responsibility penalty. As seen in the screen shot on display 104, the narrative explanation 116 may be presented along with additional tax data 118 that generally relates to the specific tax operation. In this example, a separate window 119 contains tax data 118 that relates to the tax operation or topic that is germane to the narrative explanation 116 that is being displayed. In this example, the taxpayer's zip code, AGI, tax exempt interest amount, exemption status, and insurance coverage status are illustrated. It should be understood, however, that the specific tax data 118 that is displayed may vary and many include more or less information. In addition, the tax data 118 may be hidden from view in other embodiments. Likewise, the tax data 118 does not have to be displayed in a separate window 119 or other area on the display 104. For example, the tax data 118 could be on a ribbon or pop-up window.

As seen in FIG. 10A, the narrative explanation 116 includes a plurality of words wherein several words or phrases are hyperlinked 120. In this regard, the narrative explanation 116 is nested as one or more phrases can be further expanded as is illustrated below. In this example, the narrative explanation 116 tells the user why the shared responsibility penalty was $405. Specifically, the narrative explanation 116 explains that the shared responsibility penalty is $405 because there was a deficit in coverage that causes the ACA penalty to apply and there was not exemption. The narrative explanation 116 in this example includes three phrases or words ("deficit in coverage"; "ACA Penalty"; "exemption") that are hyperlinked 120. A user can select a hyperlink 120 associated with one of these phrases or words where an additional narrative explanation 116' is given as illustrated in FIG. 10B. FIG. 10B illustrates a view of the display 104 after a user has selected the "deficit in coverage" phrase in FIG. 10A. As seen in FIG. 10B, the user is presented with another narrative explanation 116' explaining additional details on why there was a deficit in coverage for the taxpayer. Here, the user is told that a deficit in coverage was present because the taxpayer did not enroll in a qualified insurance plan during the year. As seen in FIG. 10B, the hyperlink 120 for "deficit in coverage" may change appearances upon being selected. For example, the hyperlink 120 may go from a solid line to a dashed line to indicate that it has been selected. Of course, other changes in appearance such as size, shape, highlighting can be used. Alternatively, the word or phrase of the hyperlink 120 may change appearances after being selected. For example, the word or phrase may change color, font size, or be highlighted to illustrate that the additional explanation 116' pertains to that specific word or phrase.

FIGS. 11A and 11B illustrate how the initial narrative explanation 116 can be expanded further a plurality of times. In this example, the initial narrative explanation 116 includes the phrase "ACA Penalty." A user may select the hyperlink 120 associated with this phrase that brings up another narrative explanation 116a that provides additional explanatory detail on the ACA penalty. In this example, the additional narrative explanation 116a itself includes several words or phrases with hyperlinks 120. In this example, "calculated ACA penalty," "minimum penalty," and "maximum penalty" are phrases that contain respective hyperlinks 120 where even additional explanation can be found. As seen in FIG. 11B, for example, a user that selects the hyperlink 120 that is associated with "calculated ACA penalty" returns another narrative explanation 116b that explains how the amount of the calculated ACA penalty was derived. In this example, the penalty was calculated as 1% of taxable income.

Figure 12A:
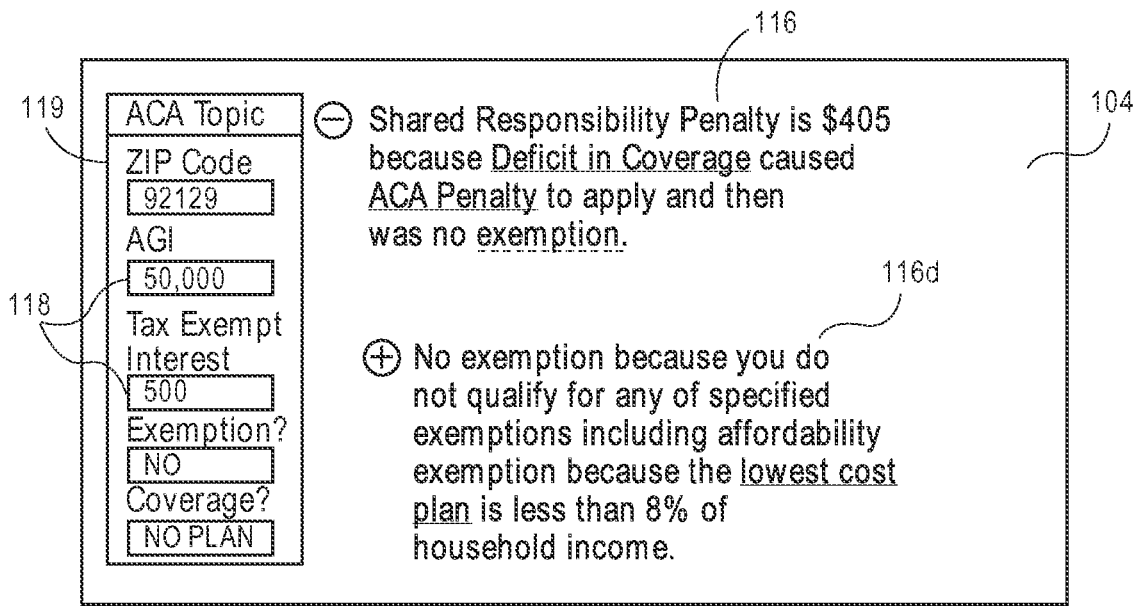
FIGS. 12A and 12B illustrate a display of a computing device displaying a narrative explanation that was generated by the explanation engine. The narrative explanation contains multiple phrases that are linked that can be selected to provide additional detailed explanations.
Figure 12B:
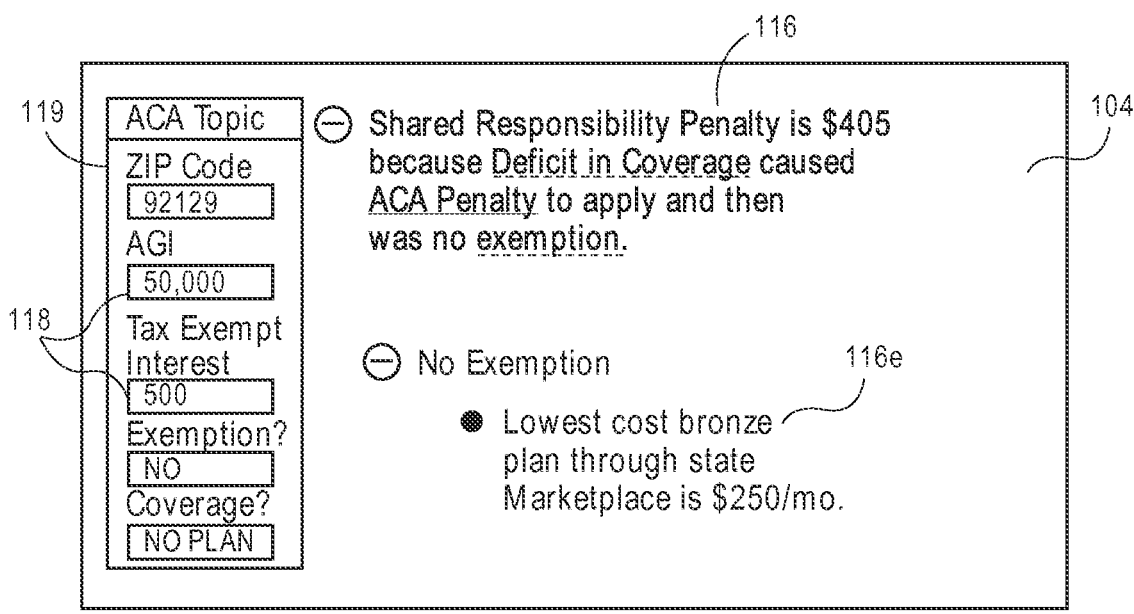

FIGS. 12A and 12B illustrate the same initial narrative explanation 116 as found in FIGS. 10A and 11A but with the hyperlinks 120 associated with the word "exemption" being selected. As seen in FIG. 12A, in narrative explanation 116d, the user is given an explanation that no exemption applies because the taxpayer did not qualify for any specified exemptions including the affordability exemption because the lowest cost plan, itself a defined phrase that has a hyperlink), is less than 8% of household income. FIG. 12B illustrates the same display 104 after a user has selected the hyperlink 120 that is associated with "lowest cost plan" which then displays that the lowest cost plan offered by the State in which the taxpayer resides is $250/month.

The narrative explanations 116 and their associated sub-explanations (e.g., 116', 116a, 116b, 116d, 116e) are constructed as an explanation tree with the root of the tree representing a particular tax topic or tax operation. In the example of FIGS. 10A, 10B, 11A, 11B, 12A, and 12B, the tax topic pertains to the ACA penalty. The explanation trees are readily constructed based on the function nodes 26 and associated functions 28 contained within the calculation graph(s) 14. For example, one is able to "drill down" into more detailed explanations by traversing up the respective calculation path of the relevant calculation graph 14. For example, the initial explanation 116 that is displayed on the screen may be associated with node D of the calculation graph of FIG. 6B. By selecting the ACA penalty hyperlink 120 as seen in FIGS. 11A and 11B, a predecessor node up calculation path from nod D (e.g., node C) is used to generate the narrative explanation 116a. Yet another predecessor node (node A) up the calculation path up from node D is used to generate the narrative explanation of the calculated ACA penalty. In this manner, explanations can be presented to the user in a recursive manner by traversing each of the calculation paths of each calculation graph 14. Conversely, traversing progressively top-down along a calculation path of a calculation graph 14 shows how one node 14, 26 and/or 28 affects other downstream nodes 24, 26 and/or 28.

Encapsulating the tax code and regulations within calculation graphs 14 results in much improved testability and maintainability of the tax preparation software 100. Software programming errors ("bugs") can be identified more easily when the calculation graphs 14 are used because such bugs can be traced more easily. In addition, updates to the calculation graphs 14 can be readily performed when tax code or regulations change with less effort.

Further, the degree of granularity in the narrative explanations 116 that are presented to the user can be controlled. As explained in the context of FIGS. 8A-8C, different levels of details can be presented to the user. This can be used to tailor the tax preparation software 100 to provide scalable and personalized tax explanations to the user. In addition, the narrative explanations 116 can be quickly altered and updated as needed given that they are associated with the calculation graphs and are not hard coded throughout the underlying software code for the tax preparation software 100.

By capturing the tax code and tax regulations in one or more calculation graph(s) 14, the targeted calculations can be done on various tax topics or sub-topics within the overall tax calculation graph(s) 14 covering calculations for an entire tax return. In addition, the granularity or detail of tax questions presented to a user may also be adjusted utilizing the calculation graph(s) 14 and/or the completeness model(s) (such as completeness graphs, decision table, etc.). For example, sub-graphs for a particular tax topic can be generated from a tax calculation graph 14 which includes a subset of all of the nodes and calculation paths of the tax calculation graph which are needed to perform the desired calculation. In order to adjust the detail of questions, a sub-graph of a tax calculation graph 14 may be generated in which certain non-input nodes (e.g. function nodes 26 and 28) are re-configured as user enterable nodes such that the input nodes 24 leading to such re-configured nodes are no longer necessary. The sub-graph is generated which excludes certain nodes, such as excluding the re-configured input nodes 24 (and any function nodes 26 and 28 which are unnecessary to calculate the sub-graph). The completeness model associated with the respective tax topic is also modified to exclude tax questions directed to the excluded input nodes 24 (and any functions nodes 26 and 28 which are unnecessary to calculate the sub-graph). The sub-graph of the and modified completeness model can then be utilized by the tax preparation system 40 to prepare a tax return by presenting tax questions at a different level of detail than the original tax calculation graph(s) 14 and completeness mode(s).

In one aspect of enabling the functionality of modifying the level of detail of tax questions, the non-input nodes (e.g., the function nodes 24 and 26) on a calculation graph 14 include a user selectable tag for selectably configuring such node as a user enterable node, wherein the value for the user enterable node is entered by a user. As defined above, the term "user enterable node" means a non-input node which is re-configured to be a node in which a user enters a value for the node. Hence, a "user enterable node" is a node which a user enters a set value for the node, as opposed to the value of the node being calculated based on the value of input node(s) and function(s) defined for the node, as originally configured in the tax calculation graph 14. Therefore, to modify the granularity of tax questions, such as for a tax calculation graph for an entire tax return or for a certain tax topic, a user selects one or more nodes of the tax calculation graph 14 to selectably configure such node(s) as user enterable nodes. A target node is also defined, which may be user selected or a default value. A target node may be an endpoint node for a tax topic, such as gross income, or adjusted gross income, etc. A default target node may be a final tax return result, such as tax refund or tax owed, or the endpoint node of a tax topic for the nodes selected as user enterable nodes.

As an example, referring to the tax calculation graph 14 in FIG. 6A, the function nodes 26a, 26b and 26c have been selected to set the user selectable tag 206 as a "user enterable node." In this example, the function node 26d for the final tax due has been either selected as the target node or is a default value. As a result, the input nodes 24a-24i have been rendered unnecessary, because each of the input nodes 24a-24i lead to one of the user enterable nodes 26a, 26b or 26c. As described in more detail below, the user selectable tag 206 can be used by a sub-graph engine 200 and/or a granularity control engine 202 to create a sub-graph for performing a calculation of the tax topic or sub-topic and/or modifying the level of detail of tax questions.

Referring back to FIG. 7, in order to accomplish the functionality of the generating sub-graphs, and modifying the level of detail of tax questions, the tax preparation system 40 further comprises a sub-graph engine 200. The sub-graph engine 200 may operate within the tax preparation software 100, or it may be a separate software application operating independent of the tax preparation software 100, or it may be a separate software program operatively coupled to the tax preparation software 100. The sub-graph engine 200 is configured to generate a sub-graph of a tax calculation graph 14 (which may be the entire tax calculation graph 14 for a complete tax return, or a tax calculation graph 14 for one or more tax topics or sub-topics) based upon user enterable node(s) selected by a user and a target node which is either selected by a user or is a default value. Generally, the sub-graph engine 200 is configured to analyze the tax calculation graph 14 and generate a sub-graph which includes all nodes along each calculation path leading from each user enterable node to the target node; and excludes all nodes of the tax calculation graph 14 which only have a calculation path leading to one or more of the user enterable nodes; and also excludes all nodes which do not have a calculation path leading to the target node.

As an example, again referring to FIG. 6A, in which function nodes 26a, 26b, and 26c have been selected as user enterable nodes (e.g., the user selectable tag has been set to "user enterable") and function node 26d is set as the target node, the sub-graph includes all of the nodes within the sub-graph boundary 204, and excludes the input nodes 24a-24i. As still another example, if 26c were NOT selected as a user enterable node, then the nodes 24g, 24h and 24i would be included in the sub-graph because such nodes do not have a calculation path leading a user enterable node, and such nodes have a calculation path leading to the target node 26d. The sub-graph engine 200 may generate the sub-graph by any suitable means, including without limitation, creating a sub-graph in which the excluded nodes are deleted from the tax calculation graph, or by setting an excluded tax for the excluded nodes indicating the node is excluded, or by setting a "sub-graph tag" only for those nodes included in the sub-graph.

The sub-graph engine 200 generates the sub-graph 204 by analyzing the calculation paths within the tax calculation graph 14 of interest. For instance, the sub-graph engine 200 traverses the calculation paths of the tax calculation graph 14 and determines whether each node along the calculation paths should be included or excluded from the sub-graph 200. In one determination, the sub-graph engine 200 traverses along each calculation path leading from each user enterable node to the target node, and determines all of the nodes along such calculation paths. Such nodes are included in the sub-graph (unless there are interdependent nodes, as described below), and are referred to a "first sub-graph nodes."

The sub-graph engine 200 is also configured to determine any calculation paths leading to the target node which do not pass through a user enterable node. As described above in the example using FIG. 6A, in some instances the selection of the user enterable nodes may not cover all of the calculation paths leading to the target node. This may indicate that the selection of user enterable nodes was incomplete, or that the user intended that the nodes along calculation paths not including a user enterable node should be part of the final sub-graph. Such calculation paths are referred to as "open paths." When open paths are identified, the sub-graph engine 200 may either request the user to select additional user enterable nodes along the open paths, or simply include the nodes along any open paths as part of the sub-graph. In the former, the sub-graph engine 200 requests the user to select additional user enterable nodes and receives a selection of one or more additional user enterable node(s). The sub-graph engine 200 then determines all of the nodes along each calculation path leading from each additional user enterable node to the target node. In the latter, the sub-graph engine 200 just determines all of the nodes along each calculation path leading to the target node which does not pass through a user enterable node. These nodes will also be a part of the final sub-graph and are referred to as "second sub-graph nodes."

At this point, the sub-graph engine 200 may generate the final sub-graph 204 consisting essentially (or consisting only) of the first sub-graph nodes and the second sub-graph nodes, if any of each type of sub-graph node have been determined as described above. The term "consisting essentially of" in regards to the nodes of a sub-graph means that the sub-graph does not include any nodes which materially affect the compactness of the sub-graph, but may include a small number of nodes as artifacts (e.g. less than 2%, less than 5% or less than 10% of the total number of nodes in the sub-graph) which do not affect the calculation of the sub-graph.

Even after a selection of additional user enterable node(s), there may still be one or more open path(s). So, the sub-graph engine 200 may determine any remaining open paths which do not include a user enterable node or an additional user enterable node. The sub-graph engine 200 may be further configured to iteratively advise the user that there are still open paths and to select additional user enterable node(s) or to generate the sub-graph with the open path(s). Alternatively, the sub-graph engine 200 may not give the user the option, and may simply proceed. Either way, the sub-graph engine 200 determines all nodes along each of the remaining open paths, which will also be included in the final sub-graph, and are referred to as "third sub-graph nodes." In this case, the sub-graph engine generates the final sub-graph consisting essentially of the first sub-graph nodes, the second sub-graph nodes, and the third sub-graph nodes, if any of each type of sub-graph node have been determined as described above.

It is possible that the selection of user enterable nodes may be invalid because there is a calculation path between a first user enterable node (including additional user enterable node(s), as described above) and a second user enterable node (including additional user enterable node(s)). In this case, first user enterable node and second user enterable node are interdependent. This may cause problems because the values for the two interdependent user enterable nodes may be inconsistent with the proper tax calculations, and/or have other inconsistencies, so it may be desirable to modify this situation. Referring again to FIG. 6B, if the user selected nodes 26a, 26b and 28a as user enterable nodes, then node 28a would be interdependent with both nodes 26a and 26. In this case, if a user enters values in 26a, 26b and 28a, there may be an inconsistency with the accumulated value of node 28a and the user entered value of node 28a. Thus, the sub-graph engine 200 is further configured to determine whether there is a calculation path between a first user enterable node and a second user enterable node. When there are interdependent user enterable nodes, the sub-graph engine 200 notifies the user that the selection of the first user enterable node and second user enterable node is invalid, and requests a revised selection of user enterable nodes. The sub-graph engine 200 receives a revised selection of user enterable nodes, such as removing node 28a from the selection of user enterable nodes. The sub-graph engine 200 repeats the interdependency check for the revised selection of user enterable nodes. After the sub-graph engine 200 receives a valid selection of the user enterable nodes (i.e., there are not interdependencies), the sub-graph engine 200 may repeat the processes described above for determining the first sub-graph nodes, the second sub-graph nodes, and the third sub-graph nodes, and the final sub-graph 204 based upon the revised and valid selection of user enterable nodes.

In order to reduce the possible calculation paths within the tax calculation graph 14 which the sub-graph engine 200 needs to analyze to generate a final sub-graph 204, the sub-graph engine 200 may first determine an initial construct sub-graph. Hence, before determining the first sub-graph nodes, second sub-graph nodes and/or third sub-graph nodes, the sub-graph engine generates a construct sub-graph comprising all of the nodes of the tax calculation graph 14 along each calculation path leading to the target node. Then, the sub-graph engine 204 determines the first sub-graph nodes, second sub-graph nodes and/or third sub-graph nodes, as described above, using the construct sub-graph rather than the entire tax calculation graph. Using the tax calculation graph 14 of FIG. 6A as an example, if the function node 26e for Adjusted Gross Income is selected as the target node, then the construct sub-graph 208 will only include the nodes within the sub-graph boundary 208.

As explained above, a sub-graph may have a number of useful purposes. As an example, a sub-graph may be utilized as a calculator for calculating the result of a tax topic of the overall tax calculation graph. Referring to FIG. 6A, the sub-graph 208 can be used as a calculator for adjusted gross income (AGI) as shown by function node 26e. In addition, as explained in further detail below with respect to the granularity control engine 202, the completeness graph(s) and/or decision tables may be modified for the calculator such the tax preparation system 40 will only ask tax questions for obtaining the tax data required for the sub-graph, thereby providing an efficient calculator for a tax topic or sub-topic.

In addition, a sub-graph can be used to modify the granularity of tax questions by modifying the completeness model(s) based on the sub-graph including configuring questions and logic represented in the completeness model(s) and corresponding to a node leading to a user enterable node as not needed to complete a particular tax topic. For instance, the tax preparation system 40 may be configured to modify the detail of questions across different tax preparation applications, such between a retail version and a professional tax preparer version. The retail version would typically include more detailed questions about tax topics, whereas a professional tax preparer version would typically have less detail such as by excluding questions requesting itemized lists within a tax topic and only requesting a total or previously calculated result.

Referring again to FIG. 7, the tax preparation system 40 further comprises a granularity control engine 202. Like the sub-graph engine 200, the granularity control engine 202 may be a separate software program from the tax preparation software 100, or it may be a separate software application operating independent of the tax preparation software 100, or it may be a separate software program operatively coupled to the tax preparation software 100. The granularity control engine 202 is configured to generate a sub-graph of a tax calculation graph based upon a target node and one or more user enterable nodes, as described above for the sub-graph engine 200. Accordingly, the granularity control engine 202 may comprise the sub-graph engine 200 described above, or it may be a separate software program which utilizes the sub-graph engine 200.

Still referring to FIG. 7, the granularity control engine 200 is configured to generate a modified completeness model 210 of the full completeness model (e.g., the completion graph(s) 12 and/or decision table(s) 30) for a particular tax topic in which each question and logic of the modified completeness model which is directed to a node on the calculation graph leading to the user enterable nodes is configured as not needed to complete the particular tax topic. In this way, the tax logic agent 60 of the tax preparation system 40 utilizing the sub-graph 204 and the modified completeness model 210 will not recommend questions directed to the nodes leading to the user enterable nodes. This results in modifying the granularity of the questions requesting tax data for a taxpayer in preparing a tax return using the tax preparation system 40.

The granularity control engine 200 may generate the modified completeness model 210 in any suitable manner. In one way, the granularity control engine modifies the applicable completion graph(s) 12 for the particular tax topic(s) being modified (e.g., in the example of FIG. 6A, the completion graph(s) for income, W2 income, 1099 income and investment income) to render the questions and logic associated with the nodes which are not a part of the sub-graph as not needed to complete the tax topic(s). This can be done by either deleting such questions and logic from the completion graph(s) 12, by tagging such questions and logic as not needed. Referring to the example completion graph 12 of FIG. 3, if the nodes 20c, 20e and 20d are selected as user enterable nodes, then the nodes 20a and 20 are rendered unnecessary. The granularity control engine 202 then either deletes the unnecessary nodes or tags them as unnecessary.

The granularity control engine 202 then uses the modified completion graph 12 to generate a modified decision table 30, similar to the process described above for converting a completion graph 12 into a decision table 30.

Once the modified decision table 30 is generated, the tax preparation system 40 utilizes the modified decision table 30 (i.e., the modified completeness model 210) in preparing a tax return, as described below, except that the system 40 utilizes the sub-graph 204 of tax calculation graph 12 instead of the original tax calculation graph 12, and the modified decision table 30 instead of the original decision table 30. In an additional aspect, the system may further comprise a tax logic agent configured to analyze the modified completeness model to determine one or more suggested tax questions for obtaining missing tax data required to complete the tax calculation graph of the sub-graph. Of course, the tax logic agent will not suggest tax questions which are configured as not needed in the completeness model.

In another aspect, the system may further comprise a user interface manager configured to receive the one or more suggested tax questions from the tax logic agent, analyze the suggested tax questions, and determine one or more tax questions to present in preparing a tax return using a tax preparation system.

Another embodiment of the present invention is directed to computer-implemented methods for modifying the level of detail of questions requesting tax data for a taxpayer in preparing a tax return in a tax preparation system. The methods may be implemented on the tax preparation system having a granularity control engine, same or similar to the system described above. For instance, the method may comprise a granularity control engine generating a sub-graph of the tax calculation graph based upon a target node and one or more user enterable nodes selected from the nodes of the tax calculation graph. The granularity control engine generates a modified completeness model of the first completeness model in which each question and logic of the first completeness model directed to a node on the calculation graph leading to the user enterable nodes is configured as not needed to complete the tax topic.

Figure 13:
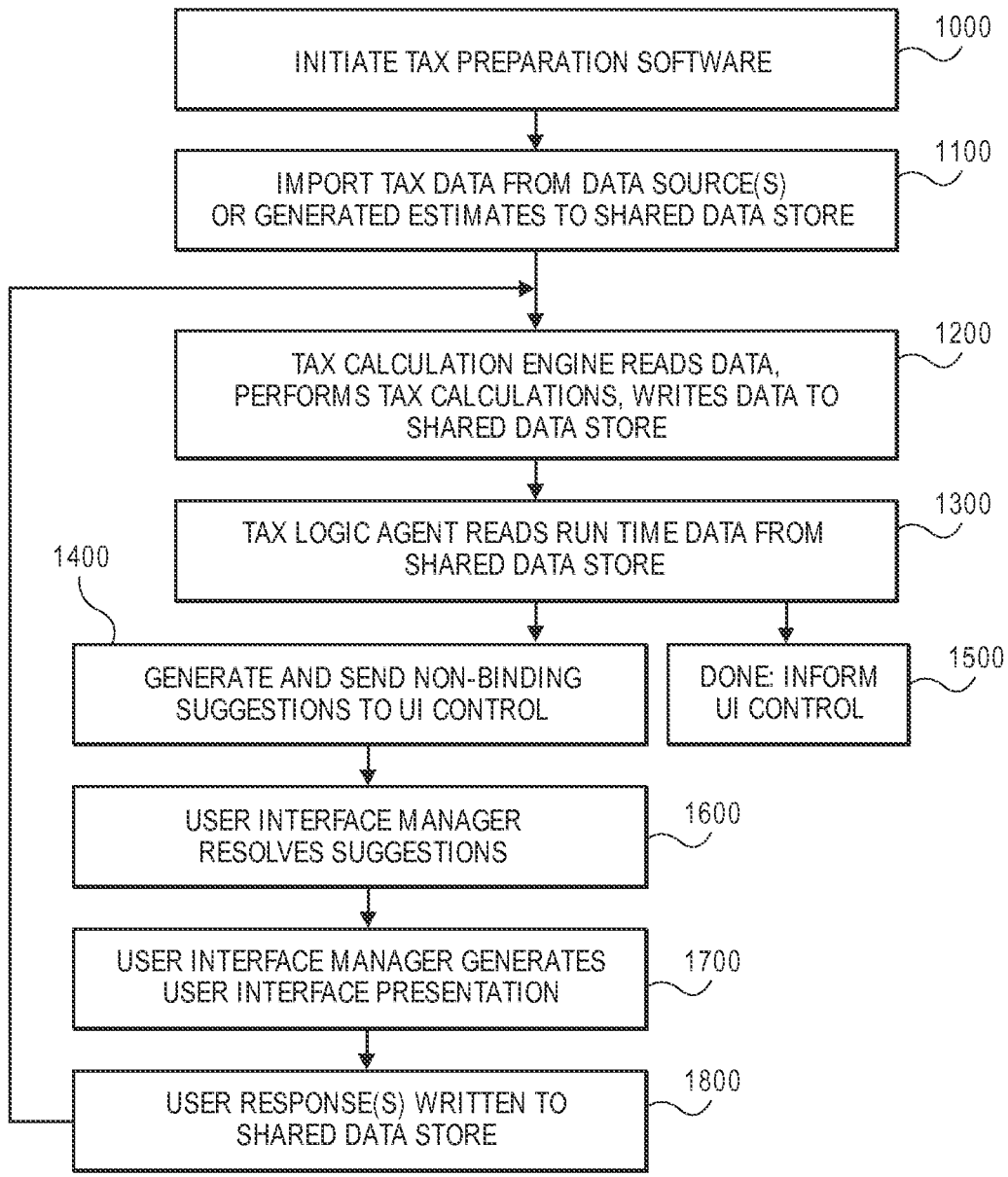
FIG. 13 illustrates a flowchart of the operation of the tax preparation system of FIG. 7 in preparing a tax return, according to one embodiment.

Turning to FIG. 13, a flowchart shows the operations of the tax preparation system 40, according to an embodiment of the invention. In operation 1000, a user initiates the tax preparation software 100 on a computing device 102 as seen, for example, in FIG. 14. The tax preparation software 100 may reside on the actual computing device 102 that the user interfaces with or, alternatively, the tax preparation software 100 may reside on a remote computing device 103 such as a server or the like as illustrated. In such an instances, the computing device 102 that is utilized by the user or tax payer communicates via the remote computing device 103 using an application 105 contained on the computing device 102. The tax preparation software 100 may also be run using conventional Internet browser software. Communication between the computing device 102 and the remote computing device 103 may occur over a wide area network such as the Internet. Communication may also occur over a private communication network (e.g., mobile phone network).

Referring back to FIG. 13, after initiating the tax preparation software 100, the tax preparation software 100, in operation 1100, gathers or imports tax related data from the one or more data sources 48 as illustrated in FIG. 7. Note that the gathering of tax related data from the one or more data sources 48 may occur at the time the tax preparation software 100 is run. Alternatively, the gathering of tax related data from the one or more data sources 48 may occur over a period of time. For example, data sources 48 may be periodically queried over time (e.g., during a tax reporting year) whereby updated information is stored in a database (not shown) or the like that is then accessed by the tax preparation software 100. This option may improve the efficiency and speed of tax return preparation as the information is already available.

In one embodiment, the gathering or importation of data sources such as prior tax returns 48b, online resources 48c, and third party information 48d is optional. For example, a taxpayer may want to start the process from scratch without pulling information from other sources. However, in order to streamline and more efficiently complete a tax return other users may desire to obtain tax related information automatically. This would reduce the number of interview or prompt screens that are presented to the user if such information were obtained automatically by the tax preparation software 100. A user may be given the opportunity to select which data sources 48 they want accessed and searched for relevant tax related data that will be imported into the shared data store 42. A user may be asked to submit his or her account and password information for some data sources 48 using the UI control 80. Other data sources 48 such as some third party data sources 48d may be accessed without such information.

Next, as seen in operation 1200, after the schema 44 is populated with the various imported or entered data fields from the data sources 48, the tax calculation engine 50, using the tax calculation graphs 14 (or sub-graphs), reads data from the shared data store 42, performs tax calculations, and writes back data to the shared data store 42.

In operation 1300, the tax logic agent 60 reads the run time data 62 which represents the instantiated representation of the canonical tax schema 44 at runtime. The tax logic agent 60 then utilizes the decision tables 30 (or modified completeness model(s) or modified decision table(s)) to generate and send non-binding suggestions 66 to the UI control 80 as seen in operation 1400. Alternatively, the tax logic agent 60 may determine that completeness has been achieved across the tax topics in which case a done instruction may be delivered to the UI control as seen in operation 1500. If not done, the process continues whereby the user interface manager 82 will then process the suggestion(s) 66 using the suggestion resolution element 88 for resolving of how to respond to the incoming non-binding suggestions 66 as seen in operation 1600. The user interface manager 82 then generates a user interface presentation 84 to the user as seen in operation 1700 whereby the user is presented with one or more prompts. The prompts may include questions, affirmations, confirmations, declaratory statements, and the like. The prompts are displayed on a screen 104 of the computing device 102 whereby the user can then respond to the same by using one or more input devices associated with the computing device 102 (e.g., keyboard, mouse, finger, stylus, voice recognition, etc.).

Still referring to FIG. 12, as seen in operation 1800, the response or responses that are given by the user of the tax preparation software 100 are then written back to the shared data store 42 to thereby update all appropriate fields of the schema 44. The process then continues with operation 1200 and proceeds as explained above until a completeness state has been reached and a done instruction is sent to the UI control 80.

Accordingly, a tax preparation system 40 is provided which can prepare a tax return. In addition, the system 40 may be utilized to generate sub-graphs which can be used as tax topic calculators. The system 40 can also modify the granularity of tax questions presented to a user for obtaining tax data, which functionality can be utilized to create different versions of the tax preparation applications such as a basic version, expert version, professional tax preparer version, etc.

Figure 15:
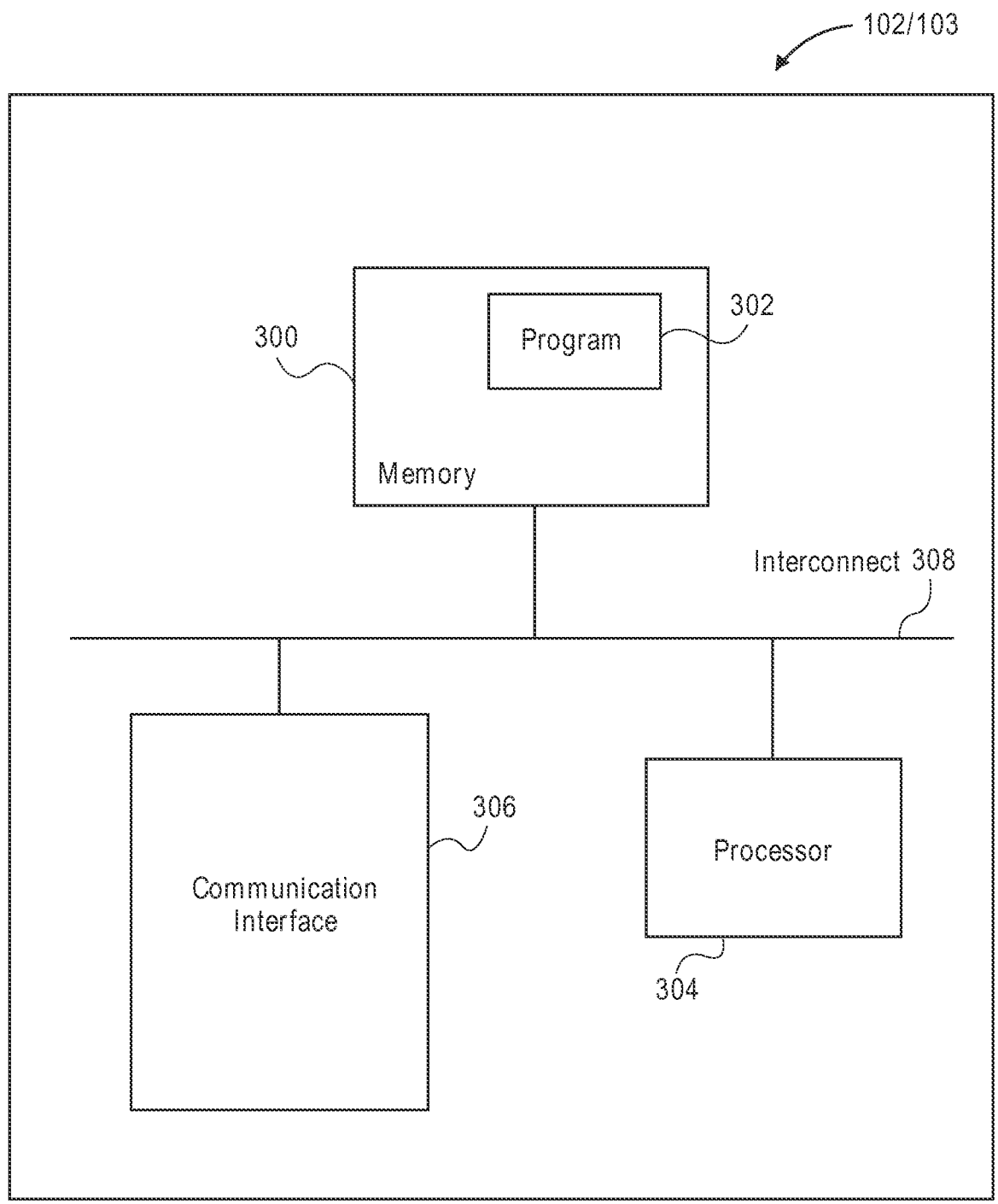
FIG. 15 illustrates generally the components of a computing device that may be utilized to execute the software for automatically calculating or determining tax liability, generating a sub-graph of a tax calculation graph, modifying the granularity of tax questions for obtaining tax data, and preparing a tax return based thereon.

FIG. 15 generally illustrates components of a computing device 102, 103 that may be utilized to execute the software for automatically calculating or determining tax liability and preparing an electronic or paper return based thereon. The components of the computing device 102 include a memory 300, program instructions 302, a processor or controller 304 to execute program instructions 302, a network or communications interface 306, e.g., for communications with a network or interconnect 308 between such components. The computing device 102, 103 may include a server, a personal computer, laptop, tablet, mobile phone, or other portable electronic device. The memory 300 may be or include one or more of cache, RAM, ROM, SRAM, DRAM, RDRAM, EEPROM and other types of volatile or non-volatile memory capable of storing data. The processor unit 304 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 308 may include a system bus, LDT, PCI, ISA, or other types of buses, and the communications or network interface may, for example, be an Ethernet interface, a Frame Relay interface, or other interface. The interface 306 may be configured to enable a system component to communicate with other system components across a network which may be a wireless or various other networks. It should be noted that one or more components of the computing device 102, 103 may be located remotely and accessed via a network. Accordingly, the system configuration illustrated in FIG. 15 is provided to generally illustrate how embodiments may be configured and implemented.

The described embodiments of the present invention, including the functions performed by the system 40 and its components, may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 304 performs steps or executes program instructions 302 within memory 300 and/or embodied on the carrier to implement method embodiments.

Embodiments, however, are not so limited and implementation of embodiments may vary depending on the platform utilized. Accordingly, embodiments are intended to exemplify alternatives, modifications, and equivalents that may fall within the scope of the claims.

What is claimed is:

1. A system for preparing a tax return in which a granularity of tax questions presented to a user may be adjusted, comprising:
    a computing device having a computer processor, display and memory, and a non-transitory, computer-readable storage device having a software application stored thereon, the software application executable by the computer processor and comprising a tax calculation graph, a modular tax calculation engine, a plurality of decision tables, a sub-graph engine, a granularity control engine, a modular tax logic agent, a modular user interface manager, the modular tax logic agent when executed by the computer processor is detached from the modular user interface manager when executed by the computer processor;
    a data store in communication with the computing device, the data store configured to store user-specific tax data therein;
    the modular tax calculation engine when executed by the computer processor using the tax calculation graph to perform a plurality of tax calculation operations using the user-specific tax data read from the data store to calculate the tax return, the tax calculation graph comprising a plurality of interconnected nodes including one or more of input nodes, functional nodes, and function nodes, each input node being populated with user-specific tax data, each function node defines a tax calculation utilizing the populated input nodes, and each functional node is a result of a calculation performed by an interconnected function node when executed by the computer processor, a plurality of the functional nodes each including a user selectable tag configuring such node as a user enterable node having a value entered by the user;
    the modular tax calculation engine when executed by the computer processor performs a plurality of tax calculation operations based on the tax calculation graph using the user-specific tax data read from the data store to calculate the tax return;
    the plurality of decision tables collectively representing a completion graph for completing all required data fields for computing the tax return, each decision table representing a plurality of columns, each column corresponding to a tax question, and a plurality of rows, each row corresponding to a completion path for a tax rule, thereby forming a plurality of cells with each cell corresponding to a particular row and column, each cell in a respective row having a logic operator to be executed by the computer processor, the logic operator corresponding to the tax question of the each cell's respective column such that completion of each respective row is determined by the logic operators in the respective row;
    the sub-graph engine when executed by the computer processor generating a sub-graph of the tax calculation graph based upon a target node and one or more user enterable nodes selected by the user from the nodes of the tax calculation graph, the sub-graph excluding: (a) all nodes of the tax calculation graph which only have a calculation path leading to only one or more user enterable nodes; and (b) all nodes which do not have a calculation path leading to the selected target node;
    the granularity control engine when executed by the computer processor generating modified decision tables by modifying the decision tables such that cells in the decision tables directed to nodes excluded in the sub-graph by the sub-graph engine are configured in the decision tables as not needed to complete a particular tax topic;
    the modular tax logic agent when executed by the computer processor analyzing user-specific tax data in the data store and the modified decision table to determine one or more suggested tax questions for obtaining missing tax data required for the tax calculation engine to complete a tax calculation of the sub-graph, the modular tax logic agent eliminating, based on the user-specific tax data, at least one row and its respective completion path to reduce possible suggested tax questions; and the user interface manager when executed by the computer processor receiving the suggested tax questions from the modular tax logic agent and outputting on the display one or more questions based on the one or more suggestions via a user interface.

2. The system of claim 1, wherein the sub-graph engine when executed by the computer processor determines whether there is a calculation path between a first user enterable node and a second user enterable node, and when there is a calculation path between the first user enterable node and the second user enterable node, (a) notifies the user that the selection of the first user enterable node and the second user enterable node is invalid; (b) requests and receives a revised selection of user enterable nodes and (c) generates a final sub-graph based upon the revised selection of user enterable nodes.

3. The system of claim 2, wherein the sub-graph engine when executed by the computer processor receives a user selection of a target node and one or more nodes to be configured as user enterable nodes; and sets the tag for each selected user enterable node as a user enterable node.

4. The system of claim 1, wherein the sub-graph engine when executed by the computer processor:
- determines a construct sub-graph comprising all nodes of the tax calculation graph having a calculation path leading to the target node;
- for each user enterable node, determines all of the nodes along each calculation path of the construct sub-graph leading from each user enterable node to the target node, such nodes are referred to as first sub-graph nodes;
- determines any calculation paths leading from an input node of the construct sub-graph to the target node which do not include a user enterable node, such calculation paths referred to as open paths;
- when one or more open paths are determined, prompts the user to select one or more nodes on one or more of the open paths as an additional user enterable node and determines all of the nodes along each calculation path leading from each additional user enterable node to the target node, such nodes referred to as second sub-graph nodes; for any remaining open paths after configuring the additional user enterable nodes, determines all nodes along such remaining open paths, such nodes referred to as third sub-graph nodes; and
- generates a final sub-graph consisting only of the first sub-graph nodes, second sub-graph nodes and third sub-graph nodes.

5. The system of claim 4, wherein the sub-graph engine when executed by the computer processor determines whether there is a calculation path between a first user enterable node and a second user enterable node, and when there is a calculation path between the first user enterable node and the second user enterable node, (a) notifies the user that the selection of the first user enterable node and the second user enterable node is invalid; (b) requests and receives a revised selection of user enterable nodes and (c) generates the final sub-graph based upon the revised selection of user enterable nodes.

6. The system of claim 5, wherein the sub-graph engine when executed by the computer processor receives a user selection of the target node and the one or more nodes to be configured as user enterable nodes; and sets the user selectable tag configuring each node selected by the user to be configured as a user enterable node as a user enterable node.

7. A system for preparing a tax return in which a granularity of tax questions presented to a user may be adjusted, comprising:
- a computing device having a computer processor, display and memory, and a non-transitory, computer-readable storage device having a software application stored thereon, the software application executable by the computer processor and comprising a tax calculation graph, a modular tax calculation engine, a plurality of decision tables, a sub-graph engine, a granularity control engine, a modular tax logic agent, a modular user interface manager, the modular tax logic agent when executed by the computer processor is detached from the user interface manager when executed by the computer processor;
- a data store in communication with the computing device, the data store configured to store user-specific tax data therein;
- the modular tax calculation engine when executed by the computer processor using the tax calculation graph to perform a plurality of tax calculation operations using the user-specific tax data read from the data store to calculate the tax return, the tax calculation graph comprising a plurality of interconnected nodes including one or more of input nodes, functional nodes, and function node, each input node being populated with user-specific tax data, each function node defining a tax calculation utilizing the populated input nodes, and each functional node being a result of a calculation performed by an interconnected function node when executed by the computer processor;
- the modular tax calculation engine when executed by the computer processor performs a plurality of tax calculation operations based on the tax calculation graph using the user-specific tax data read from the data store to calculate the tax return;
- the sub-graph engine when executed by the computer processor generates a sub-graph of the tax calculation graph based upon a target node and one or more user enterable nodes selected from the nodes of the tax calculation graph, the sub-graph engine when executed by the computer processor:
  - determines all of the nodes along each calculation path of the tax calculation graph leading from each user enterable node to the target node wherein such nodes are referred to as first sub-graph nodes;
  - determines any calculation paths leading from an input node to the target node which do not include a user enterable node, such calculation paths referred to as open paths;
  - when one or more open paths are determined, prompts the user to select one or more nodes on one or more of the open paths as an additional user enterable node and determines all of the nodes along each calculation path leading from each additional user enterable node to the target node, such nodes referred to as second sub-graph nodes;
  - determines any remaining open paths leading from an input node to the target node which do not include a user enterable node or an additional user enterable node, for any remaining open paths, determines all nodes along such remaining open paths, such nodes referred to as third sub-graph nodes; and generates a sub-graph consisting essentially of the first sub-graph nodes, the second sub-graph nodes and the third sub-graph nodes;

the plurality of decision tables collectively representing a completion graph for completing all required data fields for computing the tax return, each decision table representing a plurality of columns, each column corresponding to a tax question and a plurality of rows, each row corresponding to a completion path for a tax rule, thereby forming a plurality of cells with each cell corresponding to a particular row and column, each cell in a respective row having a logic operator to be executed by the computer processor, the logic operator corresponding to the tax question of the each cell's respective column such that completion of each respective row is determined by the logic operators in the respective row;

the granularity control engine when executed by the computer processor generating modified decision tables by modifying the decision tables such that cells in the decision tables directed to nodes not included in the sub-graph generated by the sub-graph engine are configured in the decision tables as not needed to complete a particular tax topic;

the modular tax logic agent when executed by the computer processor analyzing user-specific tax data in the data store and the modified decision table to determine one or more suggested tax questions for obtaining missing tax data required for the tax calculation engine to complete a tax calculation of the sub-graph, the modular tax logic agent eliminating, based on the user-specific tax data, at least one row and its respective completion path to reduce possible suggested tax questions; and the user interface manager when executed by the computer processor receiving the suggested tax questions from the modular tax logic agent and outputting on the display one or more questions based on the one or more suggestions via a user interface.

8. The system of claim 7, wherein the sub-graph engine when executed by the computer processor determines whether there is a calculation path between (i) a first user enterable node or a first additional user enterable node and (ii) a second user enterable node or a second additional user enterable node, and when there is a calculation path between the first user enterable node or first additional user enterable node and second user enterable node or a second additional user enterable node, notifies the user that the selection of the first user enterable node or the first additional user enterable node and the second user enterable node or the second additional user enterable is invalid; (b) requests and receives a revised selection of user enterable nodes and additional user enterable nodes, and (c) generates a final sub-graph based upon the revised selection of user enterable nodes.

9. The system of claim 8, wherein the sub-graph engine when executed by the computer processor receives a user selection of the target node and the one or more nodes of the tax calculation graph to be tagged as user enterable nodes; and tags the one or more nodes selected as user enterable nodes using a user enterable tag for each node.

10. The system of claim 7, wherein a plurality of the nodes on the tax calculation graph each include a user selectable tag for selectably configuring such node as a user enterable node wherein the value of such node is entered by the user.

11. A system for preparing a tax return in which a granularity of tax questions presented to a user may be adjusted, comprising:

a computing device having a computer processor, display and memory, and a non-transitory, computer-readable storage device having a software application stored thereon, the software application executable by the computer processor and comprising a tax calculation graph, a modular tax calculation engine, a plurality of decision tables, a sub-graph engine, a granularity control engine, a modular tax logic agent, a modular user interface manager, the modular tax logic agent when executed by the computer processor is detached from the modular user interface manager when executed by the computer processor;

a data store in communication with the computing device, the data store configured to store user-specific tax data therein;

the modular tax calculation engine when executed by the computer processor using the tax calculation graph to perform a plurality of tax calculation operations using the user-specific tax data read from the data store to calculate the tax return, the tax calculation graph comprising a plurality of interconnected nodes including one or more of input nodes, functional nodes, and function nodes, each input node being populated with user-specific tax data, each function node defining a tax calculation utilizing the populated input nodes, and each functional node being a result of a calculation performed by an interconnected function node when executed by the computer processor;

the sub-graph engine when executed by the computer processor generating a sub-graph based upon a target node and one or more user enterable nodes, the sub-graph engine when executed by the computer processor generating:

determines a construct sub-graph comprising all nodes of the tax calculation graph having a calculation path leading to the target node;

for each user enterable node, determines all of the nodes along each calculation path of the construct sub-graph leading from each user enterable node to the target node wherein such nodes are referred to as first sub-graph nodes;

determines any calculation paths leading from an input node of the construct sub-graph to the target node which do not include a user enterable node, such calculation paths referred to as open paths;

when one or more open paths are determined, receives a selection of a node on one or more of the open paths to be configured as an additional user enterable node, and determines all nodes along each calculation path leading from each additional user enterable node to the target node, such nodes referred to as second sub-graph nodes;

generates a final sub-graph consisting essentially of the first sub-graph nodes and second sub-graph nodes;

the plurality of decision tables collectively representing a completion graph for completing all required data fields for computing the tax return, each decision table representing a plurality of columns, each column corresponding to a tax question and a plurality of rows, each row corresponding to a completion path for a tax rule, thereby forming a plurality of cells with each cell corresponding to a particular row and column, each cell in a respective row having a logic operator to be executed by the computer processor, the logic operator corresponding to the tax question of the each cell's respective column such that completion of each respective row is determined by the logic operators in the respective row;

the sub-graph engine when executed by the computer processor generating a sub-graph of the tax calculation graph based upon a target node and one or more user enterable nodes selected by the user from the nodes of the tax calculation graph, the sub-graph graph excluding: (a) all nodes of the tax calculation graph upon which only have a calculation path leading to only one or more user enterable nodes; and (b) all nodes which do not have a calculation path leading to the selected target node;

the granularity control engine when executed by the computer processor generating modified decision tables by modifying the decision tables such that cells in the decision tables directed to nodes excluded in the sub-graph by the sub-graph engine are configured in the decision tables as not needed to complete a particular tax topic;

the modular tax logic agent when executed by the computer processor analyzing user-specific tax data in the data store and the modified decision table to determine one or more suggested tax questions for obtaining missing tax data required for the tax calculation engine to complete a tax calculation of the sub-graph, the modular tax logic agent eliminating, based on the user-specific tax data, at least one row and its respective completion path to reduce possible suggested tax questions; and the user interface manager when executed by the computer processor receiving the suggested tax questions from the modular tax logic agent and outputting on the display one or more questions based on the one or more suggestions via a user interface.

12. The system of claim 11, wherein the sub-graph engine when executed by the computer processor:
after receiving the selection of a node on one or more of the open paths as an additional user enterable node, determines any remaining open paths leading from an input node to the target node which do not include a user enterable node or an additional user enterable node, and for any remaining open paths, determines all nodes along such remaining open paths, such nodes referred to as third sub-graph nodes;
and wherein the final sub-graph consists only of the first sub-graph nodes, second sub-graph nodes, and third sub-graph nodes.

13. The system of claim 12, wherein the sub-graph engine when executed by the computer processor determines whether there is a calculation path between (i) a first user enterable node or a first additional user enterable node and (ii) a second user enterable node or a second additional user enterable node, and when there is a calculation path between the first user enterable node or a first additional user enterable node and second user enterable node or a second additional user enterable node, notifies the user that the selection of the first user enterable node or the first additional user enterable node and the second user enterable node or the second additional user enterable is invalid; (b) requests and receives a revised selection of user enterable nodes and additional user enterable nodes, and (c) generates the final sub-graph based upon the revised selection of user enterable nodes.

14. The system of claim 11, wherein the sub-graph engine when executed by the computer processor receives a user selection of the target node and the one or more nodes of the tax calculation graph to be tagged as user enterable nodes; and tags the one or more nodes selected as user enterable nodes using a user enterable tag for each node.

15. The system of claim 11, wherein a plurality of the nodes on the tax calculation graph each include a user selectable tag for selectably configuring such node as a user enterable node wherein the value of such node is entered by the user.

16. A computer implemented method for preparing a tax return in which a granularity of tax questions presented to a user is adjusted utilizing tax calculation graph, the tax calculation graph comprising a plurality of interconnected nodes including one or more of input nodes, functional nodes, and function nodes, each input node being populated with user-specific tax data, each function node defining a tax calculation utilizing the populated input nodes, and each functional node being a result of a calculation performed by an interconnected function node when executed by the computer, the method comprising:
determining a sub-graph of the tax calculation graph based upon a target node and one or more user enterable nodes selected by the user from the nodes of the tax calculation graph;
determining a construct sub-graph comprising all nodes of the tax calculation graph having a calculation path leading to a target node;
for each user enterable node, determining all of the nodes along each calculation path of the construct sub-graph leading from each user enterable node to the target node wherein such nodes are referred to as first sub-graph nodes;
determining one or more calculation paths leading from an input node of the construct sub-graph to the target node which do not include a user enterable node, such calculation paths referred to as open paths;
upon determining one or more open paths, receiving a selection of a node on one or more of the open paths to be configured as an additional user enterable node, and determining all nodes along each calculation path leading from each additional user enterable node to the target node, such nodes referred to as second sub-graph nodes;
generating a final sub-graph consisting essentially of the first sub-graph nodes and second sub-graph nodes;
modifying a plurality of decision tables, the decision tables collectively representing a completion graph for completing all required data fields for computing the tax return, each decision table representing a plurality of columns, each column corresponding to a tax question and a plurality of rows, each row column corresponding to a completion path for a tax rule, thereby forming a plurality of cells with each cell corresponding to a particular row and column, each cell in a respective row having a logic operator to be executed by the computer, the logic operator corresponding to the tax question of the each cell's respective column such that completion of each respective row is determined by the logic operator in the respective row, by modifying the decision tables such that cells in the decision tables directed to nodes not included in the sub-graph are configured in the decision tables as not needed to complete a particular tax topic;
analyzing user-specific tax data in a data store and the modified decision table and determining one or more suggested tax questions for obtaining missing tax data required to complete a tax calculation of the sub-graph;

eliminating based on the user-specific tax data at least one row and its respective completion path to reduce possible suggested tax questions; and outputting one or more questions based on the one or more suggestions via a user interface.

17. The method of claim 16, further comprising:

after receiving the selection of a node on one or more of the open paths as an additional user enterable node, determining one or more remaining open paths leading from an input node to the target node which do not include a user enterable node or an additional user enterable node, and for the remaining open paths, determining all nodes along such remaining open paths, such nodes referred to as third sub-graph nodes;

and wherein the final sub-graph consists only of the first sub-graph nodes, second sub-graph nodes, and third sub-graph nodes.

18. The method of claim 17, further comprising:

determining whether is a calculation path between (i) a first user enterable node or a first additional user enterable node and (ii) a second user enterable node or a second additional user enterable node, and upon determining a calculation path between the first user enterable node or a first additional user enterable node and second user enterable node or a second additional user enterable node, notifying the user that the selection of the first user enterable node or the first additional user enterable node and the second user enterable node or the second additional user enterable is invalid; (b) requesting and receiving a revised selection of user enterable nodes and additional user enterable nodes, and (c) generating the final sub-graph based upon the revised selection of user enterable nodes.

19. The method of claim 16, further comprising:

receiving a user selection of the target node and the one or more nodes of the tax calculation graph to be tagged as user enterable nodes; and tagging the one or more nodes selected as user enterable nodes using a user enterable tag for each node.

* * * * *